(12) United States Patent
Hisasue et al.

(10) Patent No.: US 10,472,514 B2
(45) Date of Patent: Nov. 12, 2019

(54) BLOCK COPOLYMER COMPOSITION AND ADHESIVE COMPOSITION

(71) Applicants: Asahi Kasei Kabushiki Kaisha, Tokyo (JP); Japan Elastomer Co., Ltd., Tokyo (JP)

(72) Inventors: Takahiro Hisasue, Tokyo (JP); Shigeo Nakajima, Tokyo (JP); Yoshifumi Araki, Tokyo (JP); Yukinori Nakamichi, Tokyo (JP)

(73) Assignees: Asahi Kasei Kabushiki Kaisha, Tokyo (JP); Japan Elastomer Co., Ltd., Tokyo (JP)

( * ) Notice: Subject to any disclaimer, the term of this patent is extended or adjusted under 35 U.S.C. 154(b) by 0 days.

(21) Appl. No.: 15/113,317

(22) PCT Filed: Jan. 22, 2015

(86) PCT No.: PCT/JP2015/051729
§ 371 (c)(1),
(2) Date: Jul. 21, 2016

(87) PCT Pub. No.: WO2015/111669
PCT Pub. Date: Jul. 30, 2015

(65) Prior Publication Data
US 2017/0002190 A1    Jan. 5, 2017

(30) Foreign Application Priority Data
Jan. 23, 2014  (JP) .................... 2014-010810

(51) Int. Cl.
| C08L 53/02 | (2006.01) |
| C09J 153/02 | (2006.01) |
| C08F 297/04 | (2006.01) |
| C09J 7/38 | (2018.01) |
| C08L 91/00 | (2006.01) |

(52) U.S. Cl.
CPC .......... *C08L 53/02* (2013.01); *C08F 297/044* (2013.01); *C08L 91/00* (2013.01); *C09J 7/387* (2018.01); *C09J 153/02* (2013.01); *C08L 2205/025* (2013.01)

(58) Field of Classification Search
CPC .... C08L 2205/025; C08L 53/02; C09J 153/02
See application file for complete search history.

(56) References Cited

U.S. PATENT DOCUMENTS

| 3,239,478 A | 3/1966 | Harlan, Jr. |
| 5,290,878 A | 3/1994 | Yamamoto et al. |
| 5,777,039 A | 7/1998 | De Craene et al. |
| 6,291,583 B1 | 9/2001 | Komatsuzaki et al. |
| 6,534,593 B1* | 3/2003 | Komatsuzaki ........ C08F 297/04 525/89 |
| 2002/0147274 A1 | 10/2002 | Sasagawa et al. |
| 2003/0225210 A1 | 12/2003 | Handlin, Jr. et al. |
| 2004/0054090 A1 | 3/2004 | Bening et al. |
| 2005/0154144 A1* | 7/2005 | Atwood ............... C08F 8/04 525/314 |
| 2007/0173591 A1 | 7/2007 | Kanae et al. |
| 2008/0319151 A1 | 12/2008 | Oshima |
| 2009/0133834 A1* | 5/2009 | Lechat ............. C08L 53/00 156/334 |
| 2011/0209994 A1* | 9/2011 | Hayata ............. C08L 23/06 204/279 |
| 2015/0175855 A1 | 6/2015 | Nakajima et al. |
| 2016/0009966 A1 | 1/2016 | Inoue et al. |

FOREIGN PATENT DOCUMENTS

| EP | 1411100 A1 | 4/2004 |
| EP | 1719808 A2 | 11/2006 |
| JP | S44-017037 B | 7/1969 |
| JP | S56-049958 B2 | 11/1981 |
| JP | S61-261310 A | 11/1986 |
| JP | S61-278578 A | 12/1986 |
| JP | H05-069874 B | 10/1993 |
| JP | H05-339312 A | 12/1993 |
| JP | H10-130349 A | 5/1998 |
| JP | 2000-505483 A | 5/2000 |
| JP | 2000-309767 A | 11/2000 |
| JP | 2004-083791 A | 3/2004 |
| JP | 2004-137297 A | 5/2004 |
| JP | 2005-533151 A | 11/2005 |
| JP | 2006-507371 A | 3/2006 |
| JP | 2006-341593 A | 12/2006 |
| JP | 2009-030027 A | 2/2009 |

(Continued)

OTHER PUBLICATIONS

International Preliminary Report on Patentability and Written Opinion issued in corresponding International Patent Application No. PCT/JP2015/051729 dated Jul. 26, 2016.
Supplementary European Search Report issued in counterpart European Patent Application No. 15740711.5 dated Dec. 8, 2016.
International Search Report issued in corresponding International Patent Application No. PCT/JP2015/051729 dated Apr. 14, 2015.

*Primary Examiner* — Jeffrey C Mullis

(74) *Attorney, Agent, or Firm* — Morgan, Lewis & Bockius LLP

(57) ABSTRACT

A block copolymer composition including: 10% by mass or more and 90% by mass or less of a component (a), and 10% by mass or more and 90% by mass or less of a component (b), wherein the component (a) is a block copolymer containing a polymer block (A) primarily including a vinyl aromatic monomer unit and a polymer block (B) primarily including a conjugated diene monomer unit, wherein the block copolymer has a weight average molecular weight of 30,000 or higher and 150,000 or lower; and the component (b) is a block copolymer containing a polymer block (A) primarily including a vinyl aromatic monomer unit and a polymer block (B) primarily including a conjugated diene monomer unit.

17 Claims, 3 Drawing Sheets

(56) References Cited

FOREIGN PATENT DOCUMENTS

| | | | |
|---|---|---|---|
| JP | 2010-235772 | A | 10/2010 |
| JP | 2012-172077 | A | 9/2012 |
| JP | 2014-189584 | A | 10/2014 |
| WO | 1999/058605 | A | 11/1999 |
| WO | 01/085818 | A1 | 11/2001 |
| WO | 2005/075555 | A1 | 8/2005 |
| WO | 2012/050046 | A1 | 4/2012 |
| WO | 2014/017380 | A | 1/2014 |

\* cited by examiner

BLOCK COPOLYMER COMPOSITION AND ADHESIVE COMPOSITION

TECHNICAL FIELD

The present invention relates to a block copolymer composition and an adhesive composition comprising the same.

BACKGROUND ART

Vinyl aromatic monomer-conjugated diene monomer block copolymers (e.g., SBS: styrene-butadiene-styrene-block copolymer, SIS: styrene-isoprene-styrene-block copolymer) have been widely used recently as a base polymer for solution and hot-melt adhesives and viscous adhesives. For example, Patent Literature 1 and Patent Literature 2 disclose an adhesive composition or adhesive composition with an SBS. These adhesive compositions or adhesive compositions with an SBS or those with an SIS, however, have high melt viscosity and are insufficient in balance between melting characteristics or coatability and viscous adhesive characteristics such as tack strength.

For an improved solution over them, Patent Literature 3 discloses an adhesive composition containing a triblock copolymer and a diblock copolymer.

Patent Literature 4 discloses an adhesive composition containing a block copolymer obtained by coupling with a particular bifunctional coupling agent (an aliphatic monoester, a particular dihalogen compound).

Further, Patent Literature 5 discloses a composition containing: a block copolymer obtained by hydrogenating a block copolymer of a vinyl aromatic hydrocarbon compound and a conjugated diene compound at a particular percentage; and a tackifier.

Furthermore, Patent Literature 6 and Patent Literature 7 disclose an adhesive composition containing two or more block copolymer compositions for an improved solution.

CITATION LIST

Patent Literature

Patent Literature 1: Japanese Patent Publication No. S44-17037
Patent Literature 2: Japanese Patent Publication No. S56-49958
Patent Literature 3: Japanese Patent Laid-Open No. S61-278578
Patent Literature 4: Japanese Patent Laid-Open No. S61-261310
Patent Literature 5: Japanese Patent Laid-Open No. H05-69874
Patent Literature 6: Japanese Patent Laid-Open No. 2000-309767
Patent Literature 7: Japanese Patent Laid-Open No. 2004-137297

SUMMARY OF INVENTION

Solution to Problem

However, the viscous adhesive compositions and adhesive compositions disclosed in Patent Literatures 3 and 4 are insufficient in improvement effect on the above performances. In addition, even the compositions disclosed in Patent Literatures 5, 6 and 7 are still insufficient in performance balance between viscous adhesion characteristics and melting characteristics or coatability.

The present invention is thus made in view of the above-described problems in conventional arts, and an object of the present invention is to provide a block copolymer composition to serve as an adhesive composition being excellent in balance between viscous adhesion performance and melt viscosity and having excellent tack, retention strength, melting characteristics and coatability, and an adhesive composition comprising the block copolymer composition.

Solution to Problem

The present inventors diligently studied to solve the above problems, and have found that the above problems can be effectively solved by using two types of block copolymers each having a particular structure, composition and weight average molecular weight, and have completed the present invention.

Specifically, the present invention is as follows:

[1]
A block copolymer composition comprising: 10% by mass or more and 90% by mass or less of a component (a), and 10% by mass or more and 90% by mass or less of a component (b), wherein
the component (a) is a block copolymer comprising a polymer block (A) mainly comprising a vinyl aromatic monomer unit and a polymer block (B) mainly comprising a conjugated diene monomer unit, wherein the block copolymer has a weight average molecular weight of 30,000 or higher and 150,000 or lower;
the component (b) is a block copolymer comprising a polymer block (A) mainly comprising a vinyl aromatic monomer unit and a polymer block (B) mainly comprising a conjugated diene monomer unit;
the component (b) comprises a component (b-2) at a ratio of weight average molecular weight to the weight average molecular weight of the component (a) of 2.5 or more and less than 3.4, and a component (b-3) at a ratio of weight average molecular weight to the weight average molecular weight of the component (a) of 3.4 or more and less than 4.5; and
a content of the vinyl aromatic monomer unit in the component (a) and the component (b) is 10 to 50% by mass based on a total amount of the component (a) and the component (b).

[2]
The block copolymer composition according to item [1], having a viscosity in a 15% by mass toluene solution of 10 to 90 mPa·s.

[3]
The block copolymer composition according to item [1], having a viscosity in a 15% by mass toluene solution of higher than 90 mPa·s and 600 mPa·s or less.

[4]
The block copolymer composition according to any one of items [1] to [3], wherein the component (b) further comprises a component (b-1) at a ratio of weight average molecular weight to the weight average molecular weight of the component (a) of 1.5 or more and less than 2.5.

[5]
The block copolymer composition according to item [4], wherein a ratio of an area for the component (b-1) in a GPC elution curve to a total area for the component (b) is 0.6 or less.

[6]
The block copolymer composition according to item [4], wherein a ratio of an area for the component (b-1) in a GPC elution curve to a total area for the component (b) is 0.2 or less.

[7]
The block copolymer composition according to any one of items [1] to [6], wherein
a ratio of an area for the component (b-2) in a GPC elution curve to a total area for the component (b) is 0.1 to 0.97, and
a ratio of an area for the component (b-3) in a GPC elution curve to a total area for the component (b) is 0.03 to 0.9.

[8]
The block copolymer composition according to any one of items [1] to [7], wherein the component (b) has a weight average molecular weight of 60,000 or higher and 600,000 or lower.

[9]
The block copolymer composition according to any one of items [1] to [8], wherein
the component (a) is a block copolymer represented by (A-B) and/or (A-B)X, wherein A denotes a polymer block (A); B denotes a polymer block (B); and X denotes a residue of a coupling agent or a residue of a polymerization initiator, and
the component (b) is a block copolymer represented by $(A-B)_3X$ and the formula $(A-B)_4X$, wherein A denotes a polymer block (A); B denotes a polymer block (B); and X denotes a residue of a coupling agent or a residue of a polymerization initiator.

[10]
The block copolymer composition according to any one of items [1] to [8], wherein
the component (a) is a block copolymer represented by (A-B) and/or (A-B)X, wherein A denotes a polymer block (A); B denotes a polymer block (B); and X denotes a residue of a coupling agent or a residue of a polymerization initiator, and
the component (b) is a block copolymer represented by $(A-B)_2X$, $(A-B)_3X$ and the formula $(A-B)_4X$, wherein A denotes a polymer block (A); B denotes a polymer block (B); and X denotes a residue of a coupling agent or a residue of a polymerization initiator.

[11]
The block copolymer composition according to any one of items [1] to [10], wherein
a content of the component (a) is 50% by mass or more and 90% by mass or less, and
a content of the component (b) is 10% by mass or more and 50% by mass or less.

[12]
The block copolymer composition according to any one of items [1] to [10], wherein
a content of the component (a) is 10% by mass or more and 75% by mass or less, and
a content of the component (b) is 25% by mass or more and 90% by mass or less.

[13]
The block copolymer composition according to any one of items [1] to [10], wherein
a content of the component (a) is 70% by mass or more and 90% by mass or less, and
a content of the component (b) is 10% by mass or more and 30% by mass or less.

[14]
The block copolymer composition according to any one of items [1] to [10], wherein
a content of the component (a) is 50% by mass or more and less than 70% by mass or less, and
a content of the component (b) is more than 30% by mass and 50% by mass or less.

[15]
The copolymer composition according to any one of items [1] to [14], wherein a hydrogenation ratio in the conjugated diene monomer unit in the component (a) and the component (b) is 20% by mass to 70% by mass.

[16]
The copolymer composition according to any one of items [1] to [14], wherein a hydrogenation ratio in the conjugated diene monomer unit in the component (a) and the component (b) is more than 70% by mass.

[17]
A adhesive composition comprising:
100 parts by mass of the block copolymer composition according to any one of items [1] to [16];
50 to 400 parts by mass of a tackifier; and
10 to 200 parts by mass of a softener.

Advantageous Effects of Invention

The present invention can provide a block copolymer composition to serve as an adhesive composition being excellent in balance between viscous adhesion performance and melt viscosity and having excellent tack, retention strength, melting characteristics and coatability, and a adhesive composition comprising the block copolymer composition.

DESCRIPTION OF EMBODIMENTS

Figure 1:
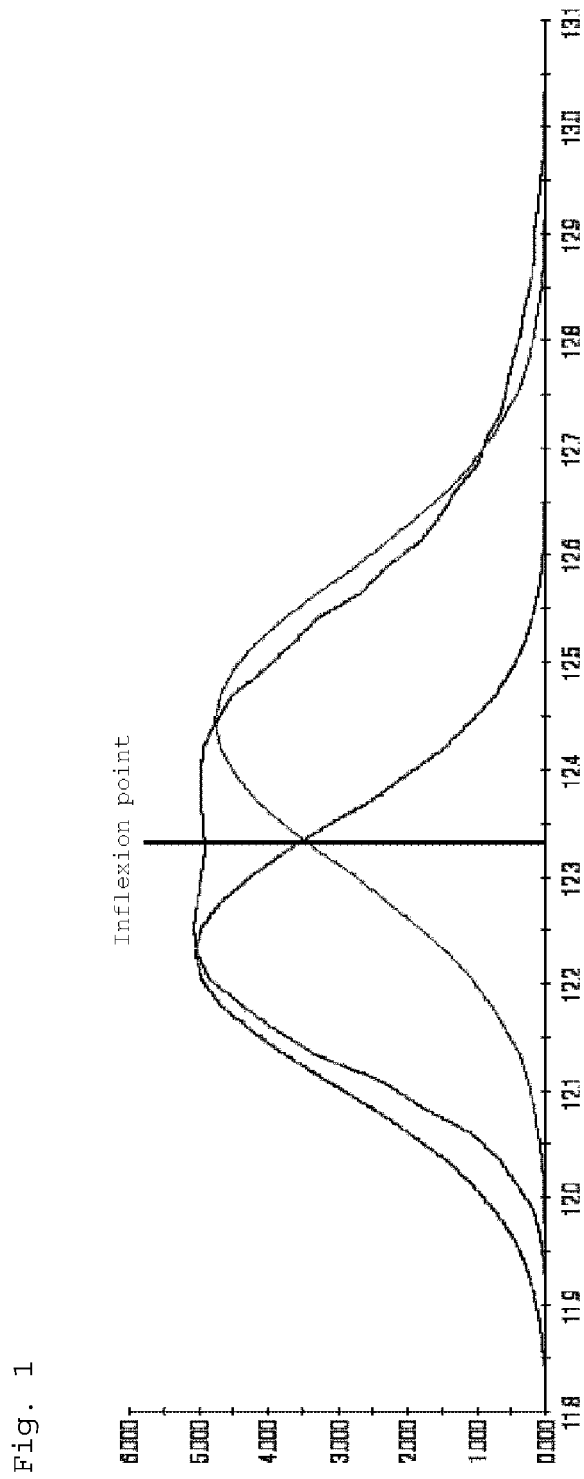
FIG. 1 shows a plot vertically partitioned at an inflection point between peaks for components (b-2) and (b-3).
Figure 2:
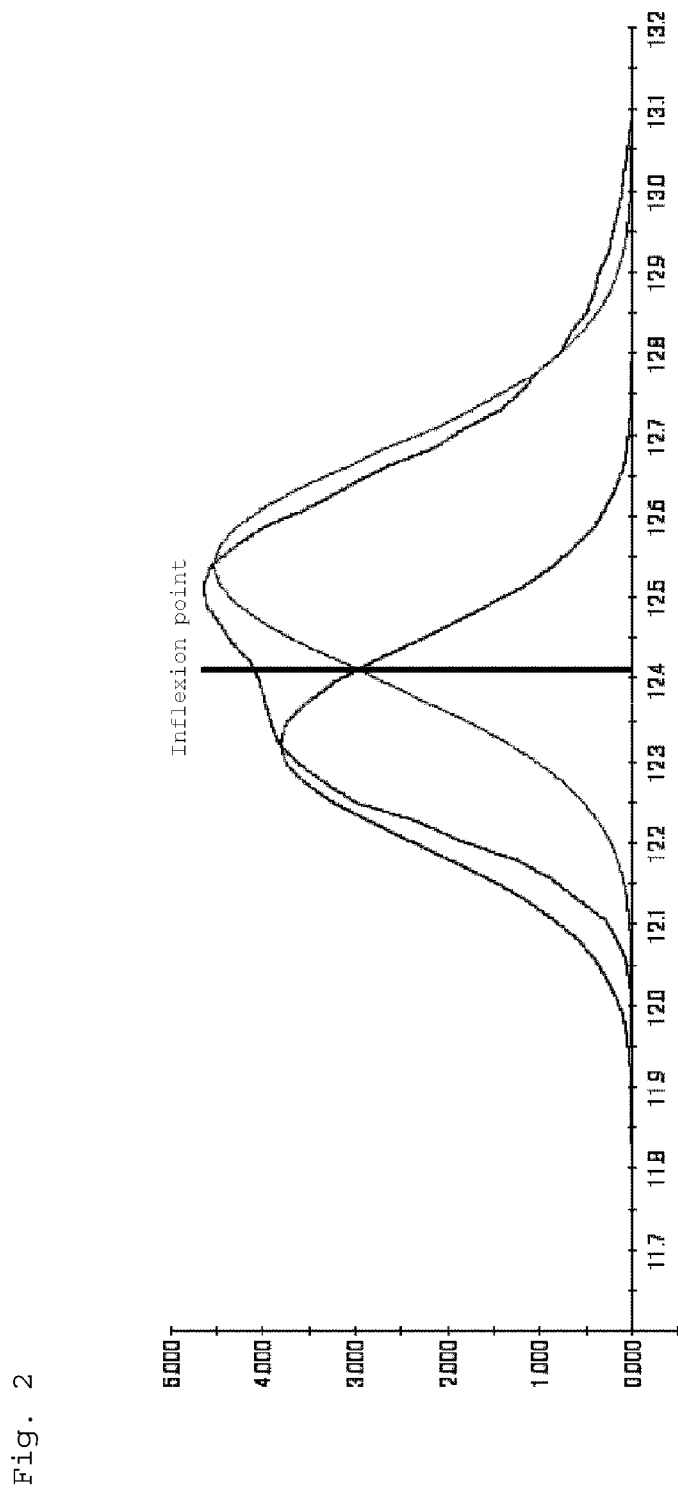
FIG. 2 shows another plot vertically partitioned at an inflection point between peaks for components (b-2) and (b-3).

Hereinafter, embodiments of the present invention (hereinafter, referred to as "the present embodiments") will be described in detail. It is to be noted that the present invention is never limited to the following embodiments and can be implemented with various modifications within the scope of the gist.

[Block Copolymer Composition]
A block copolymer composition according to the present embodiments comprises:
10% by mass or more and 90% by mass or less of a component (a), and 10% by mass or more and 90% by mass or less of a component (b), and
the component (a) is a block copolymer comprising a polymer block (A) mainly comprising a vinyl aromatic monomer unit and a polymer block (B) mainly comprising a conjugated diene monomer unit, wherein the block copolymer has a weight average molecular weight of 30,000 or higher and 150,000 or lower;
the component (b) is a block copolymer comprising a polymer block (A) mainly comprising a vinyl aromatic monomer unit and a polymer block (B) mainly comprising a conjugated diene monomer unit;
the component (b) comprises a component (b-2) at a ratio of weight average molecular weight to the weight average molecular weight of the component (a) of 2.5 or more and less than 3.4, and a component (b-3) at a ratio of weight average molecular weight to the weight average molecular weight of the component (a) of 3.4 or more and less than 4.5; and the content of the vinyl aromatic monomer unit in the component (a) and the component (b) is 10 to 50% by mass based on the total amount of the component (a) and the component (b).

(Structure)

The block copolymer composition according to the present embodiments containing a block copolymer containing a polymer block (A) mainly comprising a vinyl aromatic monomer unit (hereinafter, occasionally denoted as "A") and a polymer block (B) mainly comprising a conjugated diene monomer unit (hereinafter, occasionally denoted as "B").

Here, the "vinyl aromatic monomer unit" refers to a structure resulting from polymerization of one vinyl aromatic hydrocarbon compound, and the "conjugated diene monomer unit" refers to a structure resulting from polymerization of one conjugated diene compound.

The "polymer block (A) mainly comprising a vinyl aromatic monomer unit" refers to a polymer block containing a vinyl aromatic monomer unit in a content of 50% by mass or more, preferably in a content of 70% by mass or more, more preferably in a content of 85% by mass or more, and further preferably in a content of 95% by mass or more. The "polymer block (B) mainly comprising a conjugated diene monomer unit" refers to a polymer block containing a conjugated diene monomer unit in a content of more than 50% by mass, preferably in a content of 70% by mass or more, more preferably in a content of 85% by mass or more, and further preferably in a content of 95% by mass or more. Each component will be described in detail in the following.

[Block Copolymer]

(Component (a))

The component (a) is a block copolymer containing a polymer block (A) and a polymer block (B) and having a weight average molecular weight of 30,000 or higher and 150,000 or lower.

The weight average molecular weight of the block copolymer as the component (a) is 30,000 or higher and 150,000 or lower, preferably 30,000 or higher and 140,000 or lower, more preferably 30,000 or higher and 130,000 or lower, further preferably 35,000 or higher and 120,000 or lower, and still further preferably 40,000 or higher and 120,000 or lower. The weight average molecular weight of the component (a) in such a range provides a block copolymer composition and an adhesive composition having excellent tack strength and tack, and low melt viscosity characteristics. The weight average molecular weight of the component (a) can be determined by using a method for evaluation β described in Examples.

The structure of the component (a) is not limited, and examples thereof include $(A-B)_n$, $(A-B)_nX$, $(A-B)_nA$, $(A-B)_n AX$, $(B-A)_nX$, $(B-A)_nB$, and $(B-A)_nBX$ (in which A denotes a polymer block (A); B denotes a polymer block (B); X denotes a residue of a coupling agent or a residue of a polymerization initiator; and n is an integer of 1 or more, and preferably an integer of 1 to 5). Among them, diblock copolymers represented by the formula (A-B) or the formula (A-B)X are preferred. The composition (a) having such a structure tends to provide a block copolymer composition and adhesive composition having excellent viscous adhesion characteristics, low melt viscosity characteristics and high softening point characteristics.

(Component (b))

The component (b) contains a polymer block (A) and a polymer block (B). In addition, the component (b) contains a component (b-2) at a ratio of weight average molecular weight to the weight average molecular weight of the component (a) of 2.5 or more and less than 3.4, and a component (b-3) at a ratio of weight average molecular weight to the weight average molecular weight of the component (a) of 3.4 or more and less than 4.5.

The ratio of weight average molecular weight in terms of component (b-2)/component (a) is 2.5 or more and less than 3.4, preferably 2.6 or more and less than 3.3, and more preferably 2.7 or more and less than 3.2. The ratio of weight average molecular weight in terms of component (b-2)/component (a) in the range provides a block copolymer composition and adhesive composition having excellent viscous adhesion characteristics, low melt viscosity characteristics and high softening point characteristics.

The ratio of weight average molecular weight in terms of component (b-3)/component (a) is 3.4 or more and less than 4.5, preferably 3.5 or more and less than 4.4, and more preferably 3.5 or more and less than 4.3. The ratio of weight average molecular weight in terms of component (b-3)/component (a) in the range provides a block copolymer composition and adhesive composition having excellent viscous adhesion characteristics, low melt viscosity characteristics and high softening point characteristics.

The component (b) may further contain a component (b-1) at a ratio of weight average molecular weight to the weight average molecular weight of the component (a) (a ratio of weight average molecular weight in terms of component (b-1)/component (a)) of 1.5 or more and less than 2.5. The component (b-1) contained tends to provide a block copolymer composition and adhesive composition having excellent viscous adhesion characteristics, low melt viscosity characteristics and high softening point characteristics.

The ratio of weight average molecular weight in terms of component (b-1)/component (a) is 1.5 or more and less than 2.5, preferably 1.6 or more and less than 2.4, and more preferably 1.7 or more and less than 2.3. The ratio of weight average molecular weight in terms of component (b-1)/component (a) in the range tends to provide a block copolymer composition and adhesive composition having excellent viscous adhesion characteristics, low melt viscosity characteristics and high softening point characteristics.

In the case that the component (b) contains the component (b-1), the ratio of an area for the component (b-1) in a GPC elution curve is preferably 0.6 or less, more preferably 0.4 or less, further preferably 0.2 or less, still further preferably 0.1 or less, and furthermore preferably 0.05 or less to the total area for the component (b). The lower limit of the ratio of an area for the component (b-1) in a GPC elution curve is not limited, but preferably 0 or more, and more preferably 0.01 or more. The ratio of an area for the component (b-1) in a GPC elution curve in the range tends to provide a block copolymer composition and adhesive composition having excellent viscous adhesion characteristics, low melt viscosity characteristics and high softening point characteristics.

The ratio of an area for the component (b-2) in a GPC elution curve is preferably 0.1 to 0.97, more preferably 0.2 to 0.95, further preferably 0.3 to 0.9, still further preferably 0.35 to 0.85, and furthermore preferably 0.4 to 0.8 to the total area for the component (b). The ratio of an area for the component (b-2) in a GPC elution curve in the range tends to provide a block copolymer composition and adhesive composition having excellent viscous adhesion characteristics, low melt viscosity characteristics and high softening point characteristics.

The ratio of an area for the component (b-3) in a GPC elution curve is preferably 0.03 to 0.9, more preferably 0.05 to 0.8, further preferably 0.1 to 0.7, still further preferably 0.15 to 0.65, and furthermore preferably 0.2 to 0.6 to the total area for the component (b). The ratio of an area for the component (b-3) in a GPC elution curve in the range tends to provide a block copolymer composition and adhesive composition having excellent viscous adhesion characteristics, low melt viscosity characteristics and high softening point characteristics.

The ratio of weight average molecular weight of each of the component (b-1), the component (b-2) and the component (b-3) to the weight average molecular weight of the component (a), and the ratio of an area for each of the component (b-1), the component (b-2) and the component (b-3) in a GPC elution curve can be controlled to be within the above range on the basis of conditions for a coupling reaction, which will be described later, specifically, by adjusting the type of coupling, the amount of a coupling agent to be added, the temperature, and the duration. For example, the ratio of weight average molecular weight and the ratio of an area in a GPC elution curve can be controlled by selecting a compound containing four functional groups as a coupling agent.

The weight average molecular weight of the block copolymer as the component (b) is preferably 60,000 or higher and 600,000 or lower, more preferably 60,000 or higher and 560,000 or lower, further preferably 60,000 or higher and 520,000 or lower, still further preferably 60,000 or higher and 480,000 or lower, furthermore preferably 70,000 or higher and 450,000 or lower, further preferably 80,000 or higher and 400,000 or lower, still further preferably 80,000 or higher and 350,000 or lower, and furthermore preferably 100,000 or higher and 350,000 or lower. The weight average molecular weight of the component (b) in the range tends to provide a block copolymer composition and adhesive composition having excellent retention strength and high softening point characteristics. The weight average molecular weight of the component (b) can be determined by using a method for evaluation β described in Examples.

The structure of the component (b) is not limited, and the component (b) may consist of a single type of a structural unit or be a mixture of one or more types of structural units. Examples thereof include $[(A-B)_n]_m$, $[(A-B)_n]_mX$, $[(B-A)_n]_mX$, $[(A-B)_nA]_mX$, and $[(B-A)_nB]_mX$ (in which A denotes a polymer block (A); B denotes a polymer block (B); X denotes a residue of a coupling agent or a residue of a polymerization initiator; n is 1 to 5; and m is 2 to 8, preferably m is 2 to 6, and more preferably m is an integer of 2 to 4). Among them, a tribranched block copolymer represented by the formula $(A-B)_3X$ (hereinafter, occasionally referred to as "trifunctional block copolymer") is preferred for the component (b-2). For the component (b-3), a tetrabranched block copolymer represented by the formula $(A-B)_4X$ (hereinafter, occasionally referred to as "tetrafunctional block copolymer") is preferred. The tribranched block copolymer and tetrabranched block copolymer contained tend to provide a block copolymer composition and adhesive composition having excellent viscous adhesion characteristics, low melt viscosity characteristics and high softening point characteristics.

The structure of the component (b) may further contain a dibranched block copolymer represented by the formula $(A-B)_2X$ (hereinafter, also referred to as "bifunctional block copolymer") in addition to the block copolymers represented by the formula $(A-B)_3X$ and the formula $(A-B)_4X$ from the viewpoint of retention strength and high softening point characteristics. In this case, the component (b-1) is preferably represented by the formula $(A-B)_2X$.

More specifically, it is preferable that the component (a) be a block copolymer represented by the formula (A-B) and/or the formula (A-B)X (in which A denotes a polymer block (A); B denotes a polymer block (B); and X denotes a residue of a coupling agent or a residue of a polymerization initiator) and the component (b) be a block copolymer represented by the formula $(A-B)_3X$ and the formula $(A-B)_4X$ (in which A denotes a polymer block (A); B denotes a polymer block (B); and X denotes a residue of a coupling agent or a residue of a polymerization initiator). Such a component (a) and component (b) contained together tend to enhance the balance between low melt viscosity characteristics, and viscous adhesion characteristics and high softening point characteristics.

Further, it is preferable that the component (a) be a block copolymer represented by the formula (A-B) and/or the formula (A-B)X (in which A denotes a polymer block (A); B denotes a polymer block (B); and X denotes a residue of a coupling agent or a residue of a polymerization initiator) and the component (b) be a block copolymer represented by the formula $(A-B)_2X$, the formula $(A-B)_3X$ and the formula $(A-B)_4X$ (in which A denotes a polymer block (A); B denotes a polymer block (B); and X denotes a residue of a coupling agent or a residue of a polymerization initiator). Such a component (a) and component (b) contained together tend to enhance the balance between low melt viscosity characteristics, and viscous adhesion characteristics and high softening point characteristics.

The presence of the component (b-1), the component (b-2) and the component (b-3) contained as the component (b) in the block copolymer composition can be identified from different peak positions in a molecular weight distribution curve in gel permeation chromatography (hereinafter, also referred to as "GPC") under predetermined conditions shown in the following. Specifically, identification of a peak at a weight average molecular weight 2.5 times or more and less than 3.4 times as high as the weight average molecular weight of the component (a) (component (b-2)), a peak at a weight average molecular weight 3.4 times or more and less than 4.5 times as high as the weight average molecular weight of the component (a) (component (b-3)), and a peak at a weight average molecular weight 1.5 times or more and less than 2.5 times as high as the weight average molecular weight of the component (a) (component (b-1)) in a GPC chart allows to confirm the presence of the component (b-1), the component (b-2) and the component (b-3) contained in the copolymer composition.

Figure 3:
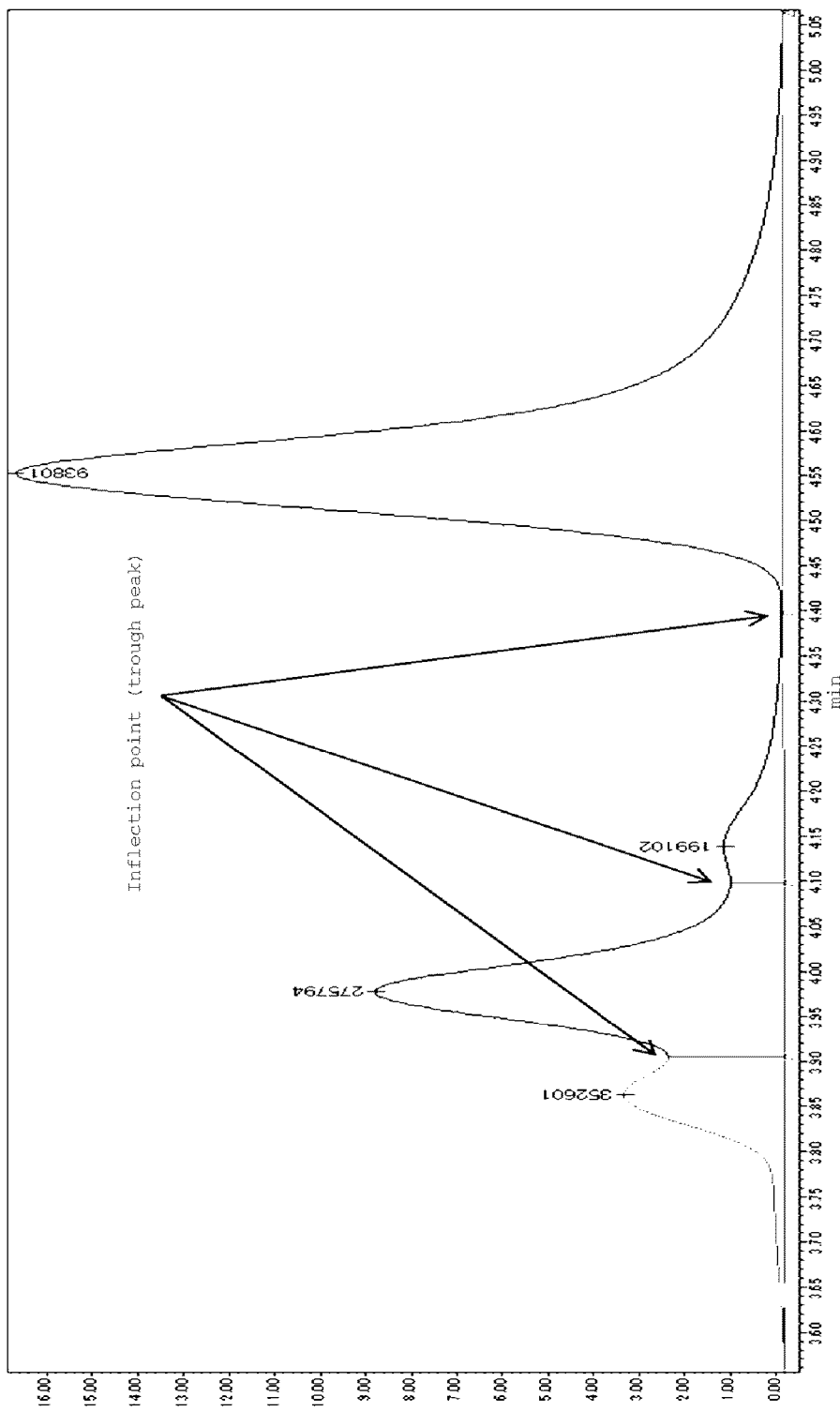
FIG. 3 shows a plot vertically partitioned at inflection points between peaks for components (b-1), (b-2) and (b-3).

The ratio of an area to the total area for the component (b) for each of the component (b-1), the component (b-2) and the component (b-3) can be determined by performing GPC measurement with an apparatus (ACQUITY APC system) and conditions which are described later in Examples and then vertically partitioning the GPC curve to the base line at inflection points between peaks with a system software which is also described in Examples. Here, the lowest point in the vertical direction (trough peak) between adjacent peaks was used for an inflection point between peaks for the components (b-1), (b-2) and (b-3). In the case that the lowest point is present continuously, the intermediate point was used. By using a predetermined waveform separation software, vertical partitioning was performed at the above-described inflection points and thereafter the weight average molecular weights and the ratios of an area were calculated. FIG. 3 shows a plot vertically partitioned at inflection points between peaks for the components (b-1), (b-2) and (b-3).

The vinyl aromatic hydrocarbon compound constituting the polymer block (A) in the components (a) and (b) is not limited, and examples thereof include alkylstyrenes such as styrene, α-methylstyrene, p-methylstyrene and p-tert-butylstyrene; alkoxystyrenes such as p-methoxystyrene; and vinylnaphthalene. Among them, styrene is preferred for the vinyl aromatic hydrocarbon. One of the vinyl aromatic hydrocarbon compounds may be used singly, or two or more thereof may be used in combination.

The conjugated diene compound constituting the polymer block (B) in the components (a) and (b) is not limited as long as the conjugated diene compound is a diolefin having a conjugated double bond, and examples thereof include 1,3-butadiene, 2-methyl-1,3-butadiene (isoprene), 2,3-dimethyl-1,3-butadiene, 1,3-pentadiene, and 1,3-hexadiene. Among them, 1,3-butadiene and isoprene are preferred for the conjugated diene compound. One of the conjugated diene compounds may be used singly, or two or more thereof may be used in combination.

[Content of Block Copolymer]

The content of the component (a) is 10% by mass or more and 90% by mass or less based on the total amount of the block copolymer composition, and the content of the component (b) is 10% by mass or more and 90% by mass or less based on the total amount of the block copolymer composition. The contents of the components (a) and (b) in the range provide a block copolymer composition and adhesive composition having excellent viscous adhesion characteristics, low melt viscosity characteristics and high softening point characteristics.

As one embodiment, the block copolymer compositions listed in the following are preferred:

a block copolymer composition in which the content of the component (a) is 50% by mass or more and 90% by mass or less, and the content of the component (b) is 10% by mass or more and 50% by mass or less;

a block copolymer composition in which the content of the component (a) is 60% by mass or more and 90% by mass or less, and the content of the component (b) is 10% by mass or more and 40% by mass or less;

a block copolymer composition in which the content of the component (a) is 65% by mass or more and 90% by mass or less, and the content of the component (b) is 10% by mass or more and 35% by mass or less;

a block copolymer composition in which the content of the component (a) is 70% by mass or more and 90% by mass or less, and the content of the component (b) is 10% by mass or more and 30% by mass or less;

a block copolymer composition in which the content of the component (a) is 73% by mass or more and 88% by mass or less, and the content of the component (b) is 12% by mass or more and 27% by mass or less; and a block copolymer composition in which the content of the component (a) is 75% by mass or more and 85% by mass or less, and the content of the component (b) is 15% by mass or more and 25% by mass or less.

The contents of the components (a) and (b) in each of the above ranges tend to provide an adhesive composition excellent in low melt viscosity characteristics and coatability, and the adhesive composition is suitable for viscous adhesives for a hygiene product, for which low viscosity performance is required due to a relatively low coating temperature, for example. In addition, adhesive compositions each obtained by using a hydrogenated block copolymer composition in which a block copolymer composition having one of the above ranges of content has been hydrogenated are excellent in retention strength, thermal stability, and odor control at higher temperatures, and, for example, suitable for a portion for which a high cohesive force is required, such as a waist gather of a disposable diaper, and production processes which are likely to require prolonged residence of an adhesive composition in a processor/coater.

As another aspect, the block copolymer compositions listed in the following are preferred:

a block copolymer composition in which the content of the component (a) is 10% by mass or more and 75% by mass or less, and the content of the component (b) is 25% by mass or more and 90% by mass or less;

a block copolymer composition in which the content of the component (a) is 20% by mass or more and 75% by mass or less, and the content of the component (b) is 25% by mass or more and 80% by mass or less;

a block copolymer composition in which the content of the component (a) is 25% by mass or more and 75% by mass or less, and the content of the component (b) is 25% by mass or more and 75% by mass or less;

a block copolymer composition in which the content of the component (a) is 30% by mass or more and 70% by mass or less, and the content of the component (b) is 30% by mass or more and 70% by mass or less;

a block copolymer composition in which the content of the component (a) is 40% by mass or more and less than 70% by mass, and the content of the component (b) is 30% by mass or more and 60% by mass or less;

a block copolymer composition in which the content of the component (a) is 50% by mass or more and less than 70% by mass, and the content of the component (b) is more than 30% by mass and 50% by mass or less;

a block copolymer composition in which the content of the component (a) is 53% by mass or more and 68% by mass or less, and the content of the component (b) is 32% by mass or more and 47% by mass or less; and a block copolymer composition in which the content of the component (a) is 55% by mass or more and 65% by mass or less, and the content of the component (b) is 35% by mass or more and 45% by mass or less.

The contents of the components (a) and (b) in each of the above ranges tends to provide an adhesive composition excellent in balance between tackiness and retention strength, and the adhesive composition is suitable for, for example, tape/label applications, for which tackiness is relatively required. In addition, adhesive compositions each obtained by using a hydrogenated block copolymer composition in which a block copolymer composition having one of the above ranges of content has been hydrogenated are excellent in retention strength, light resistance, and odor control at higher temperatures, and, for example, suitable for high tack applications and tape/label applications, for which tackiness is relatively required for a long period.

[Content and Weight Average Molecular Weight of Block Copolymer]

Preferred is a block copolymer composition in which the content of the component (a) having a weight average molecular weight of 30,000 or higher and 150,000 or lower is 10% by mass or more and 90% by mass or less, and the content of the component (b) having a weight average molecular weight of 60,000 or higher and 600,000 or lower is 10% by mass or more and 90% by mass or less. The contents and weight average molecular weights of the components (a) and (b) in the range provide a block copolymer composition and adhesive composition having excellent viscous adhesion characteristics, low melt viscosity characteristics and high softening point characteristics.

As one aspect, the block copolymer compositions listed in the following are preferred:

a block copolymer composition in which the content of the component (a) having a weight average molecular weight of 30,000 or higher and 150,000 or lower is 50% by mass or more and 90% by mass or less, and the content of the component (b) having a weight average molecular weight of 60,000 or higher and 600,000 or lower is 10% by mass or more and 50% by mass or less;

a block copolymer composition in which the content of the component (a) having a weight average molecular weight of 30,000 or higher and 140,000 or lower is 60% by mass or more and 90% by mass or less, and the content of the component (b) having a weight average molecular weight of 60,000 or higher and 560,000 or lower is 10% by mass or more and 40% by mass or less;

a block copolymer composition in which the content of the component (a) having a weight average molecular weight of 30,000 or higher and 130,000 or lower is 65% by mass or more and 90% by mass or less, and the content of the component (b) having a weight average molecular weight of 60,000 or higher and 520,000 or lower is 10% by mass or more and 35% by mass or less;

a block copolymer composition in which the content of the component (a) having a weight average molecular weight of 35,000 or higher and 120,000 or lower is 70% by mass or more and 90% by mass or less, and the content of the component (b) having a weight average molecular weight of 60,000 or higher and 480,000 or lower is 10% by mass or more and 30% by mass or less;

a block copolymer composition in which the content of the component (a) having a weight average molecular weight of 40,000 or higher and 120,000 or lower is 70% by mass or more and 90% by mass or less, and the content of the component (b) having a weight average molecular weight of 70,000 or higher and 450,000 or lower is 10% by mass or more and 30% by mass or less;

a block copolymer composition in which the content of the component (a) having a weight average molecular weight of 40,000 or higher and 100,000 or lower is 73% by mass or more and 88% by mass or less, and the content of the component (b) having a weight average molecular weight of 80,000 or higher and 400,000 or lower is 12% by mass or more and 27% by mass or less;

a block copolymer composition in which the content of the component (a) having a weight average molecular weight of 40,000 or higher and 80,000 or lower is 75% by mass or more and 85% by mass or less, and the content of the component (b) having a weight average molecular weight of 100,000 or higher and 350,000 or lower is 15% by mass or more and 25% by mass or less; and a block copolymer composition in which the content of the component (a) having a weight average molecular weight of 40,000 or higher and 70,000 or lower is 75% by mass or more and 85% by mass or less, and the content of the component (b) having a weight average molecular weight of 100,000 or higher and 300,000 or lower is 15% by mass or more and 25% by mass or less.

The weight average molecular weight and content of the block copolymers in each of the above ranges tend to provide an adhesive composition excellent in low melt viscosity characteristics and coatability, and the adhesive composition is suitable for viscous adhesives for a hygiene product, for which low viscosity performance is required due to a relatively low coating temperature, for example. In addition, adhesive compositions each obtained by using a hydrogenated block copolymer composition in which a block copolymer composition having one of the above ranges of content and weight average molecular weight has been hydrogenated are excellent in retention strength, thermal stability, and odor control at higher temperatures, and, for example, suitable for a portion for which a high cohesive force is required, such as a waist gather of a disposable diaper, and production processes which are likely to require prolonged residence of an adhesive composition in a processor/coater.

As another aspect, the block copolymer compositions listed in the following are preferred:

a block copolymer composition in which the content of the component (a) having a weight average molecular weight of 30,000 or higher and 150,000 or lower is 10% by mass or more and 75% by mass or less, and the content of the component (b) having a weight average molecular weight of 60,000 or higher and 600,000 or lower is 25% by mass or more and 90% by mass or less;

a block copolymer composition in which the content of the component (a) having a weight average molecular weight of 30,000 or higher and 140,000 or lower is 20% by mass or more and 75% by mass or less, and the content of the component (b) having a weight average molecular weight of 60,000 or higher and 560,000 or lower is 25% by mass or more and 80% by mass or less;

a block copolymer composition in which the content of the component (a) having a weight average molecular weight of 30,000 or higher and 130,000 or lower is 25% by mass or more and 75% by mass or less, and the content of the component (b) having a weight average molecular weight of 60,000 or higher and 520,000 or lower is 25% by mass or more and 75% by mass or less;

a block copolymer composition in which the content of the component (a) having a weight average molecular weight of 35,000 or higher and 120,000 or lower is 25% by mass or more and 75% by mass or less, and the content of the component (b) having a weight average molecular weight of 60,000 or higher and 480,000 or lower is 25% by mass or more and 75% by mass or less;

a block copolymer composition in which the content of the component (a) having a weight average molecular weight of 40,000 or higher and 120,000 or lower is 25% by mass or more and 75% by mass or less, and the content of the component (b) having a weight average molecular weight of 70,000 or higher and 450,000 or lower is 25% by mass or more and 75% by mass or less;

a block copolymer composition in which the content of the component (a) having a weight average molecular weight of 50,000 or higher and 120,000 or lower is 30% by mass or more and 70% by mass or less, and the content of the component (b) having a weight average molecular weight of 80,000 or higher and 400,000 or lower is 30% by mass or more and 70% by mass or less;

a block copolymer composition in which the content of the component (a) having a weight average molecular weight of 60,000 or higher and 120,000 or lower is 40% by mass or more and 70% by mass or less, and the content of the component (b) having a weight average molecular weight of 80,000 or higher and 350,000 or lower is 30% by mass or more and 60% by mass or less;

a block copolymer composition in which the content of the component (a) having a weight average molecular weight of 60,000 or higher and 120,000 or lower is 50% by mass or more and 70% by mass or less, and the content of the component (b) having a weight average molecular weight of 100,000 or higher and 350,000 or lower is 30% by mass or more and 50% by mass or less;

a block copolymer composition in which the content of the component (a) having a weight average molecular weight of 60,000 or higher and 120,000 or lower is 53% by mass or more and 68% by mass or less, and the content of the component (b) having a weight average molecular weight of 200,000 or higher and 350,000 or lower is 32% by mass or more and 47% by mass or less; and a block copolymer composition in which the content of the component (a) having a weight average molecular weight of 60,000 or higher and 120,000 or lower is 53% by mass or more and 68% by mass or less, and the content of the component (b) having a weight average molecular weight of 250,000 or higher and 350,000 or lower is 32% by mass or more and 47% by mass or less.

The weight average molecular weight and content of the block copolymers in each of the above ranges tend to provide an adhesive composition excellent in balance between tackiness and retention strength, and the adhesive composition suitable for, for example, tape/label applications, for which tackiness is relatively required. In addition, adhesive compositions each obtained by using a hydrogenated block copolymer composition in which a block copolymer composition having one of the above ranges of content and weight average molecular weight has been hydrogenated are excellent in retention strength, light resistance, and odor control at higher temperatures, and, for example, suitable for high tack applications and tape/label applications, for which tackiness is relatively required for a long period.

[Content of Vinyl Aromatic Monomer Unit]

The content of the vinyl aromatic monomer unit in the component (a) and the component (b) is 10 to 50% by mass based on the total amount of the component (a) and the component (b). The content of the vinyl aromatic monomer unit in the range provides an adhesive composition having excellent tack performance.

As one aspect, the content of the vinyl aromatic monomer unit in the component (a) and the component (b) is preferably 15 to 45% by mass, and more preferably 20 to 40% by mass based on the total amount of the component (a) and the component (b). The content of the vinyl aromatic monomer unit in the range tends to allow an adhesive composition to exhibit excellent retention strength and softening point characteristics in a low melt viscosity region, and the adhesive composition is suitable for viscous adhesives for a hygiene product, for which low viscosity performance and retention strength are required due to a relatively low coating temperature, for example. In addition, adhesive compositions each obtained by using a hydrogenated block copolymer composition in which a block copolymer composition having one of the above ranges of content has been hydrogenated are excellent in retention strength, thermal stability, and odor control at higher temperatures, and, for example, suitable for a portion for which a high cohesive force is required, such as a waist gather of a disposable diaper, and production processes which are likely to require prolonged residence of an adhesive composition in a processor/coater.

As another aspect, the content of the vinyl aromatic monomer unit in the component (a) and the component (b) is preferably 11 to 40% by mass, and more preferably 12 to 35% by mass based on the total amount of the component (a) and the component (b). The content of the vinyl aromatic monomer unit in the range tends to provide an adhesive composition which exhibits excellent tackiness, and the adhesive composition is suitable for, for example, tape/label applications, for which tackiness is relatively required.

The content of the vinyl aromatic monomer unit in the block copolymer can be measured by using a method described later in Examples.

[Viscosity in 15% by Mass Toluene Solution]

The viscosity in a 15% by mass toluene solution of the block copolymer composition according to the present embodiments is, as one aspect, preferably 10 to 90 mPa·s, more preferably 15 to 80 mPa·s, and more preferably 20 to 70 mPa·s. The viscosity in a 15% by mass toluene solution in the range tends to provide an adhesive composition having excellent melting characteristics, coatability and discharge stability and an excellent surface skin, and the adhesive composition is suitable for viscous adhesives for a hygiene product, for which low viscosity performance is required due to a relatively low coating temperature, for example. In addition, an adhesive composition obtained by using a hydrogenated block copolymer composition in which a block copolymer composition having the above range of viscosity in a 15% by mass toluene solution has been hydrogenated is excellent in retention strength, thermal stability, and odor control at higher temperatures, and, for example, suitable for a portion for which a high cohesive force is required, such as a waist gather of a disposable diaper, and production processes which are likely to require prolonged residence of an adhesive composition in a processor/coater.

As another aspect, the viscosity in a 15% by mass toluene solution of the block copolymer composition according to the present embodiments is preferably higher than 90 mPa·s and 600 mPa·s or lower, more preferably 100 to 500 mPa·s, more preferably 110 to 400 mPa·s, and further preferably 120 to 350 mPa·s. The viscosity in a 15% by mass toluene solution in the range tends to provide an adhesive composition excellent in balance between tackiness and retention strength, and the adhesive composition is suitable for, for example, tape/label applications, for which tackiness is relatively required. In addition, an adhesive composition obtained by using a hydrogenated block copolymer composition in which a block copolymer composition having the above range of viscosity in a 15% by mass toluene solution has been hydrogenated is excellent in retention strength, light resistance, and odor control at higher temperatures, and, for example, suitable for high tack applications and tape/label applications, for which tackiness is relatively required for a long period.

[Vinyl Bond Content in Conjugated Diene Monomer Unit]

In the case that a unhydrogenated block copolymer composition is used for the component (a) and/or the component (b), the vinyl bond content in the conjugated diene monomer unit in the component (a) and the component (b) is preferably less than 20% by mass, more preferably less than 18% by mass, and further preferably less than 15% by mass based on the total amount of the conjugated diene monomer unit in the component (a) and the component (b). In the case of using an unhydrogenated block copolymer composition, the vinyl bond content in the conjugated diene monomer unit of less than 20% by mass tends to provide characteristics excellent in thermal stability and weatherability.

In the case that a hydrogenated block copolymer composition is used for the component (a) and/or the component (b), the vinyl bond content before hydrogenation in the conjugated diene monomer unit in the component (a) and the component (b) is preferably 20% by mass or more and 90% by mass or less, more preferably 25% by mass or more and 80% by mass or less, and further preferably 30% by mass or more and 70% by mass or less based on the total amount of the conjugated diene monomer unit in the component (a) and the component (b). In the case of using a hydrogenated block copolymer composition, the vinyl bond content in the conjugated diene monomer unit of 20% by mass or more and 90% by mass or less tends to provide characteristics excellent in melting characteristics, coatability, tack and tack strength.

Here, a vinyl bond content refers to a percentage, before hydrogenation, of the total mass of a conjugated diene monomer unit incorporated in a bonding manner of 1,2-bond and 3,4-bond based on the total mass of a conjugated diene monomer unit incorporated in a bonding manner of 1,2-bond, 3,4-bond and 1,4-bond.

It is to be noted that the percentage, after hydrogenation, of the total mass of a conjugated diene monomer unit incorporated in a bonding manner of unhydrogenated 1,2-bond, hydrogenated 1,2-bond, unhydrogenated 3,4-bond and hydrogenated 3,4-bond based on the total mass of a conjugated diene monomer unit incorporated in a bonding manner of unhydrogenated 1,2-bond, hydrogenated 1,2-bond, unhydrogenated 3,4-bond, hydrogenated 3,4-bond, unhydrogenated 1,4-bond and hydrogenated 1,4-bond equals to the vinyl bond content in the conjugated diene monomer unit before hydrogenation. Therefore, the vinyl bond content in the conjugated diene monomer unit before hydrogenation can be measured in nuclear magnetic resonance spectrum analysis (NMR) of the block copolymer after hydrogenation, and specifically can be measured by using a method described later in Examples.

For adjusting the vinyl bond content in the conjugated diene monomer unit in the block copolymer composition, ethers or tertiary amines can be used, for example. Specifically is used one selected from ethylene glycol dimethyl ether, tetrahydrofuran, α-methoxytetrahydrofuran, N,N,N', N'-tetramethylethylenediamine and the like, or a mixture of two or more thereof. It is preferred to charge them into a polymerization solvent in advance before charging a conjugated diene monomer.

[Hydrogenation Ratio]

As one embodiment, the hydrogenation ratio in the conjugated diene monomer unit in the components (a) and (b) is preferably 20% by mass to 70% by mass, more preferably 25% by mass to 65% by mass, further preferably 30% by mass to 60% by mass, and still further preferably 35% by mass to 55% by mass based on the total amount of the conjugated diene monomer unit in the components (a) and (b). The hydrogenation ratio in the conjugated diene monomer unit in the range tends to enhance the viscous adhesion characteristics, melting characteristics, coatability, and high softening point characteristics, as well as the retention strength and thermal stability at higher temperatures.

As another embodiment, the hydrogenation ratio in the conjugated diene monomer unit in the components (a) and (b) is preferably more than 70% by mass, more preferably 75% by mass or more, and further preferably 80% by mass or more based on the total amount of the conjugated diene monomer unit in the components (a) and (b). The upper limit of the hydrogenation ratio in the conjugated diene monomer unit in this embodiment is not limited, but preferably 100% by mass or less. The hydrogenation ratio in the conjugated diene monomer unit in the range tends to enhance the thermal stability.

As a further embodiment, the hydrogenation ratio in the conjugated diene monomer unit in the components (a) and (b) is preferably less than 20% by mass, more preferably 10% by mass or less, further preferably 5% by mass or less, and particularly preferably 0% by mass, i.e., unhydrogenated, based on the total amount of the conjugated diene monomer unit in the components (a) and (b). The hydrogenation ratio in the range tends to make the low melt viscosity characteristics excellent and enhance melting characteristics and coatability.

The percentage of hydrogenated double bond in the conjugated diene monomer unit in the block copolymer can be measured by using a method described later in Examples.

In the case that the block copolymer composition according to the present invention has been hydrogenated, the value of the content of the vinyl aromatic monomer unit is almost unchanged before and after hydrogenation, and thus the value before hydrogenation is used for the content of the vinyl aromatic monomer unit. The viscosity in a 15% toluene solution is the value after hydrogenation.

[Method for Producing Block Copolymer Composition]
(Polymerization Reaction and Coupling Reaction)

Examples of a method for producing the block copolymer composition according to the present embodiments include a method including: a step of polymerizing including copolymerizing a vinyl aromatic hydrocarbon compound such as styrene and a conjugated diene compound such as butadiene in an inert hydrocarbon solvent with an organic lithium compound as a polymerization initiator to obtain a block copolymer; and a step of coupling including reacting the block copolymer obtained with a coupling agent to obtain the component (a) and the component (b). In this case, the coupled block copolymer is the component (b), and the uncoupled block copolymer is the component (a), for example. Here, controlling the amount of the coupling agent to be added in this coupling reaction enables to adjust the contents of the component (a) and the component (b) in the above predetermined ranges.

Alternatively, the block copolymer composition can be obtained by using a method in which the components (a) and (b) are separately polymerized in advance and thereafter mixed.

The weight average molecular weight of each of the components (a) and (b) can be adjusted by controlling the amount of an initiator such as an organic lithium compound. After the completion of a polymerization reaction, a coupling reaction is performed and the active species are deactivated by adding water, an alcohol, an acid or the like; and the polymerization solvent is separated by performing, for example, steam stripping; and thereafter the components (a) and (b) can be obtained by drying the resultant.

The method for polymerizing the block copolymers as the components (a) and (b) is not limited, and examples thereof include coordination polymerization, anionic polymerization and cationic polymerization. Among them, anionic polymerization is preferred from the viewpoint of easiness in controlling the structure.

For the method for producing the block copolymer components through anionic polymerization can be used known methods without any limitation, and examples thereof include methods described in Japanese Patent Publication No. 36-19286, Japanese Patent Publication No. 43-17979, Japanese Patent Publication No. 46-32415, Japanese Patent Publication No. 49-36975, Japanese Patent Publication No. 48-2423, Japanese Patent Publication No. 48-4106, Japanese Patent Publication No. 56-28925, Japanese Patent Laid-Open No. 59-166518, and Japanese Patent Laid-Open No. 60-186577.

The inert hydrocarbon solvent to be used in the step of polymerizing the components (a) and (b) is not limited, and examples thereof include hydrocarbon solvents of an aliphatic hydrocarbon such as butane, pentane, hexane, isopentane, heptane, octane and isooctane; an alicyclic hydrocarbon such as cyclopentane, methylcyclopentane, cyclohexane, methylcyclohexane and ethylcyclohexane; and an aromatic hydrocarbon such as benzene, toluene, ethylbenzene and xylene. One of them may be used singly, or two or more thereof may be used in a mixture.

The organic lithium compound to be used for a polymerization initiator in the step of polymerizing the components (a) and (b) is not limited, and known compounds may be used. Examples thereof include ethyllithium, propyllithium, n-butyllithium, sec-butyllithium, tert-butyllithium, phenyllithium, propenyllithium and hexyllithium. In particular, n-butyllithium and sec-butyllithium are preferred. One of the organic lithium compounds may be used singly, or a mixture of two or more thereof may be used.

By using the above-described method, the components (a) and (b) can be each obtained as a block copolymer represented by any one of the following formulas:

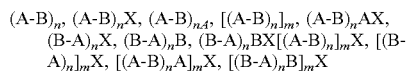

(in which, A denotes a polymer block (A); B denotes a polymer block (B); X denotes a residue of a coupling agent or a residue of a polymerization initiator; n is an integer of 1 or more, and preferably an integer of 1 to 5; and m is 2 to 8, preferably 2 to 6, and more preferably an integer of 2 to 4.).

Among them, it is preferred to produce a block copolymer (a): formula (A-B) and a multibranched block copolymer (b): formula $(A-B)_m X$ through the above coupling reaction.

For the coupling agent to obtain a multibranched block copolymer may be used known coupling agents.

The bifunctional coupling agent is not limited, and examples thereof include bifunctional halogenated silanes such as dichlorosilane, monomethyldichlorosilane and dimethyldichlorosilane; bifunctional alkoxysilanes such as diphenyldimethoxysilane, diphenyldiethoxysilane, dimethyldimethoxysilane and dimethyldiethoxysilane; bifunctional halogenated alkanes such as dichloroethane, dibromoethane, methylene chloride and dibromomethane; bifunctional halogenated tins such as dichlorotin, monomethyldichlorotin, dimethyldichlorotin, monoethyldichlorotin, diethyldichlorotin, monobutyldichlorotin and dibutyldichlorotin; dibromobenzene, benzoic acid, CO, and 2-chloropropene.

The trifunctional coupling agent is not limited, and examples thereof include trifunctional halogenated alkanes such as trichloroethane and trichloropropane; trifunctional halogenated silanes such as methyltrichlorosilane and ethyltrichlorosilane; and trifunctional alkoxysinales such as methyltrimethoxysilane, phenyltrimethoxysilane and phenyltriethoxysilane.

The tetrafunctional coupling agent is not limited, and examples thereof include tetrafunctional halogenated alkanes such as carbon tetrachloride, carbon tetrabromide and tetrachloroethane; tetrafunctional halogenated silanes such as tetrachlorosilane and tetrabromosilane; tetrafunctional alkoxysilanes such as tetramethoxysilane and tetraethoxysilane; and tetrafunctional tin compounds such as tetrachlorotin, tetrabromotin and tetrabutyltin.

The coupling agent with 5 or more functionalities is not limited, and examples thereof include 1,1,1,2,2-pentachloroethane, perchloroethane, pentachlorobenzene, perchlorobenzene, octabromodiphenyl ether and decabromodiphenyl ether. In addition, epoxidized soybean oils, di- to hexafunctional epoxy group-containing compounds, carboxylates and polyvinyl compounds such as divinyl benzene may be used. One of the coupling agents may be used singly, or two or more thereof may be used in combination.

Among above compounds, tetramethoxysilane and tetraethoxysilane are particularly preferred.

The ratios of an area for the component (b-1), the component (b-2) and the component (b-3) in the component (b) in a GPC elution curve can be controlled on the basis of the amount of a coupling agent to be added, the temperature and the duration in a coupling reaction, as described above. Specifically, examples of the method for adjustment in the case that the coupling agent is an alkoxysilane compound include a method in which the duration from the time at which the reaction temperature reaches to the maximum temperature to the time at which the coupling agent is added is adjusted to 1 to 30 minutes, the reaction duration for the coupling agent is adjusted to 1 to 60 minutes, the reaction temperature is adjusted to 55 to 100° C., and the amount of the coupling agent to be added is adjusted to 0.025 to 0.30 in mole ratio to the total amount by mole of a polymerization initiator. Examples of the method for adjustment in the case that the coupling agent is a compound other than alkoxysilane compounds include a method in which the duration from the time at which the reaction temperature reaches to the maximum temperature to the time at which the coupling agent is added is adjusted to 1 to 30 minutes, the reaction duration for the coupling agent is adjusted to 1 to 35 minutes, the reaction temperature is adjusted to 50 to 95° C., and the amount of the coupling agent to be added is adjusted to 0.025 to 0.20 in mole ratio to the total amount by mole of a polymerization initiator.

In addition, a deactivator may be added in the course of polymerizing the component (a) as the block copolymer. In this case, a component (a)' with a relatively low molecular weight is generated. Specifically, after polymerizing the vinyl aromatic monomer unit, a deactivator may be added at an arbitrary timing during polymerizing the conjugated diene monomer unit in an amount to deactivates 50% by mass or less of the conjugated diene monomer unit, without completely deactivating, to generate a diblock copolymer (a)' represented by the general formula (A-B') (in which B' denotes a polymer block (B) obtained by the deactivation during the polymerization). The content of the diblock copolymer represented by the general formula (A-B') is preferably 20% by mass or less, more preferably 15% by mass or less, and further preferably 10% by mass or less based on the total amount of the block copolymer composition. The diblock copolymer (a)' represented by the general formula (A-B') contained tends to further lower the melt viscosity. In addition, the diblock copolymer (a)' tends to enhance the tack strength and retention strength due to a large content of the polymer block (A).

(Hydrogenation Reaction)

In the case that a part or all of the unsaturated double bonds derived from the conjugated diene compound in the component (a) and the component (b) are hydrogenated, the method for hydrogenation is not limited, and hydrogenation may be performed by using a known method with a hydrogenation catalyst.

The hydrogenation catalyst is not limited, and known catalysts may be used. Examples of the hydrogenation catalyst to be used include supported heterogeneous hydrogenation catalysts in which a metal such as Ni, Pt, Pd and Ru is supported on carbon, silica, alumina, diatomaceous earth or the like; what is called Ziegler-type hydrogenation catalysts with a transition metal salt such as an organic salt or acetylacetone salt of Ni, Co, Fe, Cr or the like, and a reductant such as an organic aluminum; homogenous hydrogenation catalysts such as what is called an organic metal complex such as an organic metal compound of Ti, Ru, Rh, Zr or the like.

Specifically may be used hydrogenation catalysts described in Japanese Patent Publication No. 42-8704, Japanese Patent Publication No. 43-6636, Japanese Patent Publication No. 63-4841, Japanese Patent Publication No. 1-37970, Japanese Patent Publication No. 1-53851 and Japanese Patent Publication No. 2-9041.

Among them, suitable examples of the hydrogenation catalyst include titanocene compounds, reductive organic metal compounds and mixtures thereof.

The titanocene compound is not limited, and examples thereof include compounds described in Japanese Patent Laid-Open No. 8-109219. Specific examples thereof include compounds having at least one or more ligands with a (substituted) cyclopentadienyl skeleton such as biscyclopentadienyltitanium dichloride and monopentamethylcyclopentadienyltitanium trichloride, an indenyl skeleton or a fluorenyl skeleton.

The reductive organic metal compound is not limited, and examples thereof include organic alkali metal compounds such as organic lithiums, organic magnesium compounds, organic aluminum compounds, organic boron compounds and organic zinc compounds.

The hydrogenation reaction temperature is preferably 0 to 200° C., and more preferably 30 to 150° C. The pressure of a hydrogen to be used in the hydrogenation reaction is preferably 0.1 to 15 MPa, more preferably 0.2 to 10 MPa, and further preferably 0.3 to 5 MPa. The hydrogenation reaction duration is preferably 3 minutes to 10 hours, and more preferably 10 minutes to 5 hours.

The hydrogenation reaction may be performed in any of a batch process, a continuous process, and a combination thereof.

The block copolymer composition can be obtained by removing the catalyst residue and separating a solvent from the block copolymer solution resulting from the hydrogenation reaction, as necessary. The method for separating the solvent is not limited, and examples thereof include a method in which a polar solvent which serves as a poor solvent to the hydrogenated block copolymer, such as acetone and an alcohol, is added to the reaction solution after the hydrogenation to precipitate the polymer for recovery; a method in which the reaction solution after the hydrogenation is charged into a hot water under stirring and the solvent is removed by using steam stripping for recovery; and a method in which the reaction solution after the hydrogenation is heated to distil away the solvent.

The amount (% by mass) of the polymer block (A) based on the total amount (100% by mass) of the vinyl aromatic monomer unit used for polymerizing the block copolymers, i.e., the block percentage, is preferably 90% by mass or more, more preferably 95% by mass or more, and further preferably 97% by mass or more. The brock percentage in the range tends to provide a block copolymer composition excellent in finishing characteristics, and an adhesive composition containing the block copolymer composition tends to be excellent in tack strength and retention strength.

The amount of the polymer block of the vinyl aromatic monomer can be calculated as follows: the block copolymer is dissolved in chloroform and an osmic acid/tert-butyl hydroperoxide solution is added thereto to break the double bonds in the butadiene component; next, methanol is added thereto, the resultant is filtrated, and the residue is dissolved in chloroform; and the content of the block styrene is calculated from the peak strength (absorption wave length: 262 nm) of the solution obtained with an ultraviolet spectrophotometer.

A step of demineralizing metals derived from the polymerization initiator or the like may be employed, as necessary, in the method for producing the block copolymer composition according to the present embodiments. In addition, a step of adding an antioxidant, a neutralizer, a surfactant or the like may be employed, as necessary, in the method for producing the block copolymer composition according to the present embodiments.

The antioxidant is not limited, and examples thereof include hindered phenol compounds, phosphorous compounds and sulfur compounds, as described later.

The neutralizer is not limited, and examples thereof include various metal salts of stearic acid, hydrotalcite and benzoic acid.

The surfactant is not limited, and examples thereof include anionic surfactants, nonionic surfactants and cationic surfactants. The anionic surfactant is not limited, and examples thereof include fatty acid salts, alkylsulfates and alkylarylsulfonates. The nonionic surfactant is not limited, and examples thereof include polyoxyethylene alkyl ethers and polyoxyethylene alkylaryl ethers. The cationic surfactant is not limited, and examples thereof include alkylamine salts and quaternary ammonium salts.

The block copolymer composition according to the present embodiments, which can be produced as described above, may contain what is called a modified block copolymer in which a polar group-containing functional group containing an atom selected from nitrogen, oxygen, silicon, phosphorus, sulfur and tin is bonding to the block copolymer, or a modified block copolymer the block copolymer component of which has been modified with a modifying agent such as maleic anhydride. Such a modified block copolymer can be obtained by performing a known modification reaction for the components (a) and (b).

The method for imparting these functional groups is not limited, and examples thereof include a method in which a functional group is added to a polymer by using a compound having a functional group for an initiator, a monomer, a coupling agent or a terminator.

For the initiator having a functional group are preferred initiators containing an N group, and examples thereof include dioctylaminolithium, di-2-ethylhexylaminolithium, ethylbenzylaminolithium, (3-(dibutylamino)-propyl)lithium and piperidinolithium.

Examples of the monomer having a functional group include compounds in which a hydroxy group, an acid anhydride group, an epoxy group, an amino group, an amide group, a silanol group or an alkoxysilane group is contained in the above-described monomer to be used for polymerization. Among them, monomers containing an N group are preferred, and examples thereof include N,N-dimethylvinylbenzylamine, N,N-diethylvinylbenzylamine, N,N-dipropylvinylbenzylamine, N,N-dibutylvinylbenzylamine, N,N-diphenylvinylbenzylamine, 2-dimethylaminoethylstyrene, 2-diethylaminoethylstyrene, 2-bis(trimethylsilyl)aminoethylstyrene, 1-(4-N,N-dimethylaminophenyl)-1-phenylethylene, N,N-dimethyl-2-(4-vinylbenzyloxy)ethylamine, 4-(2-pyrrolidinoethyl)styrene, 4-(2-piperidinoethyl)styrene, 4-(2-hexamethyleneiminoethyl)styrene, 4-(2-morpholinoethyl)styrene, 4-(2-thiazinoethyl)styrene, 4-(2-N-methylpiperazinoethyl)styrene, 1-((4-vinylphenoxy)methyl)pyrrolidine, and 1-(4-vinylbenzyloxymethyl)pyrrolidine.

Examples of the coupling agent and terminator having a functional group include compounds in which a hydroxy group, an acid anhydride group, an epoxy group, an amino group, an amide group, a silanol group or an alkoxysilane group is contained in the above-described coupling agent. Among them, coupling agents containing an N group or an O group are preferred, and examples thereof include tetraglycidyl m-xylenediamine, tetraglycidyl-1,3-bisaminomethylcyclohexane, tetraglycidyl-p-phenylenediamine, tetraglycidyl diaminodiphenylmethane, diglycidylaniline, γ-caprolactone, γ-glycidoxyethyltrimethoxysilane, γ-glycidoxypropyltrimethoxysilane, γ-glycidoxypropyltriphenoxysilane, γ-glycidoxypropylmethyldimethoxysilane, γ-glycidoxypropyldiethylethoxysilane, 1,3-dimethyl-2-imidazolidinone, 1,3-diethyl-2-imidazolidinone, N,N'-dimethylpropyleneurea, and N-methylpyrrolidone.

After producing the block copolymers as the components (a) and (b) constituting the block copolymer according to the present embodiments as described above, the block copolymers are isolated, i.e., finished by using a method described later.

In the case that the step of polymerizing the components (a) and (b) has been performed in an inert hydrocarbon solvent, the inert hydrocarbon solvent is removed to isolate the block polymers. Specific examples of the method for removing the solvent include steam stripping. A hydrous crumb is obtained by using steam stripping, and the hydrous crumb is dried to obtain the block copolymers.

In steam stripping, it is preferred to use a surfactant as a crumb-forming agent. The surfactant is not limited, and examples thereof include the above-described anionic surfactants, cationic surfactants and nonionic surfactants. These surfactants may be added typically in an amount of 0.1 to 3000 ppm relative to water in the stripping zone. Further, a water-soluble salt of a metal such as Li, Na, Mg, Ca, Al and Zn may be used as a dispersion aid for the crumb in addition to the surfactant.

The concentration of the crumb-like block copolymer dispersed in water resulting from the step of polymerizing the block copolymer and the steam stripping is typically 0.1 to 20% by mass (percentage relative to water in the stripping zone). This range provides a crumb having a satisfactory particle diameter without any trouble in operation. It is preferred to adjust the water content of the crumb of the block copolymer to 1 to 30% by mass though dehydration and then dry the crumb until the water content reaches to 1% by mass or less.

In the step of dehydrating the crumb, dehydration may be performed with a roll, a Banbury dehydrator, or a compression dehydrator such as a screw-extruding press dehydrator, or dehydration and drying may be performed simultaneously with a conveyer-type or box-type hot air dryer.

[Adhesive Composition]

The adhesive composition according to the present embodiments contains 100 parts by mass of the above-described block copolymer composition, 50 to 400 parts by mass of a tackifier described later, 10 to 200 parts by mass of a softener described later, and, as necessary, other components described later. This allows the adhesive composition to have excellent tackiness, tack strength, melting characteristics, coatability and discharge stability and an excellent surface skin.

In the case that a styrene-butadiene block copolymer, a styrene-isoprene block copolymer, a hydrogenated styrene-butadiene block copolymer, a hydrogenated styrene-isoprene block copolymer or the like other than the block copolymer to be used in the present embodiments is added, 50 to 400 parts by mass of a tackifier described later and 10 to 200 parts by mass of a softener shall be contained on the basis of 100 parts by mass of the total content of the block copolymer other than those according to the present embodiments and the component (a) and component (b) according to the present embodiments.

It is preferred to select the weight average molecular weight of each of the components (a) and (b) in the block copolymer composition depending on the application, and adjust the amounts of various components such as a tackifier and a softener to be blended.

(Tackifier)

The tackifier may be widely selected depending on the application of and required performance for the adhesive composition to be obtained. The tackifier is not limited, and examples thereof include rosin compounds such as natural rosins, modified rosins, glycerol esters of a natural rosin, glycerol esters of a modified rosin, pentaerythritol esters of a natural rosin, pentaerythritol esters of a modified rosin, hydrogenated rosins and pentaerythritol esters of a hydrogenated rosin; terpene compounds such as copolymers of a natural terpene, three-dimensional polymers of a natural terpene, aromatic modified terpene resins, hydrogenated derivatives of an aromatic modified terpene resin, terpene-phenol resins, hydrogenated derivatives of a terpene-phenol resin, terpene resins (e.g., monoterpenes, diterpenes, triterpenes and polyterpenes), hydrogenated terpene resins and hydrogenated derivatives of a hydrogenated terpene resin; petroleum hydrocarbon compounds such as aliphatic petroleum hydrocarbon resins (C5 resins), hydrogenated derivatives of an aliphatic petroleum hydrocarbon resin, aromatic petroleum hydrocarbon resins (C9 resins), hydrogenated derivatives of an aromatic petroleum hydrocarbon resin, dicyclopentadiene resins, hydrogenated derivatives of a dicyclopentadiene resin, C5/C9 copolymer resins, hydrogenated derivatives of a C5/C9 copolymer resin, cyclic aliphatic petroleum hydrocarbon resins and hydrogenated derivatives of a cyclic aliphatic petroleum hydrocarbon resin; and aromatic group-containing resins. One of these tackifiers may be used singly, or two or more thereof may be used in combination. Here, a C5/C9 copolymer resin refers to a copolymer petroleum resin obtained by polymerizing a mixture of a C5 fraction and C9 fraction as the starting material.

For the tackifier may also be used a liquid tackifier which has a color tone of colorless to pale yellow, substantially no odor and satisfactory thermal stability.

Now, preferred tackifiers for various applications and performances will be described more specifically.

(Tackifier of Hydrogenated Derivative)

From the viewpoint of suppression of coloration and less odor, hydrogenated derivatives are preferred for the tackifier. The hydrogenated derivative is not limited, and examples thereof include hydrogenated derivatives of an aromatic modified terpene resin, hydrogenated derivatives of a terpene-phenol resin, hydrogenated derivatives of a hydrogenated terpene resin, hydrogenated derivatives of an aliphatic petroleum hydrocarbon resin (C5 resin), hydrogenated derivatives of an aromatic petroleum hydrocarbon resin (C9 resin), hydrogenated derivatives of a dicyclopentadiene resin, hydrogenated derivatives of a C5/C9 copolymer resin and hydrogenated derivatives of a cyclic aliphatic petroleum hydrocarbon resin. Among them, hydrogenated derivatives of an aromatic petroleum hydrocarbon resin (C9 resin), hydrogenated derivatives of a dicyclopentadiene resin and hydrogenated derivatives of a hydrogenated terpene resin are particularly preferred, for example. The commercial product of such a hydrogenated derivative is not limited, and examples thereof include ARKON P and M Series (trade name) manufactured by Arakawa Chemical Industries, Ltd., I-MARV S and P series manufactured by Idemitsu Kosan Co., Ltd., ESCOREZ 5000 series (trade name) manufactured by ExxonMobil Chemical and CLEARON P series manufactured by YASUHARA CHEMICAL CO., LTD.

(Tackifier Other than Hydrogenated Derivatives)

The tackifier other than hydrogenated derivatives is not limited, and examples thereof include natural rosins, modified rosins, glycerol esters of a natural rosin, glycerol esters of a modified rosin, pentaerythritol esters of a natural rosin, pentaerythritol esters of a modified rosin, hydrogenated rosins and pentaerythritol esters of a hydrogenated rosin; copolymers of a natural terpene, three-dimensional polymers of a natural terpene, aromatic modified terpene resins, terpene-phenol resins, terpene resins and hydrogenated terpene resins; and aliphatic petroleum hydrocarbon resins (C5 resins), aromatic petroleum hydrocarbon resins (C9 resins), dicyclopentadiene resins, C5/C9 copolymer resins and cyclic aliphatic petroleum hydrocarbon resins. Among them are preferred aliphatic petroleum hydrocarbon resins (C5 resins), aromatic petroleum hydrocarbon resins (C9 resins), C5/C9 copolymer resins, cyclic aliphatic petroleum hydrocarbon resins, terpene resins, natural and modified rosin esters, and mixtures thereof. Examples of the commercial product include: for the aliphatic petroleum hydrocarbon resin (C5 resin), Quintone 100 series (trade name) manufactured by Zeon Corporation, ESCOREZ 1000 series manufactured by ExxonMobil Chemical and WINGTACK series (trade name) manufactured by Cray Valley; for the aromatic petroleum hydrocarbon resin (C9 resin) and C5/C9 copolymer resin, PICCOTAC series (trade name) manufactured by Eastman Chemical Company, ESCOREZ 2000 series (trade name) manufactured by ExxonMobil Chemical and FIR series (trade name) manufactured by Mitsui Chemicals, Inc.; for the terpene resin and natural and modified rosin ester, SYLVALITE series and SYLVARES series (trade name) manufactured by Arizona Chemical Company, LLC., and PICCOLYTE series (trade name) manufactured by Pinova, Inc.

(Aliphatic Tackifier)

From the viewpoint of obtaining a adhesive composition having high tackiness and high retention strength, and economic efficiency, an aliphatic tackifier is preferably used for the tackifier. The aliphatic tackifier is not limited, and examples thereof include aliphatic petroleum hydrocarbon resins (C5 resins), hydrogenated derivatives of an aliphatic petroleum hydrocarbon resin (C5 resin), C5/C9 copolymer resins and hydrogenated derivatives of a C5/C9 copolymer resin. Here, an aliphatic tackifier refers to a tackifier in which the content of aliphatic hydrocarbon group is preferably 50% by mass or more, more preferably 70% by mass or more, further preferably 80% by mass or more, still further preferably 88% by mass or more, and furthermore preferably 95% by mass or more. The content of aliphatic hydrocarbon group in the range tends to enhance the tackiness, retention strength and economic efficiency.

The aliphatic tackifier can be produced by homopolymerizing or copolymerizing monomers each having an aliphatic group and a polymerizable unsaturated group. The monomer having an aliphatic group and a polymerizable unsaturated group is not limited, and examples thereof include natural and synthetic terpenes containing a C5 cyclopentyl or C6 cyclohexyl group. Other monomers which can be used in the copolymerization are not limited, and examples thereof include 1,3-butadiene, cis-1,3-pentadiene, trans-1,3-pentadiene, 2-methyl-1,3-butadiene, 2-methyl-2-butene, cyclopentadiene, dicyclopentadiene, terpenes and terpene-phenol resins.

(Aromatic Tackifier)

From the viewpoint of obtaining an adhesive composition having high adhesion strength and high coatability, an aromatic tackifier is preferably used for the tackifier. The aromatic tackifier is not limited, and examples thereof include aromatic petroleum hydrocarbon resins (C9 resins) and C5/C9 copolymer resins. Here, an aromatic tackifier refers to a tackifier in which the content of aromatic hydrocarbon group is preferably 50% by mass or more, more preferably 70% by mass or more, further preferably 80% by mass or more, still further preferably 88% by mass or more, and furthermore preferably 95% by mass or more. The content of aromatic hydrocarbon group in the range tends to enhance the tack strength and coatability.

The aromatic tackifier can be produced by homopolymerizing or copolymerizing monomers each having an aromatic group and a polymerizable unsaturated group. The monomer having an aromatic group and a polymerizable unsaturated group is not limited, and examples thereof include styrene, α-methylstyrene, vinyltoluene, methoxystyrene, tert-butylstyrene, chlorostyrene and an indene monomer (including methylindene). Other monomers which can be used in the copolymerization are not limited, and examples thereof include 1,3-butadiene, cis-1,3-pentadiene, trans-1,3-pentadiene, 2-methyl-1,3-butadiene, 2-methyl-2-butene, cyclopentadiene, dicyclopentadiene, terpenes and terpene-phenol resins.

(Tackifier Having Affinity for Glass Phase Block (e.g., Polymer Block (A)) and/or Non-Glass Phase Block (e.g., Polymer Block (B)) of Block Copolymers)

From the viewpoint of high adhesion strength, inhibition of change in adhesion strength over time and creep performance (smaller value is better), it is more preferable that the adhesive composition contain 20 to 75% by mass of a tackifier having affinity for a non-glass phase block (typically, an intermediate block) of the block copolymers, and 3 to 30% by mass of a tackifier having affinity for a glass phase block (typically, an outer block) of the block copolymers. Here, the block copolymers refer to the components (a) and (b).

The tackifier having affinity for a glass phase block of the block copolymers is not limited, but is preferably a resin having an aromatic ring between the molecules. The resin is not limited, and examples thereof include aromatic group-containing resins such as homopolymers or copolymers containing vinyltoluene, styrene, α-methylstyrene, coumarone or indene as a constitutional unit. Among them, Kristalex and Plastolyn (manufactured by Eastman Chemical Company, trade name) containing α-methylstyrene are preferred.

The content of the tackifier having affinity for a glass phase of the block copolymers is preferably 3 to 30% by mass, more preferably 5 to 20% by mass, and further preferably 6 to 12% by mass based on 100% by mass of the adhesive composition.

From the viewpoint of high initial adhesion strength, high wettability, the low melt viscosity or high coatability of the adhesive composition, and the like, a petroleum resin having an aromatics content of 3 to 12% by mass is preferably used for the tackifier. The petroleum resin is not limited, and examples thereof include aliphatic petroleum hydrocarbon resins (C5 resins), hydrogenated derivatives of an aliphatic petroleum hydrocarbon resin (C5 resin), aromatic petroleum hydrocarbon resins (C9 resins), hydrogenated derivatives of an aromatic petroleum hydrocarbon resin (C9 resin), dicyclopentadiene resins, hydrogenated derivatives of a dicyclopentadiene resin, C5/C9 copolymer resins, hydrogenated derivatives of a C5/C9 copolymer resin, cyclic aliphatic petroleum hydrocarbon resins and hydrogenated derivatives of a cyclic aliphatic petroleum hydrocarbon resin. The aromatics content of the petroleum resin is preferably 3 to 12% by mass, and more preferably 4 to 10% by mass. Among them, hydrogenated petroleum resins are particularly preferred.

The content of the tackifier is 50 to 400 parts by mass based on 100 parts by mass of the block copolymer composition, and may be widely selected depending on the application of and required performance for the adhesive composition to be obtained.

As one aspect, the content of the tackifier is preferably 120 to 380 parts by mass, more preferably 150 to 350 parts by mass, and further preferably 170 to 330 parts by mass based on 100 parts by mass of the block copolymer composition. The content of the tackifier in the range tends to provide an adhesive composition having excellent melting characteristics, coatability and discharge stability, and homogeneous gloss, and having a surface skin with no roughness or unevenness, for example, without waviness, cloudiness, streaks or satin, and the adhesive composition is suitable for viscous adhesives for a hygiene product, for which low viscosity performance is required due to a relatively low coating temperature, for example. In addition, adhesive compositions each obtained by using a block copolymer composition containing a hydrogenated block copolymer for the component (a) and/or the component (b) are excellent in retention strength, thermal stability, and odor control at higher temperatures, and, for example, suitable for a portion for which a high cohesive force is required, such as a waist gather of a disposable diaper, and production processes which are likely to require prolonged residence of an adhesive composition in a processor/coater.

As another aspect, the content of the tackifier is preferably 50 to 350 parts by mass, more preferably 50 to 300 parts by mass, and further preferably 50 to 250 parts by mass based on 100 parts by mass of the block copolymer composition. The content of the tackifier in the range tends to provide an adhesive composition excellent in balance between tackiness and retention strength, and the adhesive composition is suitable for, for example, tape/label applications, for which tackiness is relatively required. In addition, adhesive compositions each obtained by using a block copolymer composition containing a hydrogenated block copolymer for the component (a) and/or the component (b) are excellent in retention strength, light resistance, and odor control at higher temperatures, and, for example, suitable for high tack applications and tape/label applications, for which tackiness is relatively required for a long period.

(Softener)

A "softener" refers to a substance having a function to lower the hardness of an adhesive composition and lower the viscosity. The softener is not limited, and examples thereof include oils; plasticizers; synthetic liquid oligomers; and mixtures thereof.

Now, preferred softeners for various applications and performances will be described more specifically.

From the viewpoint of lowering of viscosity, enhancement of tackiness and lowering of hardness for the adhesive composition, oils may be used. The oil is not limited, and examples thereof include known paraffin process oils, naphthene process oils and aromatic process oils; and mixed oils thereof.

In the case that the adhesive composition is used for a percutaneous absorption type formulation, a plasticizer may be used for the softener from the viewpoint of enhancement of transdermal absorbability and storage stability, and enhancing the drug solubility in the adhesive composition. The (liquid) plasticizer is not limited, and examples thereof include a liquid paraffin; fatty acid esters consisting of a $C_{12-16}$ higher fatty acid and a $C_{1-4}$ lower monohydric alcohol such as isopropyl myristate, ethyl laurate and isopropyl palmitate; $C_{8-10}$ fatty acids; glycols such as ethylene glycol, diethylene glycol, triethylene glycol, polyethylene glycol, propylene glycol and polypropylene glycol; oils and fats such as olive oil, castor oil, squalene and lanolin; organic solvents such as ethyl acetate, ethyl alcohol, dimethyldecyl sulfoxide, decylmethyl sulfoxide, dimethyl sulfoxide, dimethyl formamide, dimethyl acetamide, dimethyl laurylamide, dodecyl pyrrolidone, isosorbitol, oleyl alcohol and lauric acid; liquid surfactants; ethoxylated stearyl alcohol, glycerin esters, isotridecyl myristate, N-methylpyrrolidone, ethyl oleate, oleic acid, diisopropyl adipate, octyl palmitate, 1,3-propanediol, and glycerin. Among them, a compound which is liquid at a normal temperature is used. One of the plasticizers may be used singly, or two or more thereof may be used in combination.

Among the plasticizers, glycerin esters are preferred, and medium-chain fatty acid triglycerides, which are each an ester of a $C_{8-10}$ fatty acid and glycerin, are more preferred. Examples of the medium-chain fatty acid triglyceride include tri(caprylic acid/capric acid)glyceryl.

In the case that the adhesive composition and a pressure-sensitive adhesive tape are used for a medical pressure-sensitive adhesive tape such as a taping tape, it is preferred to use a liquid paraffin and another liquid plasticizer in combination as a plasticizer.

The content of the liquid plasticizer is preferably 3% by mass or more and 30% by mass or less, more preferably 3% by mass or more and 20% by mass or less, and further preferably 3% by mass or more and 10% by mass or less based on the total amount of the adhesive composition. The content of the liquid plasticizer of 3% by mass or more enhances the transdermal absorbability and storage stability, and the drug solubility in the adhesive composition tends to be enhanced. In addition, the content of the liquid plasticizer of 30% by mass or less tends to enhance the cohesive force of the adhesive composition.

If the adhesive composition is required to be more flexible, a synthetic liquid oligomer may be used from the viewpoint of improvement in bleeding characteristics. The synthetic liquid oligomer is not limited, and examples thereof include styrene oligomers, butadiene oligomers, isoprene oligomers and butene oligomers.

The commercial product of such a softener is not limited, and examples thereof include Diana Frecia S32 (trade name), Diana Process Oil PW-90 (trade name), Process Oil NS100 (trade name) and Process Oil NS90S (trade name) manufactured by Idemitsu Kosan Co., Ltd.; White Oil Broom 350 (trade name) manufactured by Kukdong Oil & Chemical Co., Ltd; DN Oil KP-68 (trade name); Enerper M1930 (trade name) manufactured by B.P. Chemicals; Kaydol (trade name) manufactured by Crompton Corp.; Primol 352 (trade name) manufactured by Esso; and KN4010 (trade name) manufactured by PetroChina Company Limited.

The content of the softener is 10 to 200 parts by mass based on 100 parts by mass of the block copolymer composition, and may be widely selected depending on the application of and required performance for the adhesive composition to be obtained.

As one aspect, the content of the softener is preferably 50 to 190 parts by mass, more preferably 70 to 180 parts by mass, further preferably 80 to 150 parts by mass, and further preferably 90 to 140 parts by mass based on 100 parts by mass of the block copolymer composition. The content of the softener in the range tends to provide an adhesive composition having excellent melting characteristics, coatability and discharge stability, and an excellent surface skin, and the adhesive composition is suitable for viscous adhesives for a hygiene product, for which low viscosity performance is required due to a relatively low coating temperature, for example. In addition, adhesive compositions each obtained by using a block copolymer composition containing a hydrogenated block copolymer for the component (a) and/or the component (b) are excellent in retention strength, thermal stability, and odor control at higher temperatures, and, for example, suitable for a portion for which a high cohesive force is required, such as a waist gather of a disposable diaper, and production processes which are likely to require prolonged residence of an adhesive composition in a processor/coater.

As another aspect, the content of the softener is preferably 10 to 170 parts by mass, more preferably 10 to 150 parts by mass, further preferably 15 to 140 parts by mass, and still further preferably 20 to 130 parts by mass based on 100 parts by mass of the block copolymer composition. The content of the softener in the range tends to provide an adhesive composition excellent in balance between tackiness and retention strength, and the adhesive composition is suitable for, for example, tape/label applications, for which tackiness is relatively required. In addition, a adhesive composition obtained by using a block copolymer composition containing a hydrogenated block copolymer for the component (a) and/or the component (b) is excellent in retention strength, light resistance, and odor control at higher temperatures, and, for example, suitable for high tack applications and tape/label applications, for which tackiness is relatively required for a long period.

(Other Components)

The adhesive composition according to the present embodiments may contain an antioxidant, a polymer other than the components (a) and (b), a wax, a stabilizer such as a light stabilizer, or another additive, as necessary.

(Antioxidant)

The antioxidant is not limited, and examples thereof include hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis [(octylthio)methyl]-0-cresol, 2-t-butyl-6-(3-t-butyl-2-hydroxy-5-methylbenzyl)-4-methylphenylacrylate, 2,4-di-t-amyl-6-[1-(3,5-di-t-amyl-2-hydroxyphenyl)ethyl] phenylacrylate and 2-[1-(2-hydroxy-3,5-di-tert-pentylphenyl)]acrylate; sulfur-containing antioxidants such as dilauryl thiodipropionate, laurylstearyl thiodipropionate pentaerythritol-tetrakis(β-laurylthiopropionate); and phosphorous-containing antioxidants such as tris(nonylphenyl) phosphite and tris(2,4-di-t-butylphenyl) phosphite.

Examples of the commercial product of the antioxidant include SUMILIZER GM (trade name), SUMILIZER TPD (trade name) and SUMILIZER TPS (trade name) manufactured by Sumitomo Chemical Co., Ltd.; IRGANOX 1010 (trade name), IRGANOX HP2225FF (trade name), IRGAFOS 168 (trade name) and IRGANOX 1520 (trade name) manufactured by Ciba Specialty Chemicals Inc.; and JF77 (trade name) manufactured by Johoku Chemical Co., Ltd. One of these stabilizers may be used singly, or two or more thereof may be used in combination.

Although the antioxidant may be contained at any content, the content is preferably 5 parts by mass or less based on 100 parts by mass of the adhesive composition.

(Polymer Other than Component (a) and Component (b))

The polymer other than the component (a) and the component (b) is not limited, and examples thereof include polyolefin copolymers, vinyl aromatic copolymers and other rubbers. Note that "other than the component (a) and the component (b)" means, in the present specification, that the substance is neither the component (a) nor the component (b).

The polyolefin copolymer is not limited, and examples thereof include atactic polypropylenes, ethylene-ethyl acrylate copolymers and α-olefin polymers.

The vinyl aromatic copolymer is not limited, and examples thereof include polymers such as styrene-ethylene block copolymers, styrene-butadiene block copolymers, styrene-propylene block copolymers, styrene-isoprene block copolymers, styrene-butadiene-isoprene block copolymers, styrene-butadiene/isoprene block copolymers, hydrogenated styrene-butadiene block copolymers, hydrogenated styrene-isoprene block copolymers, hydrogenated styrene-butadiene-isoprene block copolymers and hydrogenated styrene-butadiene/isoprene block copolymers; with the proviso that the polymers are neither the component (a) nor the component (b). The vinyl aromatic copolymer may be a vinyl aromatic thermoplastic resin or a vinyl aromatic elastomer.

The content of the vinyl aromatic copolymer other than the component (a) and the component (b) is preferably 10 to 80 parts by mass, more preferably 10 to 70 parts by mass, further preferably 10 to 60 parts by mass, and still further preferably 20 to 50 parts by mass based on 100 parts by mass of the total of the component (a) and the component (b), and the block copolymer other than the component (a) and the component (b).

The other rubber is not limited, and examples thereof include natural rubbers; and synthetic rubbers such as isoprene-isobutylene rubbers, polyisoprene rubbers, polybutadiene rubbers, styrene-butadiene rubbers, styrene-isoprene rubbers, propylene-butylene rubbers, ethylene-propylene rubbers, chloroprene rubbers, acrylic rubbers, isoprene-isobutylene rubbers and polypentenamer rubbers.

Now, preferred polymers other than the components (a) and (b) for various applications and performances will be described more specifically.

(Hydrogenated Vinyl Aromatic Copolymer)

In the case that, for example, reduction of an adhesive residue when the adhesive composition is peeled off, inhibition of change in adhesion strength over time or creep characteristics (smaller value is better), heat resistance, or light resistance is required, a hydrogenated vinyl aromatic copolymer may be used. The hydrogenated vinyl aromatic copolymer is not limited, and examples thereof include hydrogenated styrene-butadiene block copolymers having an S-EB-S(S: polystyrene block, EB: ethylene/butylene copolymer block) structure or the like; hydrogenated styrene-isoprene block copolymers having an S-EP-S(S: polystyrene block, EP: ethylene/propylene copolymer block) structure or the like; and hydrogenated styrene-butadiene-isoprene block copolymers having an S-E-EP-S(S: polystyrene block, E: ethylene block, EP: ethylene/propylene copolymer block) structure or the like.

The content of styrene in the hydrogenated vinyl aromatic copolymer is preferably 10% by mass to 45% by mass based on 100% by mass of the hydrogenated vinyl aromatic copolymer.

The hydrogenation ratio of unsaturated group in the conjugated diene in the hydrogenated vinyl aromatic copolymer is preferably 30% by mole or more, more preferably 50% by mole or more, further preferably 70% by mole or more, and still further preferably 85% by mole or more.

(Isoprene Block Copolymer)

In the case that, for example, high adhesiveness or inhibition of gelling is required for the adhesive composition, an isoprene block copolymer, which has an isoprene monomer unit, may be used. The isoprene block copolymer is not limited, and examples thereof include styrene-isoprene block copolymers having a $(S—I)_n$, $(S—I)_n—S$ or $(S—I)_nY$ (S: polystyrene block, I: polyisoprene block) structure or the like; and styrene-butadiene-isoprene block copolymers having a $(S-I-B)_n$, $(S-I-B)_n—S$, $(S-I-B)_nY$ (S: polystyrene block, I: polyisoprene block, B: polybutadiene block, Y: residue of polyfunctional coupling agent or residue of polymerization initiator; n is an integer of 1 or more, preferably an integer of 1 to 5), or, $(S—I/B)_n$, $(S—I/B)_n—S$, $(S—I/B)_nY$ (S: polystyrene block, I/B: isoprene/butadiene copolymer block, Y: residue of coupling agent or residue of polymerization initiator; n is an integer of 1 or more, preferably an integer of 1 to 5) structure or the like. It is more preferable that these have a radial structure.

(Ionomer)

In the case that, for example, high coatability at low temperatures, creep (smaller value is better), and high strength or high elongation is required for the adhesive composition, a polymer in an ionomer state may be used. The ionomer is not limited, but polymers or copolymers containing a carboxylate, sulfonate or phosphonate which is neutralized or partially neutralized by a metal ion are preferred. The content of the ionomer is preferably 5% by mass or less based on the total amount of the adhesive composition.

(Polyolefin Copolymer)

In the case that, for example, storage stability at high temperatures, high elongation or reduction in the amount of a tackifier in the block copolymer composition (55% by mass or less, or even 45% by mass or less in the composition) is required for the adhesive composition, a polyolefin copolymer may be used. The polyolefin copolymer is not limited, but copolymers of an α-olefin and an olefin, and propylene homopolymers are preferred. The melting point of these polymer (conditions: 5° C./min in DSC measurement) is preferably 110° C. or lower, more preferably 100° C. or lower, and further preferably 60° C. to 90° C. These polymers may be a thermoplastic resin or an elastomer. The molecular weight distribution of these polymers is preferably 1 to 4, and more preferably 1 to 3.

From the viewpoint of processability, it is more preferred to use two or more of copolymers obtained by using an α-olefin, or propylene homopolymers in combination. Specifically, it is preferred to use a polymer having a weight average molecular weight of 30000 to 60000 and a polymer having an weight average molecular weight of 60000 to 90000 in combination, and it is more preferred to use a polymer having an weight average molecular weight of 35000 to 55000 and a polymer having an weight average molecular weight of 60000 to 80000 in combination. The content of liquid components (such as an oil) in the adhesive composition with them is preferably 20% by mass or more, and more preferably 25% by mass or more.

(Conjugated Diene Rubber)

In the case that it is intended to improve the composition for pressure-sensitive adhesive tapes in terms of tack strength to the own backing or sticking strength to the skin, a conjugated diene rubber may be used. The conjugated diene rubber is not limited, and examples thereof include isoprene-isobutylene rubbers, polyisoprene rubbers, polybutadiene rubbers, styrene-butadiene rubbers, styrene-isoprene rubbers and propylene-butylene rubbers. Among them, polyisoprene rubbers are preferred from the viewpoint of a high effect.

The content of the conjugated diene rubber is preferably 3% by mass or more and 25% by mass or less, more preferably 5% by mass or more and 20% by mass or less, and further preferably 5% by mass or more and 15% by mass or less based on the total amount of the adhesive composition. The content of the conjugated diene rubber of 3% by mass or more tends to enhance the tack strength to the own backing or sticking strength to the skin. In addition, the content of the conjugated diene rubber of 25% by mass or less tends to enhance the cohesive force and reduce an adhesive residue.

(Olefin Elastomer)

In the case that, for example, elongation is required for the adhesive composition, it is preferred to use an olefin elastomer in combination. The olefin elastomer is not limited, but preferably an olefin elastomer having Tg of −10° C. or lower, for example. From the viewpoint of creep performance (smaller value is better), olefin elastomers having a block are more preferred.

(Wax)

The adhesive composition may contain a wax, as necessary. The wax is not limited, and a paraffin wax, a microcrystalline wax, a low-molecular weight polyethylene wax or the like may be added, for example.

In the case that low melt viscosity, particularly low melt viscosity at 140° C. or lower, is required for the adhesive composition, it is preferred to use at least one wax selected from a paraffin wax, a microcrystalline wax and Fischer-Tropsch wax in combination.

The content of the wax is preferably 2 to 10% by mass, and more preferably 5 to 10% by mass. The melting point of the wax is preferably 50° C. to 110° C., more preferably 65° C. to 110° C., further preferably 70° C. to 110° C., and still further preferably 75° C. to 110° C. The softening point of a tackifier to be then used in combination is preferably 70° C. or higher, and more preferably 80° C. or higher. The G' (measurement conditions: 25° C., 10 rad/s) of a adhesive composition to be then obtained is preferably 1 Mpa or less. The crystallization temperature of the adhesive composition is preferably 7° C. or lower.

(Light Stabilizer)

The adhesive composition may contain a light stabilizer, as necessary. The light stabilizer is not limited, and examples thereof include benzotriazole ultraviolet absorbers such as 2-(2'-hydroxy-5'-methylphenyl)benzotriazole, 2-(2'-hydroxy-3',5'-t-butylphenyl)benzotriazole and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

(Fine Particle Filler)

The adhesive composition according to the present embodiments may further contain a fine particle filler as another additive. The fine particle filler is not limited as long as the fine particle filler is one commonly used. The fine particle filler is not limited, and examples thereof include mica, calcium carbonate, kaolin, talc, titanium oxide, diatomaceous earth, urea resins, styrene beads, calcined cray and starch. The shape is preferably spherical, and the dimension (the diameter for a spherical shape) is not limited.

[Characteristics of Adhesive Composition]

The performance of the adhesive composition according to the present embodiments can be measured by using a pressure-sensitive adhesive tape which is produced under conditions shown in Examples described later in accordance with measurement conditions shown in Examples.

[Method for Producing Adhesive Composition]

The adhesive composition according to the present embodiments can be produced by mixing the above-described block copolymer composition, tackifier, softener, and another additive, as necessary, in accordance with a known method. The method for mixing is not limited, and examples thereof include a method of homogeneously mixing the block copolymer composition, tackifier and softener with a mixer, a kneader or the like while heating.

The temperature in mixing is preferably 130° C. to 210° C., more preferably 140° C. to 200° C., and further preferably 150° C. to 190° C. The temperature in mixing of 130° C. or higher tends to allow the block copolymer composition to melt sufficiently, resulting in satisfactory dispersion. In addition, the temperature in mixing of 210° C. or lower tends to prevent the evaporation of low-molecular weight components of a crosslinking agent or the tackifier and the deterioration of the viscous adhesion characteristics.

The mixing duration is preferably 5 minutes to 90 minutes, more preferably 10 minutes to 80 minutes, and further preferably 20 minutes to 70 minutes. The mixing duration of 5 minutes or longer tends to allow the components to be homogeneously dispersed. In addition, the mixing duration of 90 minutes or shorter tends to prevent the evaporation of low-molecular weight components of a crosslinking agent or the tackifier, the deterioration of the viscous adhesion characteristics, and the degradation of the block copolymer.

[Method for Applying Adhesive Composition]

The method for applying a viscous adhesive is not limited as long as the method provides a product intended, and examples of the coating method include a method in which a adhesive composition is dissolved in a solvent and coating is carried out with the solution, and a hot-melt coating method, in which coating is carried out with a melted adhesive composition.

Among them, a hot-melt coating method is preferred from the viewpoint of environmental pollution and easiness in coating. The hot-melt coating method is roughly classified into contact application and non-contact application. The "contact application" refers to an application method to bring a spraying machine into contact with a member or a film in applying a hot-melt adhesive. The "non-contact application" refers to an application method not to bring a spraying machine into contact with a member or a film in applying a hot-melt adhesive. The contact application method is not limited, and examples thereof include die coater coating, slot coater coating and roll coater coating. The non-contact application method is not limited, and examples thereof include spiral coating, which enables to coat spirally, omega coating and control seam coating, which enable to apply in a wavelike fashion, slot spray coating and curtain spray coating, which enable to apply in a plane, dot coating, which enables to coat in dots, and bead coating, which enables to coat linearly.

The adhesive composition according to the present embodiments is suitable for spiral coating. The "spiral coating" refers to a method to carry out non-contact application of an adhesive spirally with an air in intermittent or continuous coating. It is advantageous for producing a disposal product that coating with a hot-melt adhesive can be carried out in a wide width by using spray coating. A hot-melt adhesive which enables coating in a wide width can be used in a coating width narrowly-adjusted by adjusting the pressure of a hot air. A hot-melt adhesive which has difficulty in being used for coating in a wide width requires many spray nozzles to obtain an enough adhesion area, and such a hot-melt adhesive is not suitable for producing a relatively small disposal product such as an incontinence liner as well as a disposal product having a complicated shape. Thus, the adhesive composition according to the present embodiments, which can be applied in a wide width through spiral coating, is suitable for a disposal product.

The adhesive composition according to the present embodiments has a good suitability for coating at 150° C. or lower, and is thus useful for producing a disposal product. When a hot-melt adhesive is used for coating at a high temperature, a polyolefin (preferably, polyethylene) film as a base material of a disposal product melts or heat-shrinks, and as a result the appearance of the disposal product is significantly deteriorated. When a hot-melt adhesive is used for coating at 150° C. or lower, the appearance of a polyolefin (preferably, polyethylene) film or a nonwoven fabric as a base material of a disposal product hardly changes, and the appearance of the product is not deteriorated.

The adhesive composition according to the present embodiments is excellent in suitability for high-speed coating, and is thus suitable for producing a disposal product in a short time. When a base material being conveyed at a high speed is coated with a hot-melt adhesive by using a contact coating method, the base material may brake due to friction. The adhesive composition according to the present embodiments is suitable for spiral coating, one of non-contact coatings, and thus suits for high-speed coating and enables to enhance the efficiency for production of a disposal product. In addition, the hot-melt adhesive according to the present embodiments, which is suitable for high-speed coating, does not disturb a coating pattern.

The adhesive composition according to the present embodiments has a good thermal stability, and homogeneously melts in a high-temperature tank at 100 to 200° C. without undergoing phase separation. A hot-melt adhesive having poor thermal stability easily undergoes the phase separation of its components in a high-temperature tank. Phase separation may cause a tank filter or a transportation piping to clog.

[Application]

The adhesive composition according to the present embodiments has good melting characteristics and coatability, and discharge stability, and a good surface skin, and is excellent in tackiness and tack strength, and also has a good balance among these viscous adhesion characteristics. By utilizing such features, the adhesive composition according to the present embodiments can be used for various pressure-sensitive adhesive tapes/labels, pressure-sensitive thin plates, pressure-sensitive sheets, surface-protective sheets/films, back adhesives for fixing various lightweight plastic molded articles, back adhesives for fixing a carpet, back adhesives for fixing a tile, adhesives or the like, and in particular can be suitably used for a viscous adhesive for pressure-sensitive adhesive tapes, pressure-sensitive adhesive sheets/films, pressure-sensitive adhesive labels, surface-protective sheets/films and hygiene products.

EXAMPLES

Hereinafter, the present invention will be described in detail with reference to specific Examples and Comparative Examples, but the present invention is never limited to the following Examples. In the following Examples and Comparative Examples, measurements of the characteristics and physical properties of a polymer were performed according to the following method.

[(1): Characteristics of Block Copolymer Composition]

<(1-1) Content of Vinyl Aromatic Monomer Unit (Styrene)>

A predetermined amount of a block copolymer was dissolved in chloroform, and after measurement with an ultraviolet spectrophotometer (UV-2450, manufactured by Shimadzu Corporation), the content of the vinyl aromatic monomer unit (styrene) was calculated from the peak strength at the absorption wavelength (262 nm) due to a vinyl aromatic compound component (styrene) with use of a calibration curve.

<Evaluation α: (1-2) Weight Average Molecular Weights>

The weight average molecular weights of the component (a) and the component (b) were determined on the basis of the peak molecular weight in the chromatogram with use of a calibration curve (prepared by using the peak molecular weight of a standard polystyrene) determined from measurement for a commercially available standard polystyrene. An HLC-8320 EcoSEC Data Acquisition was used for a measurement software, and an HLC-8320 EcoSEC Data Analysis was used for an analysis software.

(Measurement Conditions)
GPC: HLC-8320 GPC (manufactured by Tosoh Corporation)
detector: RI
detection sensitivity: 3 mV/min
sampling pitch: 600 msec
column: TSKgel superHZM-N (6 mm I.D.×15 cm)×4 (manufactured by Tosoh Corporation)
solvent: THF
flow rate: 0.6 mL/min
concentration: 0.5 mg/mL
column temperature: 40° C.
injection volume: 20 μL <Evaluation α: (1-3) Ratio of Weight Average Molecular Weight>

The ratio of weight average molecular weight (component (b)/component (a)) was determined from the weight average molecular weights of the component (a) and the component (b) determined above.

<Evaluation α: (1-4) Contents of Component (a) and Component (b)>

The percentage of a peak area at the smallest molecular weight to the total peak area in an elution curve determined in the above (1-2) was used as the content of the component (a). The percentage of peak areas at molecular weights higher than that of the component (a) to the total peak area in an elution curve determined in the above (1-2) was used as the content of the component (b).

<Evaluation α: (1-5) Ratios of Area for Components (b-1), (b-2) and (b-3)>

Among the peaks for the component (b), a peak at a weight average molecular weight 1.5 times or more and less than 2.5 times as high as the weight average molecular weight of the component (a), a peak at a weight average molecular weight 2.5 times or more and less than 3.7 times as high as the weight average molecular weight of the component (a), and a peak at a weight average molecular weight 3.7 times or more and less than 4.9 times as high as the weight average molecular weight of the component (a) were used as the peak for the component (b-1), the peak for the component (b-2), and the peak for the component (b-3), respectively. The elution curve was vertically partitioned at each inflection point between peaks, and the ratio of each of the partitioned areas to the total area for the component (b) was calculated, which was used as the ratio of an area for the corresponding component. In determination of inflection points between peaks for the components (b-1), (b-2) and (b-3), Gaussian fitting was performed for peak partitioning with an EcoSEC waveform separation software, and an intersection point between the peaks was used for an inflection point. Vertical partitioning, calculation of each weight average molecular weight after partitioning and calculation of each ratio of an area were carried out with an HLC-8320 EcoSEC Data Analysis software.

<Evaluation β: (1-6) Weight Average Molecular Weights>

The weight average molecular weights of the component (a) and the component (b) were determined on the basis of the peak molecular weight in the chromatogram with use of a calibration curve (prepared by using the peak molecular weight of a standard polystyrene) determined from measurement for a commercially available standard polystyrene under conditions described later. For a hydrogenated sample, the molecular weight of the polymer after hydrogenation was measured. First, a single peak which had the smallest peak top molecular weight in the molecular weight range of 20,000 or higher, and had a ratio of an area of 0.1 or more, which was calculated to the total peak area for the block copolymer composition through peak partitioning described later, was used as the peak for the component (a), and all of the peaks in the molecular weight range higher than the molecular weight of the component (a) were used as the peaks for the component (b). The weight average molecular weights of the component (a) and the component (b) can be determined through vertical partitioning of the GPC curve to the base line at inflection points between peaks with a system software described later. Here, the lowest point in the vertical direction (trough peak) between adjacent peaks was used for an inflection point between peaks for the components (a) and (b). In the case that the lowest point was present continuously, the intermediate point was used. By using a waveform separation function in the waveform separation software, vertical partitioning was performed at each of the above-described inflection points and thereafter the corresponding weight average molecular weight and the ratio of an area were calculated.

(Measurement Conditions)
GPC: ACQUITY APC system (manufactured by Nihon Waters K.K.)
system (measurement/analysis) software: Empower 3 detector: RI
refractive index unit at full scale: 500 μRIU
output at full scale: 2000 mV
sampling rate: 10 points/sec
column: ACQUITY APC XT125 (4.6 mm×150 mm); ×1
ACQUITY APC XT200 (4.6 mm×150 mm); ×1
ACQUITY APC XT900 (4.6 mm×150 mm); ×1
ACQUITY APC XT450 (4.6 mm×150 mm); ×1
solvent: THF
flow rate: 1.0 mL/min
concentration: 0.1 mg/mL
column temperature: 40° C.
injection volume: 20 μL <Evaluation β: (1-7) Ratio of Weight Average Molecular Weight>

The ratio of weight average molecular weight (component (b)/component (a)) was determined from the weight average molecular weights of the component (a) and the component (b) determined above.

<Evaluation β: (1-8) Contents of Component (a) and Component (b)>

The percentage of a peak area for the component (a) to the total peak area in an elution curve determined in the above (1-6) was used as the content of the component (a). The percentage of all peak areas at molecular weights higher than that of the component (a) to the total peak area in an elution curve determined in the above (1-6) was used as the content of the component (b).

<Evaluation β: (1-9) Ratios of Area for Components (b-1), (b-2) and (b-3)>

Among the peaks for the component (b), a peak at a weight average molecular weight 1.5 times or more and less than 2.5 times as high as the weight average molecular weight of the component (a), a peak at a weight average molecular weight 2.5 times or more and less than 3.4 times as high as the weight average molecular weight of the component (a), and a peak at a weight average molecular weight 3.4 times or more and less than 4.5 times as high as the weight average molecular weight of the component (a) were used as the peak for the component (b-1), the peak for the component (b-2), and the peak for the component (b-3), respectively. The ratio of an area to the total area for the component (b) and the weight average molecular weight of each of the component (b-1), the component (b-2) and the component (b-3), and the ratio of weight average molecular weight can be determined through GPC measurement with use of the above apparatus and conditions followed by vertical partitioning to the base line at inflection points between peaks in the GPC curve with the above-described system software. Here, the lowest point in the vertical direction (trough peak) between adjacent peaks was used for an inflection point between peaks for the components (b-1), (b-2) and (b-3). In the case that the lowest point was present continuously, the intermediate point was used. By using a waveform separation function in the above-described system software, vertical partitioning was performed at each of the above-described inflection points and thereafter the corresponding weight average molecular weight, the ratio of weight average molecular weight and the ratio of an area were calculated.

<(1-10) Viscosity in 15% by Mass Toluene Solution>

The viscosity in a 15% by mass toluene solution was measured with a Cannon-Fenske Capillary Viscometer in a thermostatic bath controlled to a temperature of 25° C.

<Evaluation γ: (1-11) Average Vinyl Bond Content in Conjugated Diene Monomer Unit>

The average vinyl bond content in the conjugated diene monomer unit was calculated for a block copolymer composition before hydrogenation with an infrared spectrophotometer (FT/IR-230, manufactured by JASCO Corporation) in accordance with a Hampton method.

<Evaluation δ: (1-12) Average Vinyl Bond Content in Conjugated Diene Monomer Unit>

The vinyl bond content in the conjugated diene monomer unit in the component (a) and the component (b) was measured with a nuclear magnetic resonance apparatus (NMR) under the following conditions. A large amount of methanol was added to a reaction solution after the completion of all the reactions (after hydrogenation reaction for a hydrogenated block copolymer) to precipitate the block copolymer for recovery. The block copolymer was then extracted with acetone, and the extracted solution was dried in vacuum, and the resultant was used as a sample for $^1$H-NMR measurement. The conditions for $^1$H-NMR measurement were as follows.

(Measurement Conditions)
measurement apparatus: JNM-LA400 (manufactured by JEOL Ltd.)
solvent: deuterated chloroform
sample concentration: 50 mg/mL
observation frequency: 400 MHz
chemical shift reference: TMS (tetramethylsilane)
pulse delay: 2.904 seconds
number of scans: 64
pulse width: 45°
measurement temperature: 26° C.

The vinyl bond content can be determined from the ratio of the total area of peaks for 1,2-bond and 3,4-bond to the total area of all peaks associated with the conjugated diene monomer unit (1,2-bond, 3,4-bond and 1,4-bond) among peaks obtained.

<(1-13) Hydrogenation Ratio>

The hydrogenation ratio of the double bonds in the conjugated diene monomer unit in a block copolymer was measured with a nuclear magnetic resonance apparatus (NMR) under the following conditions. First, a large amount of methanol was added to a reaction solution after a hydrogenation reaction to precipitate the block copolymer for recovery. The block copolymer was then extracted with acetone, and the extracted solution was dried in vacuum, and the resultant was used as a sample for $^1$H-NMR measurement. The conditions for $^1$H-NMR measurement were as follows.

(Measurement Conditions)
measurement apparatus: JNM-LA400 (manufactured by JEOL Ltd.)
solvent: deuterated chloroform
measurement sample: sampled products before and after hydrogenation of polymer
sample concentration: 50 mg/mL
observation frequency: 400 MHz
chemical shift reference: TMS (tetramethylsilane)
pulse delay: 2.904 seconds
number of scans: 64
pulse width: 45°
measurement temperature: 26° C.

[(2): Measurement of Physical Properties of Adhesive Composition]

Preparation of Adhesive Composition—Examples 1 to 20, Comparative Examples 1 to 13

Each of the block copolymer compositions in Examples and Comparative Examples in an amount of 100 parts by mass was mixed with 300 parts by mass of ARKON M100 (manufactured by Arakawa Chemical Industries, Ltd.) as a tackifier, 100 parts by mass of Diana Process Oil PW-90 (manufactured by Idemitsu Kosan Co., Ltd.) as a softener, and 1 part by mass of 2-t-butyl-6-(3-t-butyl-2-hydroxy-5-methylbenzyl)-4-methylphenylacrylate as a stabilizer, and the mixture was melt-kneaded with a pressurizing kneader (model: DR0.5-3 MB-E, manufactured by Moriyama Company Ltd.) at 180° C. and 50 rpm for 30 minutes to obtain a homogeneous hot-melt adhesive composition. As a polymer other than the block copolymer used for the present embodiments, Kraton D1161 (styrene-isoprene block copolymer; manufactured by Kraton Performance Polymers, Inc.) and Quintac 3433N (styrene-isoprene block copolymer; manufactured by Zeon Corporation) were used in combination in Examples 16, 17 and 20 and Comparative Example 12.

Preparation of Adhesive Composition—Examples 21 to 29, Comparative Examples 14 to 18

Each of the block copolymer compositions in Examples and Comparative Examples in an amount of 100 parts by mass was mixed with 140 parts by mass of Quintone R100 (manufactured by Zeon Corporation) as a tackifier 2, 30 parts by mass of Process Oil NS-90S (manufactured by Idemitsu Kosan Co., Ltd.) as a softener 2, and 3 parts by mass of 2-t-butyl-6-(3-t-butyl-2-hydroxy-5-methylbenzyl)-4-methylphenylacrylate as a stabilizer, and the mixture was melt-kneaded with a pressurizing kneader (model: DR0.5-3 MB-E, manufactured by Moriyama Company Ltd.) at 190° C. and 50 rpm for 30 minutes to obtain a homogeneous hot-melt adhesive composition. As a polymer other than the block copolymer used for the present embodiments, Kraton D1161 (styrene-isoprene block copolymer; manufactured by Kraton Performance Polymers, Inc.), Tuftec H1221 (hydrogenated styrene-butadiene block copolymer; manufactured by Asahi Kasei Chemicals Corp.), and Quintac 3280 (manufactured by Zeon Corporation) were used in combination in Example 27, in Example 28, and in Example 29, respectively.

Preparation of Adhesive Composition—Examples 30 to 38, Comparative Examples 19 to 22

Each of the block copolymer compositions in Examples and Comparative Examples in an amount of 100 parts by mass was mixed with 200 parts by mass of Quintone R100 (manufactured by Zeon Corporation) as a tackifier 2, 100 parts by mass of Diana Process Oil PW-90 (manufactured by Idemitsu Kosan Co., Ltd.) as a softener 1, and 3 parts by mass of 2-t-butyl-6-(3-t-butyl-2-hydroxy-5-methylbenzyl)-4-methylphenylacrylate as a stabilizer, and the mixture was melt-kneaded with a pressurizing kneader (model: DR0.5-3 MB-E, manufactured by Moriyama Company Ltd.) at 185° C. and 50 rpm for 30 minutes to obtain a homogeneous hot-melt adhesive composition. As a polymer other than the block copolymer used for the present embodiments, Kraton D1161 (styrene-isoprene block copolymer; manufactured by Kraton Performance Polymers, Inc.), Quintac 3433N (manufactured by Zeon Corporation), and SEPTON 2063 (hydrogenated styrene-isoprene block copolymer; manufactured by KURARAY CO., LTD.) were used in combination in Example 36, in Example 37, and in Example 38, respectively.

<(2-1) Melting Characteristics of Adhesive Composition>

Each of the adhesive compositions in Examples 1 to 20 and Comparative Examples 1 to 13 was kneaded with the pressurizing kneader (model DR0.5-3 MB-E kneader, manufactured by Moriyama Company Ltd.) used as a mixing apparatus at 160° C. and 50 rpm, and the time at which the average value of the current (A) of the pressurizing kneader reached to a value within 0.5 A was used for the melting time.

Each of the adhesive compositions in Examples 21 to 29 and Comparative Examples 14 to 18 was kneaded with the pressurizing kneader at 180° C. and 50 rpm, and the time at which the average value of the current (A) of the pressurizing kneader reached to a value within 0.5 A was used for the melting time.

Each of the adhesive compositions in Examples 30 to 38 and Comparative Examples 19 to 22 was kneaded with the pressurizing kneader at 170° C. and 50 rpm, and the time at which the average value of the current (A) of the pressurizing kneader reached to a value within 0.5 A was used for the melting time.

The melting characteristics of each adhesive composition were evaluated on the basis of the melting time by using the following evaluation criteria.

(Evaluation Criteria)

◎: the melting time was shorter than 15 minutes

○: the melting time was 15 minutes or longer and shorter than 30 minutes

Δ: the melting time was 30 minutes or longer and shorter than 60 minutes

X: the melting time was 60 minutes or longer

<(2-2) Melt Viscosity of Adhesive Composition>

The melt viscosity of each of the adhesive compositions in Examples 1 to 20 and Comparative Examples 1 to 13 was measured with a Brookfield viscometer (DV-III, manufactured by Brookfield Engineering) at a temperature of 140° C.

The melt viscosity of each of the adhesive compositions in Examples 21 to 38 and Comparative Examples 14 to 22 was measured with a Brookfield viscometer (DV-III, manufactured by Brookfield Engineering) at a temperature of 180° C.

<(2-3) Softening Point of Adhesive Composition>

The softening point of each of the adhesive compositions was measured in accordance with JIS-K2207. Specifically, a prescribed ring stage filled with a sample was supported horizontally in glycerin; a ball having a weight of 3.5 g was placed on the center of the sample, and the temperature of the glycerin was raised at a rate of 5° C./min; and a temperature at which the sample came into contact with the bottom plate of the ring stage due to the weight of the ball was measured as the softening point of the adhesive composition.

<(2-4) Coatability of Adhesive Composition>

Each of the adhesive compositions in Examples 1 to 20 and Comparative Examples 1 to 13 was melted and dropped on a hot plate heated to 160° C., with which coating was carried out by using an applicator heated to 160° C. Thereafter, the percentage of an area with roughness or unevenness generated to the total area of the surface coated with the viscous adhesive was measured.

Each of the adhesive compositions in Examples 21 to 29 and Comparative Examples 14 to 18 was melted and dropped on a hot plate heated to 190° C., with which coating was carried out by using an applicator heated to 190° C. Thereafter, the percentage of an area with roughness or unevenness generated to the total area of the surface coated with the viscous adhesive was measured.

Each of the adhesive compositions in Examples 30 to 38 and Comparative Examples 19 to 22 was melted and dropped on a hot plate heated to 170° C., with which coating was carried out by using an applicator heated to 170° C. Thereafter, the percentage of an area with roughness or unevenness generated to the total area of the surface coated with the viscous adhesive was measured.

The coatability of each of the adhesive compositions was evaluated on the basis of the percentage of an area with unevenness generated by using the following evaluation criteria.

(Evaluation Criteria)

○: the percentage of an area with roughness or unevenness generated was less than 10% by area Δ: the percentage of an area with roughness or unevenness generated was 10% by area or more and less than 40% by area X: the percentage of an area with roughness or unevenness generated was 40% by area or more (Preparation of Pressure-Sensitive Adhesive Tape)

Each of the adhesive compositions which had been melted was cooled to a room temperature, and dissolved in toluene. A polyester film was coated with the resultant toluene solution with use of an applicator, and thereafter the film was retained at a room temperature for 30 minutes and then in an oven at 70° C. for 7 minutes to evaporate the toluene completely, and thus a pressure-sensitive adhesive tape was prepared. The coating thickness of the adhesive composition was 50 µm (thickness of base material: 50 µm) in Examples 1 to 20 and Comparative Examples 1 to 13, and the coating thickness of the adhesive composition was 25 µm (thickness of base material: 38 µm) in Examples 21 to 38 and Comparative Examples 14 to 22.

<(2-5) Tackiness (Loop Tack) of Adhesive Composition>

A looped pressure-sensitive adhesive tape in 250 mm length×15 mm width was prepared with use of each of the adhesive compositions in Examples 1 to 10 and 15 to 17 and Comparative Examples 1 to 5 and 10 to 12, in a manner as described above. The looped pressure-sensitive adhesive tape was allowed to adhere to a PE (polyethylene) plate in a contact area of 15 mm×50 mm at an adhering speed of 500 mm/min for an adhesion time of 3 sec. The pressure-sensitive adhesive tape was then peeled off from the PE plate at a peeling speed of 500 mm/min to measure the peel strength in being peeled off.

A looped pressure-sensitive adhesive tape in 250 mm length×15 mm width was prepared with use of each of the adhesive compositions in Examples 11 to 14 and 18 to 20 and Comparative Examples 6 to 9 and 13, in a manner as described above. The looped pressure-sensitive adhesive tape was allowed to adhere to an SUS plate (SUS304) in a contact area of 15 mm×50 mm at an adhering speed of 500 mm/min for an adhesion time of 3 sec. The pressure-sensitive adhesive tape was then peeled off from the SUS plate at a peeling speed of 500 mm/min to measure the peel strength in being peeled off.

If the measurement of peel strength (N/15 mm) was 10 or more, the adhesive composition was determined to have excellent tackiness in practical use, and if 7 or more, determined to have sufficient tackiness in practical use.

<(2-6) Tackiness (Ball Tack) of Adhesive Composition>

Tests were carried out in accordance with a rolling ball tack testing method in JIS 20237. A pressure-sensitive adhesive tape in 300 mm length×15 mm width was prepared with use of each of the adhesive compositions in Examples 21 to 29 and Comparative Example 14 to 18 in a manner described above. The pressure-sensitive adhesive tape prepared was attached onto a ball tack tester (manufactured by TESTER SANGYO CO., LTD.) having an angle of 30°, and a PET film (thickness: 25µ.) was pasted on a runway in 10 cm from the ball position. In addition, a reference line was provided at a position 20 cm from the ball position (10 cm from the lowest edge of the runway) on the pressure-sensitive adhesive tape. A rigid ball (size: 1/32 to 32/32 inch) was allowed to run down from the ball position in the upper side of the slope to the lower side of the slope. A numerical value obtained by multiplying the size of a ball which stopped before the reference line by 32 was defined as "ball number", and the maximum ball number was determined for each pressure-sensitive adhesive tape.

If the determined value of a ball number (No.) was 10 or more, the adhesive composition was determined to have excellent tackiness in practical use, and if 7 or more, determined to have sufficient tackiness in practical use.

<(2-7) Tackiness (Probe Tack) of Adhesive Composition>

A pressure-sensitive adhesive tape in 30 mm length×30 mm width was prepared with use of each of the adhesive compositions in Examples 30 to 38 and Comparative Example 19 to 22, in a manner as described above. The pressure-sensitive adhesive tape prepared was pasted on the top surface of a 10 g weight (hollowed cylinder) of a probe tack tester (NTS-4800, manufactured by TESTER SANGYO CO., LTD.) so that the pressure-sensitive adhesive side was on the lower side. To the pressure-sensitive adhesive side, a cylinder (made of an SUS) with a diameter of 5 mmφ was allowed to adhere from the lower side for 1 second so as to lift up. Thereafter, the peel strength when the cylinder was detached off was measured. The adhering and detaching speeds were each 10 mm/sec.

If the measurement of peel strength (N/5 mmφ) was 2 or more, the adhesive composition was determined to have excellent tackiness in practical use, and if 1.5 or more, determined to have sufficient tackiness in practical use.

<(2-8) Tack Strength of Adhesive Composition>

A pressure-sensitive adhesive tape in 25 mm width was prepared with use of each of the adhesive compositions in Examples 1 to 10 and 15 to 17 and Comparative Examples 1 to 5 and 10 to 12, in a manner as described above. The pressure-sensitive adhesive tape prepared was pasted on a PE (polyethylene) plate, and the 180° peel strength was measured at a peeling speed of 300 mm/min.

A pressure-sensitive adhesive tape in 25 mm width was prepared with use of each of the adhesive compositions in Examples 11 to 14 and 18 to 20 and Comparative Examples 6 to 9 and 13, in a manner as described above. The pressure-sensitive adhesive tape prepared was pasted on an SUS plate (SUS304), and the 180° peeling strength was measured at a peeling speed of 300 mm/min.

If the measurement of peel strength (N/10 mm) was 10 or more, the adhesive composition was determined to have excellent tack strength in practical use, and if 8.0 or more, determined to have sufficient tack strength in practical use.

<(2-9) Retention Strength of Adhesive Composition>

A pressure-sensitive adhesive tape in 25 mm width was prepared with use of each of the adhesive compositions in Examples 1 to 10 and 15 to 17 and Comparative Examples 1 to 5 and 10 to 12, in a manner as described above. The pressure-sensitive adhesive tape prepared was pasted on a PE (polyethylene) plate in a contact area of 25 mm×25 mm. Thereafter, a load of 1 kg was applied in the direction perpendicular to the pressure-sensitive adhesive tape at 40° C., and the retention time until the pressure-sensitive adhesive tape slid down was measured.

A pressure-sensitive adhesive tape in 25 mm width was prepared with use of each of the adhesive compositions in Examples 11 to 14 and 18 to 20 and Comparative Examples 6 to 9 and 13, as in a manner described above. The pressure-sensitive adhesive tape prepared was pasted on an SUS plate (SUS304) in a contact area of 25 mm×25 mm. Thereafter, a load of 1 kg was applied in the direction perpendicular to the pressure-sensitive adhesive tape at 40° C. or 60° C., and the retention time until the pressure-sensitive adhesive tape slid down was measured.

A pressure-sensitive adhesive tape in 15 mm width was prepared with use of each of the adhesive compositions in Examples 21 to 29 and Comparative Examples 14 to 18, in a manner as described above. The pressure-sensitive adhesive tape prepared was pasted on an SUS plate (SUS304) in a contact area of 15 mm×15 mm. Thereafter, a load of 1 kg was applied in the direction perpendicular to the pressure-sensitive adhesive tape at 50° C., and the retention time until the pressure-sensitive adhesive tape slid down was measured.

A pressure-sensitive adhesive tape in 15 mm width was prepared with use of each of the adhesive compositions in Examples 30 to 38 and Comparative Examples 19 to 22, in a manner as described above. The pressure-sensitive adhesive tape prepared was pasted on an SUS plate (SUS304) in a contact area of 15 mm×25 mm. Thereafter, a load of 1 kg was applied in the direction perpendicular to the pressure-sensitive adhesive tape at 50° C., and the retention time until the pressure-sensitive adhesive tape slid down was measured.

For retention strength at 40° C., if the retention time was 300 minutes or longer, the adhesive composition was determined to have excellent retention strength in practical use, and if 200 minutes or longer, determined to have sufficient retention strength in practical use. For retention strength at 60° C., if the retention time was 20 minutes or longer, the adhesive composition was determined to have excellent retention strength in practical use, and if 10 minutes or longer, determined to have sufficient retention strength in practical use.

For retention strength at 50° C. in Examples 21 to 29 and Comparative Examples 14 to 18, if the retention time was 200 minutes or longer, the adhesive composition was determined to have excellent retention strength in practical use, and if 100 minutes or longer, determined to have sufficient retention strength in practical use. For retention strength at 50° C. in Examples 30 to 38 and Comparative Examples 19 to 22, if the retention time was 20 minutes or longer, the adhesive composition was determined to have excellent retention strength in practical use, and if 10 minutes or longer, determined to have sufficient retention strength in practical use.

<(2-10) Balance Between Melt Viscosity and Viscous Adhesion Performance>

Balance between melt viscosity and viscous adhesion performance was determined on the basis of a value obtained by dividing the retention time (min) determined in (2-9) by the measurement of melt viscosity (mPa·s) in (2-1). If a value obtained by dividing the retention time (min) at 40° C. by the measurement of melt viscosity (mPa·s) was 0.2 or more, the adhesive composition was determined to be excellent in balance between melt viscosity and viscous adhesion performance. If a value obtained by multiplying the retention time (min) at 60° C. divided by the measurement of melt viscosity (mPa·s) by 100 was 0.4 or more, the adhesive composition was determined to be excellent in balance between melt viscosity and viscous adhesion performance.

For Examples 21 to 29 and Comparative Examples 14 to 18, if a value obtained by multiplying the retention time (min) at 50° C. divided by the measurement of melt viscosity (mPa·s) by 100 was 0.4 or more, the adhesive composition was determined to be excellent in balance between melt viscosity and viscous adhesion performance. For Examples 30 to 38 and Comparative Examples 19 to 22, if a value obtained by multiplying the retention time (min) at 50° C. divided by the measurement of melt viscosity (mPa·s) by 100 was 0.5 or more, the adhesive composition was determined to be excellent in balance between melt viscosity and viscous adhesion performance.

<(2-10) Retention Rate of Melt Flow Rate>

For an indicator of thermal stability, the melt flow rate (MFR1: measurement temperature 200° C., load 2.16 kg) of each of the adhesive compositions after heating at a temperature of 200° C. for 5 minutes and the melt flow rate (MFR2: measurement temperature 200° C., load 2.16 kg) of each of the adhesive compositions after heating at a temperature of 200° C. for 60 minutes were measured with a Melt Indexer L247 (TECHNOL SEVEN CO., LTD.). The change rate of the value MFR2 to the value MFR1 was defined as the MFR retention rate.

If the retention rate was 98% or more, the adhesive composition was determined to have extremely excellent retention rate in practical use, if 90% or more, determined to have excellent performance in practical use, and if 50% or more, determined to have sufficient retention rate in practical use.

<(2-11) Light Resistance: Tack Strength Change Rate>

For an indicator of light resistance, the tack strength was measured before light irradiation (initial value) and after light irradiation with a Sunshine Weather Meter (Sunshine Super Long Weather Meter CWEL-SUN-HCH-B model, manufactured by Suga Test Instruments Co., Ltd.). First, a pressure-sensitive adhesive tape in 25 mm width was prepared, in a manner as described above. The pressure-sensitive adhesive tape prepared was pasted on an SUS plate (SUS304). Thirty minutes after this, the pressure-sensitive adhesive tape was peeled off from the SUS plate at a peeling speed of 300 mm/min without light irradiation, and the 180° peeling strength was measured.

Separately, the pressure-sensitive adhesive tape prepared was pasted on an SUS plate (SUS304), and the base material (transparent PET film) side was irradiated with a light for 72 hours under conditions of a black panel temperature of 63° C. and no rain. Thereafter, the pressure-sensitive adhesive tape was peeled off from the SUS plate at a peeling speed of 300 mm/min, and 180° peeling strength was measured.

The change rate of the 180° peeling strength after 72-hour light irradiation to the initial value was defined as the tack strength change rate. The tack strength change rate obtained was evaluated by using the following evaluation criteria.

(Evaluation Criteria)

○: the tack strength change rate was less than ±50%

X: the tack strength change rate was ±50% or more

<(2-12) Light Resistance: Adhesive Residue on Adherend>

In the above (2-11), the surface of the SUS plate from which the pressure-sensitive adhesive tape had been peeled off after light irradiation was visually observed, and the adhesive residue on an adherend was evaluated by using the following evaluation criteria.

(Evaluation Criteria)

○: No adhesive residue was found on the surface after peeling in visual observation and finger touch X: An adhesive residue was found on the surface after peeling in visual observation and finger touch

[(3): Preparation of Hydrogenation Catalyst]

A hydrogenation catalyst to be used for preparing a hydrogenated block copolymer composition in Examples and Comparative Examples described later was prepared in accordance with the following method. A reaction vessel provided with a stirrer was purged with nitrogen, and into the reaction vessel 1 L of dried and purified cyclohexane was charged. Next, 100 mmol of bis(η5-cyclopentadienyl)titanium dichloride was added thereto. While thoroughly stirring this, an n-hexane solution containing 200 mmol of trimethylaluminum was added thereto to allow to react at a room temperature for about 3 days. Thereby, a hydrogenation catalyst was obtained.

[(4): Preparation of Block Copolymer Composition]

<Block Copolymer Composition 1>

A 10 L stainless steel autoclave provided with a stirrer and a jacket was washed, dried and purged with nitrogen, and into the autoclave 5094 g of cyclohexane and 444 g of styrene which had been purified in advance were charged, and the content was warmed to 51° C. by passing a warm water through the jacket. Subsequently, a cyclohexane solution containing 2.66 g of n-butyllithium was added thereto to initiate polymerization of styrene.

The solution temperature increased due to the polymerization of styrene, and 5 minutes after the reaction temperature reached to the maximum temperature of 63° C., a cyclohexane solution containing 756 g of 1,3-butadiene was added thereto and the polymerization was allowed to continue. The butadiene was almost completely polymerized, and 3 minutes after the reaction temperature reached to the maximum temperature of 87° C., tetraethoxysilane as a coupling agent was added thereto so that the mole ratio to the total amount by mole of the n-butyllithium was 0.073 (0.64 g in weight) to allow for a coupling reaction for 25 minutes. The average reaction temperature during the reaction was 78° C. The reaction was deactivated by adding 1.3 g of methanol 25 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 1.

With regard to the block copolymer composition 1 obtained, the content of the vinyl aromatic monomer unit was 36.7% by mass, the average vinyl bond content in the conjugated diene monomer unit was 10.8% by mass, and the viscosity in a 15% by mass toluene solution was 36.5 mPa·s.

Other physical property values of the block copolymer composition 1 obtained are shown in Table 1.

<Block Copolymer Composition 2>

A 10 L stainless steel autoclave provided with a stirrer and a jacket was washed, dried and purged with nitrogen, and into the autoclave 5109 g of cyclohexane and 456 g of styrene which had been purified in advance were charged, and the content was warmed to 50° C. by passing a warm water through the jacket. Subsequently, a cyclohexane solution containing 2.66 g of n-butyllithium was added thereto to initiate polymerization of styrene.

The solution temperature increased due to the polymerization of styrene, and 5 minutes after the reaction temperature reached to the maximum temperature of 62° C., a cyclohexane solution containing 744 g of 1,3-butadiene was added thereto and the polymerization was allowed to continue. The butadiene was almost completely polymerized, and 3 minutes after the reaction temperature reached to the maximum temperature of 85° C., tetraethoxysilane as a coupling agent was added thereto so that the mole ratio to the total amount by mole of the n-butyllithium was 0.060 (0.52 g in weight) to allow for a coupling reaction for 25 minutes. The average reaction temperature during the reaction was 77° C. The reaction was deactivated by adding 1.3 g of methanol 25 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 2.

With regard to the block copolymer composition 2 obtained, the content of the vinyl aromatic monomer unit was 37.8% by mass, the average vinyl bond content in the conjugated diene monomer unit was 10.6% by mass, and the viscosity in a 15% by mass toluene solution was 27.0 mPa·s.

Other physical property values of the block copolymer composition 2 obtained are shown in Table 1.

<Block Copolymer Composition 3>

A 10 L stainless steel autoclave provided with a stirrer and a jacket was washed, dried and purged with nitrogen, and into the autoclave 5123 g of cyclohexane and 468 g of styrene which had been purified in advance were charged, and the content was warmed to 50° C. by passing a warm water through the jacket. Subsequently, a cyclohexane solution containing 3.00 g of n-butyllithium was added thereto to initiate polymerization of styrene.

The solution temperature increased due to the polymerization of styrene, and 5 minutes after the reaction temperature reached to the maximum temperature of 63° C., a cyclohexane solution containing 732 g of 1,3-butadiene was added thereto and the polymerization was allowed to continue. The butadiene was almost completely polymerized, and 3 minutes after the reaction temperature reached to the maximum temperature of 89° C., tetraethoxysilane as a coupling agent was added thereto so that the mole ratio to the total amount by mole of the n-butyllithium was 0.060 (0.59 g in weight) to allow for a coupling reaction for 20 minutes. The average reaction temperature during the reaction was 80° C. The reaction was deactivated by adding 1.3 g of methanol 20 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 3.

With regard to the block copolymer composition 3 obtained, the content of the vinyl aromatic monomer unit was 38.7% by mass, the average vinyl bond content in the conjugated diene monomer unit was 10.7% by mass, and the viscosity in a 15% by mass toluene solution was 24.5 mPa·s.

Other physical property values of the block copolymer composition 3 obtained are shown in Table 1.

<Block Copolymer Composition 4>

A 10 L stainless steel autoclave provided with a stirrer and a jacket was washed, dried and purged with nitrogen, and into the autoclave 5109 g of cyclohexane and 456 g of styrene which had been purified in advance were charged, and the content was warmed to 50° C. by passing a warm water through the jacket. Subsequently, a cyclohexane solution containing 2.55 g of n-butyllithium was added thereto to initiate polymerization of styrene.

The solution temperature increased due to the polymerization of styrene, and 5 minutes after the reaction temperature reached to the maximum temperature of 63° C., a cyclohexane solution containing 744 g of 1,3-butadiene was added thereto and the polymerization was allowed to continue. The butadiene was almost completely polymerized, and 3 minutes after the reaction temperature reached to the maximum temperature of 87° C., N,N,N',N'-tetramethylethylenediamine (hereinafter, referred to as "TMEDA") was added thereto so that the mole ratio to the total amount by mole of the n-butyllithium was 0.36 (1.67 g in weight), and further 3 minutes after, tetraethoxysilane as a coupling agent was added thereto so that the mole ratio to the total amount by mole of the n-butyllithium was 0.060 (0.50 g in weight) to allow for a coupling reaction for 40 minutes. The average reaction temperature during the reaction was 73° C. The reaction was deactivated by adding 1.2 g of methanol 40 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 4.

With regard to the block copolymer composition 4 obtained, the content of the vinyl aromatic monomer unit was 38.1% by mass, the average vinyl bond content in the conjugated diene monomer unit was 10.6% by mass, and the viscosity in a 15% by mass toluene solution was 34.1 mPa·s.

Other physical property values of the block copolymer composition 4 obtained are shown in Table 1.

<Block Copolymer Composition 5>

A 10 L stainless steel autoclave provided with a stirrer and a jacket was washed, dried and purged with nitrogen, and into the autoclave 4778 g of cyclohexane and 180 g of styrene which had been purified in advance were charged, and the content was warmed to 50° C. by passing a warm water through the jacket. Subsequently, a cyclohexane solution containing 3.24 g of n-butyllithium was added thereto to initiate polymerization of styrene.

The solution temperature increased due to the polymerization of styrene, and 5 minutes after the reaction temperature reached to the maximum temperature of 56° C., a cyclohexane solution containing 1020 g of 1,3-butadiene was added thereto and the polymerization was allowed to continue. The butadiene was almost completely polymerized, and 3 minutes after the reaction temperature reached to the maximum temperature of 86° C., tetraethoxysilane as a coupling agent was added thereto so that the mole ratio to the total amount by mole of the n-butyllithium was 0.123 (1.30 g in weight) to allow for a coupling reaction for 25 minutes. The average reaction temperature during the reaction was 77° C. The reaction was deactivated by adding 1.5 g of methanol 25 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 5.

With regard to the block copolymer composition 5 obtained, the content of the vinyl aromatic monomer unit was 15.1% by mass, the average vinyl bond content in the conjugated diene monomer unit was 11.9% by mass, and the viscosity in a 15% by mass toluene solution was 57.3 mPa·s.

Other physical property values of the block copolymer composition 5 obtained are shown in Table 1.

<Block Copolymer Composition 6>

A 10 L stainless steel autoclave provided with a stirrer and a jacket was washed, dried and purged with nitrogen, and into the autoclave 5181 g of cyclohexane and 516 g of styrene which had been purified in advance were charged, and the content was warmed to 51° C. by passing a warm water through the jacket. Subsequently, a cyclohexane solution containing 2.86 g of n-butyllithium was added thereto to initiate polymerization of styrene.

The solution temperature increased due to the polymerization of styrene, and 5 minutes after the reaction temperature reached to the maximum temperature of 68° C., a cyclohexane solution containing 684 g of 1,3-butadiene was added thereto and the polymerization was allowed to continue. The butadiene was almost completely polymerized, and 3 minutes after the reaction temperature reached to the maximum temperature of 88° C., tetraethoxysilane as a coupling agent was added thereto so that the mole ratio to the total amount by mole of the n-butyllithium was 0.053 (0.50 g in weight) to allow for a coupling reaction for 25 minutes. The average reaction temperature during the reaction was 79° C. The reaction was deactivated by adding 1.5 g of methanol 25 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 6.

With regard to the block copolymer composition 6 obtained, the content of the vinyl aromatic monomer unit was 43.2% by mass, the average vinyl bond content in the conjugated diene monomer unit was 10.5% by mass, and the viscosity in a 15% by mass toluene solution was 30.5 mPa·s.

Other physical property values of the block copolymer composition 6 obtained are shown in Table 1.

<Block Copolymer Composition 7>

A 10 L stainless steel autoclave provided with a stirrer and a jacket was washed, dried and purged with nitrogen, and into the autoclave 5066 g of cyclohexane and 420 g of styrene which had been purified in advance were charged, and the content was warmed to 55° C. by passing a warm water through the jacket. Subsequently, a cyclohexane solution containing 2.12 g of n-butyllithium was added thereto to initiate polymerization of styrene.

The solution temperature increased due to the polymerization of styrene, and 5 minutes after the reaction temperature reached to the maximum temperature of 64° C., a cyclohexane solution containing 780 g of 1,3-butadiene was added thereto and the polymerization was allowed to continue. The butadiene was almost completely polymerized, and 3 minutes after the reaction temperature reached to the maximum temperature of 89° C., tetraethoxysilane as a coupling agent was added thereto so that the mole ratio to the total amount by mole of the n-butyllithium was 0.053 (0.37 g in weight) to allow for a coupling reaction for 15 minutes. The average reaction temperature during the reaction was 80° C. The reaction was deactivated by adding 1.0 g of methanol 15 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 7.

With regard to the block copolymer composition 7 obtained, the content of the vinyl aromatic monomer unit was 34.5% by mass, the average vinyl bond content in the conjugated diene monomer unit was 11.5% by mass, and the viscosity in a 15% by mass toluene solution was 42.1 mPa·s.

Other physical property values of the block copolymer composition 7 obtained are shown in Table 1.

<Block Copolymer Composition 8>

A 10 L stainless steel autoclave provided with a stirrer and a jacket was washed, dried and purged with nitrogen, and into the autoclave 5066 g of cyclohexane and 420 g of styrene which had been purified in advance were charged, and the content was warmed to 52° C. by passing a warm water through the jacket. Subsequently, a cyclohexane solution containing 3.02 g of n-butyllithium was added thereto to initiate polymerization of styrene.

The solution temperature increased due to the polymerization of styrene, and 5 minutes after the reaction temperature reached to the maximum temperature of 62° C., a cyclohexane solution containing 780 g of 1,3-butadiene was added thereto and the polymerization was allowed to continue. The butadiene was almost completely polymerized, and 3 minutes after the reaction temperature reached to the maximum temperature of 88° C., tetraethoxysilane as a coupling agent was added thereto so that the mole ratio to the total amount by mole of the n-butyllithium was 0.120 (1.18 g in weight) to allow for a coupling reaction for 15 minutes. The average reaction temperature during the reaction was 78° C. The reaction was deactivated by adding 1.4 g of methanol 15 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 8.

With regard to the block copolymer composition 8 obtained, the content of the vinyl aromatic monomer unit was 35.2% by mass, the average vinyl bond content in the conjugated diene monomer unit was 10.4% by mass, and the viscosity in a 15% by mass toluene solution was 41.3 mPa·s.

Other physical property values of the block copolymer composition 8 obtained are shown in Table 1.

<Block copolymer composition 9>

A 10 L stainless steel autoclave provided with a stirrer and a jacket was washed, dried and purged with nitrogen, and into the autoclave 5066 g of cyclohexane and 420 g of styrene which had been purified in advance were charged, and the content was warmed to 52° C. by passing a warm water through the jacket. Subsequently, a cyclohexane solution containing 2.08 g of n-butyllithium was added thereto to initiate polymerization of styrene.

The solution temperature increased due to the polymerization of styrene, and 5 minutes after the reaction temperature reached to the maximum temperature of 64° C., a cyclohexane solution containing 780 g of 1,3-butadiene was added thereto and the polymerization was allowed to continue. The butadiene was almost completely polymerized, and 3 minutes after the reaction temperature reached to the maximum temperature of 86° C., ethyl benzoate as a coupling agent was added thereto so that the mole ratio to the total amount by mole of the n-butyllithium was 0.15 (0.73 g in weight) to allow for a coupling reaction for 20 minutes. The average reaction temperature during the reaction was 78° C. The reaction was deactivated by adding 1.0 g of methanol 20 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 9.

With regard to the block copolymer composition 9 obtained, the content of the vinyl aromatic monomer unit was 34.6% by mass, the average vinyl bond content in the conjugated diene monomer unit was 11.1% by mass, and the viscosity in a 15% by mass toluene solution was 47.0 mPa·s.

Other physical property values of the block copolymer composition 9 obtained are shown in Table 2.

<Block Copolymer Composition 10>

A 10 L stainless steel autoclave provided with a stirrer and a jacket was washed, dried and purged with nitrogen, and into the autoclave 5181 g of cyclohexane and 516 g of styrene which had been purified in advance were charged, and the content was warmed to 50° C. by passing a warm water through the jacket. Subsequently, a cyclohexane solution containing 2.57 g of n-butyllithium was added thereto to initiate polymerization of styrene.

The solution temperature increased due to the polymerization of styrene, and 5 minutes after the reaction temperature reached to the maximum temperature of 65° C., a cyclohexane solution containing 684 g of 1,3-butadiene was added thereto and the polymerization was allowed to continue. The butadiene was almost completely polymerized, and 3 minutes after the reaction temperature reached to the maximum temperature of 89° C., ethyl benzoate as a coupling agent was added thereto so that the mole ratio to the total amount by mole of the n-butyllithium was 0.185 (1.11 g in weight) to allow for a coupling reaction for 20 minutes. The average reaction temperature during the reaction was 81° C. The reaction was deactivated by adding 1.2 g of methanol 20 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 10.

With regard to the block copolymer composition 10 obtained, the content of the vinyl aromatic monomer unit was 42.8% by mass, the average vinyl bond content in the conjugated diene monomer unit was 10.4% by mass, and the viscosity in a 15% by mass toluene solution was 25.6 mPa·s.

Other physical property values of the block copolymer composition 10 obtained are shown in Table 2.

<Block Copolymer Composition 11>

A 10 L stainless steel autoclave provided with a stirrer and a jacket was washed, dried and purged with nitrogen, and into the autoclave 5008 g of cyclohexane and 372 g of styrene which had been purified in advance were charged, and the content was warmed to 54° C. by passing a warm water through the jacket. Subsequently, a cyclohexane solution containing 1.44 g of n-butyllithium was added thereto to initiate polymerization of styrene.

The solution temperature increased due to the polymerization of styrene, and 5 minutes after the reaction temperature reached to the maximum temperature of 63° C., a cyclohexane solution containing 828 g of 1,3-butadiene was added thereto and the polymerization was allowed to continue. The butadiene was almost completely polymerized, and 3 minutes after the reaction temperature reached to the maximum temperature of 88° C., ethyl benzoate as a coupling agent was added thereto so that the mole ratio to the total amount by mole of the n-butyllithium was 0.375 (1.27 g in weight) to allow for a coupling reaction for 20 minutes. The average reaction temperature during the reaction was 81° C. The reaction was deactivated by adding 0.7 g of methanol 20 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 11.

With regard to the block copolymer composition 11 obtained, the content of the vinyl aromatic monomer unit was 30.5% by mass, the average vinyl bond content in the conjugated diene monomer unit was 11.6% by mass, and the viscosity in a 15% by mass toluene solution was 330.0 mPa·s.

Other physical property values of the block copolymer composition 11 obtained are shown in Table 2.

<Block Copolymer Composition 12>

A 10 L stainless steel autoclave provided with a stirrer and a jacket was washed, dried and purged with nitrogen, and into the autoclave 5008 g of cyclohexane and 456 g of styrene which had been purified in advance were charged, and the content was warmed to 50° C. by passing a warm water through the jacket. Subsequently, a cyclohexane solution containing 2.55 g of n-butyllithium was added thereto to initiate polymerization of styrene.

The solution temperature increased due to the polymerization of styrene, and 5 minutes after the reaction temperature reached to the maximum temperature of 62° C., a cyclohexane solution containing 828 g of 1,3-butadiene was added thereto and the polymerization was allowed to continue. The butadiene was almost completely polymerized, and 3 minutes after the reaction temperature reached to the maximum temperature of 85° C., tetraethoxysilane as a coupling agent was added thereto so that the mole ratio to the total amount by mole of the n-butyllithium was 0.06 (0.50 g in weight) to allow for a coupling reaction for 45 minutes. The average reaction temperature during the reaction was 68° C. The reaction was deactivated by adding 1.2 g of methanol 45 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 12.

With regard to the block copolymer composition 12 obtained, the content of the vinyl aromatic monomer unit was 38.3% by mass, the average vinyl bond content in the conjugated diene monomer unit was 11.3% by mass, and the viscosity in a 15% by mass toluene solution was 27.0 mPa·s.

Other physical property values of the block copolymer composition 12 obtained are shown in Table 2.

<Block Copolymer Composition 13>

A 10 L stainless steel autoclave provided with a stirrer and a jacket was washed, dried and purged with nitrogen, and into the autoclave 5181 g of cyclohexane and 516 g of styrene which had been purified in advance were charged, and the content was warmed to 50° C. by passing a warm water through the jacket. Subsequently, a cyclohexane solution containing 2.76 g of n-butyllithium was added thereto to initiate polymerization of styrene.

The solution temperature increased due to the polymerization of styrene, and 5 minutes after the reaction temperature reached to the maximum temperature of 64° C., a cyclohexane solution containing 684 g of 1,3-butadiene was added thereto and the polymerization was allowed to continue. The butadiene was almost completely polymerized, and 3 minutes after the reaction temperature reached to the maximum temperature of 89° C., tetraethoxysilane as a coupling agent was added thereto so that the mole ratio to the total amount by mole of the n-butyllithium was 0.06 (0.45 g in weight) to allow for a coupling reaction for 70 minutes. The average reaction temperature during the reaction was 70° C. The reaction was deactivated by adding 1.2 g of methanol 70 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 13.

With regard to the block copolymer composition 13 obtained, the content of the vinyl aromatic monomer unit was 42.2% by mass, the average vinyl bond content in the conjugated diene monomer unit was 10.4% by mass, and the viscosity in a 15% by mass toluene solution was 32.0 mPa·s.

Other physical property values of the block copolymer composition 13 obtained are shown in Table 2.

<Block Copolymer Composition 14>

A 10 L stainless steel autoclave provided with a stirrer and a jacket was washed, dried and purged with nitrogen, and into the autoclave 5080 g of cyclohexane and 432 g of styrene which had been purified in advance were charged, and the content was warmed to 51° C. by passing a warm water through the jacket. Subsequently, a cyclohexane solution containing 2.52 g of n-butyllithium was added thereto to initiate polymerization of styrene.

The solution temperature increased due to the polymerization of styrene, and 5 minutes after the reaction temperature reached to the maximum temperature of 63° C., a cyclohexane solution containing 768 g of 1,3-butadiene was added thereto and the polymerization was allowed to continue. The butadiene was almost completely polymerized, and 3 minutes after the reaction temperature reached to the maximum temperature of 86° C., methyltriethoxysilane as a coupling agent was added thereto so that the mole ratio to the total amount by mole of the n-butyllithium was 0.175 (0.61 g in weight) to allow for a coupling reaction for 40 minutes. The average reaction temperature during the reaction was 72° C. The reaction was deactivated by adding 1.2 g of methanol 40 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 14.

With regard to the block copolymer composition 14 obtained, the content of the vinyl aromatic monomer unit was 35.9% by mass, the average vinyl bond content in the conjugated diene monomer unit was 11.2% by mass, and the viscosity in a 15% by mass toluene solution was 49.2 mPa·s.

Other physical property values of the block copolymer composition 14 obtained are shown in Table 2.

<Block Copolymer Composition 15>

A 10 L stainless steel autoclave provided with a stirrer and a jacket was washed, dried and purged with nitrogen, and into the autoclave 5094 g of cyclohexane and 444 g of styrene which had been purified in advance were charged, and the content was warmed to 50° C. by passing a warm water through the jacket. Subsequently, a cyclohexane solution containing 2.76 g of n-butyllithium was added thereto to initiate polymerization of styrene.

The solution temperature increased due to the polymerization of styrene, and 5 minutes after the reaction temperature reached to the maximum temperature of 64° C., a cyclohexane solution containing 756 g of 1,3-butadiene was added thereto and the polymerization was allowed to continue. The butadiene was almost completely polymerized, and 3 minutes after the reaction temperature reached to the maximum temperature of 90° C., TMEDA was added thereto so that the mole ratio to the total amount by mole of the n-butyllithium was 0.70 (3.51 g in weight), and further 3 minutes after, tetraethoxysilane as a coupling agent was added thereto so that the mole ratio to the total amount by mole of the n-butyllithium was 0.073 (0.66 g in weight) to allow for a coupling reaction for 35 minutes. The average reaction temperature during the reaction was 76° C. The reaction was deactivated by adding 1.3 g of methanol 35 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 15.

With regard to the block copolymer composition 15 obtained, the content of the vinyl aromatic monomer unit was 37.3% by mass, the average vinyl bond content in the conjugated diene monomer unit was 10.7% by mass, and the viscosity in a 15% by mass toluene solution was 29.6 mPa·s.

Other physical property values of the block copolymer composition 15 obtained are shown in Table 2.

<Block Copolymer Composition 16>

A 10 L stainless steel autoclave provided with a stirrer and a jacket was washed, dried and purged with nitrogen, and into the autoclave 4778 g of cyclohexane and 180 g of styrene which had been purified in advance were charged, and TMEDA was added thereto so that the mole ratio to the total amount by mole of n-butyllithium was 0.35 (1.22 g in weight), and the content was warmed to 52° C. by passing a warm water through the jacket. Subsequently, a cyclohexane solution containing 1.92 g of n-butyllithium was added thereto to initiate polymerization of styrene.

The solution temperature increased due to the polymerization of styrene, and 5 minutes after the reaction temperature reached to the maximum temperature of 58° C., a cyclohexane solution containing 1020 g of 1,3-butadiene was added thereto and the polymerization was allowed to continue. The butadiene was almost completely polymerized, and 3 minutes after the reaction temperature reached to the maximum temperature of 89° C., tetraethoxysilane as a coupling agent was added thereto so that the mole ratio to the total amount by mole of the n-butyllithium was 0.060 (0.37 g in weight) to allow for a coupling reaction for 25 minutes. The average reaction temperature during the reaction was 81° C. The reaction was deactivated by adding 0.9 g of methanol 25 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 85° C. The hydrogenation ratio of the block copolymer composition obtained was 44.6% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 16.

With regard to the block copolymer composition 16 obtained, the content of the vinyl aromatic monomer unit was 14.8% by mass, the average vinyl bond content in the conjugated diene monomer unit was 35.8% by mass, and the viscosity in a 15% by mass toluene solution was 62.3 mPa·s.

Other physical property values of the block copolymer composition 16 obtained are shown in Table 3.

<Block Copolymer Composition 17>

A 10 L stainless steel autoclave provided with a stirrer and a jacket was washed, dried and purged with nitrogen, and into the autoclave 5123 g of cyclohexane and 468 g of styrene which had been purified in advance were charged, and TMEDA was added thereto so that the mole ratio to the total amount by mole of n-butyllithium was 0.38 (1.90 g in weight), and the content was warmed to 50° C. by passing a warm water through the jacket. Subsequently, a cyclohexane solution containing 2.76 g of n-butyllithium was added thereto to initiate polymerization of styrene.

The solution temperature increased due to the polymerization of styrene, and 5 minutes after the reaction temperature reached to the maximum temperature of 62° C., a cyclohexane solution containing 1,3-butadiene was added thereto and the polymerization was allowed to continue. The butadiene was almost completely polymerized, and 3 minutes after the reaction temperature reached to the maximum temperature of 85° C., tetraethoxysilane as a coupling agent was added thereto so that the mole ratio to the total amount by mole of the n-butyllithium was 0.053 (0.48 g in weight) to allow for a coupling reaction for 40 minutes. The average reaction temperature during the reaction was 74° C. The reaction was deactivated by adding 1.3 g of methanol 40 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 82° C. The hydrogenation ratio of the block copolymer composition obtained was 49.4% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 17.

With regard to the block copolymer composition 17 obtained, the content of the vinyl aromatic monomer unit was 38.8% by mass, the average vinyl bond content in the conjugated diene monomer unit was 41.5% by mass, and the viscosity in a 15% by mass toluene solution was 27.6 mPa·s.

Other physical property values of the block copolymer composition 17 obtained are shown in Table 3.

<Block Copolymer Composition 18>

A 10 L stainless steel autoclave provided with a stirrer and a jacket was washed, dried and purged with nitrogen, and into the autoclave 5181 g of cyclohexane and 516 g of styrene which had been purified in advance were charged, and TMEDA was added thereto so that the mole ratio to the total amount by mole of n-butyllithium was 0.37 (2.13 g in weight), and the content was warmed to 48° C. by passing a warm water through the jacket. Subsequently, a cyclohexane solution containing 3.18 g of n-butyllithium was added thereto to initiate polymerization of styrene.

The solution temperature increased due to the polymerization of styrene, and 5 minutes after the reaction temperature reached to the maximum temperature of 64° C., a cyclohexane solution containing 684 g of 1,3-butadiene was added thereto and the polymerization was allowed to continue. The butadiene was almost completely polymerized, and 3 minutes after the reaction temperature reached to the maximum temperature of 89° C., tetraethoxysilane as a coupling agent was added thereto so that the mole ratio to the total amount by mole of the n-butyllithium was 0.063 (0.65 g in weight) to allow for a coupling reaction for 20 minutes. The average reaction temperature during the reaction was 80° C. The reaction was deactivated by adding 1.5 g of methanol 20 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 84° C. The hydrogenation ratio of the block copolymer composition obtained was 48.8% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 18.

With regard to the block copolymer composition 18 obtained, the content of the vinyl aromatic monomer unit was 43.4% by mass, the average vinyl bond content in the conjugated diene monomer unit was 38.8% by mass, and the viscosity in a 15% by mass toluene solution was 24.3 mPa·s.

Other physical property values of the block copolymer composition 18 obtained are shown in Table 3.

<Block Copolymer Composition 19>

A 10 L stainless steel autoclave provided with a stirrer and a jacket was washed, dried and purged with nitrogen, and into the autoclave 5109 g of cyclohexane and 456 g of styrene which had been purified in advance were charged, and TMEDA was added thereto so that the mole ratio to the total amount by mole of n-butyllithium was 0.34 (2.02 g in weight), and the content was warmed to 50° C. by passing a warm water through the jacket. Subsequently, a cyclohexane solution containing n-butyllithium was added thereto to initiate polymerization of styrene.

The solution temperature increased due to the polymerization of styrene, and 5 minutes after the reaction temperature reached to the maximum temperature of 64° C., a cyclohexane solution containing 744 g of 1,3-butadiene was added thereto and the polymerization was allowed to continue. The butadiene was almost completely polymerized, and 3 minutes after the reaction temperature reached to the maximum temperature of 91° C., tetraethoxysilane as a coupling agent was added thereto so that the mole ratio to the total amount by mole of the n-butyllithium was 0.063 (0.65 g in weight) to allow for a coupling reaction for 20 minutes. The average reaction temperature during the reaction was 81° C. The reaction was deactivated by adding 1.6 g of methanol 20 minutes after the addition of the coupling agent.

To the block copolymer composition obtained, the hydrogenation catalyst prepared in a manner as described above was further added in an amount of 100 ppm in terms of Ti per 100 parts by mass of the block copolymer, and the resultant was allowed to undergo a hydrogenation reaction at a hydrogen pressure of 0.8 MPa and an average temperature of 87° C. The hydrogenation ratio of the block copolymer composition obtained was 72.3% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 19.

With regard to the block copolymer composition 19 obtained, the content of the vinyl aromatic monomer unit was 37.6% by mass, the average vinyl bond content in the conjugated diene monomer unit was 40.8% by mass, and the viscosity in a 15% by mass toluene solution was 61.6 mPa·s.

Other physical property values of the block copolymer composition 19 obtained are shown in Table 3.

<Block Copolymer Composition 20>

A 10 L stainless steel autoclave provided with a stirrer and a jacket was washed, dried and purged with nitrogen, and into the autoclave 4994 g of cyclohexane and 360 g of styrene which had been purified in advance were charged, and TMEDA was added thereto so that the mole ratio to the total amount by mole of n-butyllithium was 0.20 (1.01 g in weight), and the content was warmed to 51° C. by passing a warm water through the jacket. Subsequently, a cyclohexane solution containing 2.80 g of n-butyllithium was added thereto to initiate polymerization of styrene.

The solution temperature increased due to the polymerization of styrene, and 5 minutes after the reaction temperature reached to the maximum temperature of 61° C., a cyclohexane solution containing 840 g of 1,3-butadiene was added thereto and the polymerization was allowed to continue. The butadiene was almost completely polymerized, and 3 minutes after the reaction temperature reached to the maximum temperature of 87° C., silicon tetrachloride as a coupling agent was added thereto so that the mole ratio to the total amount by mole of the n-butyllithium was 0.063 (0.46 g in weight) to allow for a coupling reaction for 40 minutes. The average reaction temperature during the reaction was 74° C. The reaction was deactivated by adding 1.3 g of methanol 40 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 83° C. The hydrogenation ratio of the block copolymer composition obtained was 36.1% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 20.

With regard to the block copolymer composition 20 obtained, the content of the vinyl aromatic monomer unit was 30.3% by mass, the average vinyl bond content in the conjugated diene monomer unit was 28.2% by mass, and the viscosity in a 15% by mass toluene solution was 42.7 mPa·s.

Other physical property values of the block copolymer composition 20 obtained are shown in Table 3.

<Block Copolymer Compositions 21, 22>

A 10 L stainless steel autoclave provided with a stirrer and a jacket was washed, dried and purged with nitrogen, and into the autoclave 5066 g of cyclohexane and 420 g of styrene which had been purified in advance were charged, and TMEDA was added thereto so that the mole ratio to the total amount by mole of n-butyllithium was 0.37 (1.85 g in weight), and the content was warmed to 50° C. by passing a warm water through the jacket. Subsequently, a cyclohexane solution containing 2.76 g of n-butyllithium was added thereto to initiate polymerization of styrene.

The solution temperature increased due to the polymerization of styrene, and 5 minutes after the reaction temperature reached to the maximum temperature of 62° C., a cyclohexane solution containing 780 g of 1,3-butadiene was added thereto and the polymerization was allowed to continue. The butadiene was almost completely polymerized, and 3 minutes after the reaction temperature reached to the maximum temperature of 88° C., ethyl benzoate as a coupling agent was added thereto so that the mole ratio to the total amount by mole of the n-butyllithium was 0.15 (0.97 g in weight) to allow for a coupling reaction for 20 minutes. The average reaction temperature during the reaction was 79° C. The reaction was deactivated by adding 1.3 g of methanol 20 minutes after the addition of the coupling agent.

From the autoclave was taken out 50% of the block copolymer solution obtained, and octadecyl-3-(3,5-di-t-butyl-4-hydroxyphenyl)propionate was added thereto in an amount of 0.3 parts by mass based on 100 parts by mass of the block copolymer, and the solution was thoroughly stirred. The solvent was then removed by heating to obtain a block copolymer composition 21.

To the block copolymer composition remaining in the autoclave, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 85° C. The hydrogenation ratio of the block copolymer composition obtained was 50.1% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 22.

With regard to the block copolymer compositions 21 and 22, the content of the vinyl aromatic monomer unit was 35.2% by mass, the average vinyl bond content in the conjugated diene monomer unit was 40.9% by mass, and the viscosity in a 15% by mass toluene solution was 29.6 mPa·s for the block copolymer 21, and 36.1 mPa·s for the block copolymer 22.

Other physical property values of each of the block copolymer compositions 21 and 22 obtained are shown in Table 3.

<Block Copolymer Composition 23>

A 10 L stainless steel autoclave provided with a stirrer and a jacket was washed, dried and purged with nitrogen, and into the autoclave 5080 g of cyclohexane and 432 g of styrene which had been purified in advance were charged, and the content was warmed to 51° C. by passing a warm water through the jacket. Subsequently, a cyclohexane solution containing 2.70 g of n-butyllithium was added thereto to initiate polymerization of styrene.

The solution temperature increased due to the polymerization of styrene, and 5 minutes after the reaction temperature reached to the maximum temperature of 58° C., a cyclohexane solution containing 768 g of 1,3-butadiene was added thereto and the polymerization was allowed to continue. The butadiene was almost completely polymerized, and 3 minutes after the reaction temperature reached to the maximum temperature of 87° C., methyltrichlorosilane as a coupling agent was added thereto so that the mole ratio to the total amount by mole of the n-butyllithium was 0.083 (0.53 g in weight) to allow for a coupling reaction for 10 minutes. The average reaction temperature during the reaction was 78° C. The reaction was deactivated by adding 0.9 g of methanol 10 minutes after the addition of the coupling agent.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 23.

With regard to the block copolymer composition 23 obtained, the content of the vinyl aromatic monomer unit was 36.1% by mass, the average vinyl bond content in the conjugated diene monomer unit was 10.5% by mass, and the viscosity in a 15% by mass toluene solution was 24.7 mPa·s.

Other physical property values of the block copolymer composition 23 obtained are shown in Table 3.

<Block Copolymer Composition 24>

A 10 L stainless steel autoclave provided with a stirrer and a jacket was washed, dried and purged with nitrogen, and into the autoclave 4793 g of cyclohexane and 192 g of styrene which had been purified in advance were charged, and TMEDA was added thereto so that the mole ratio to the total amount by mole of n-butyllithium was 0.27 (0.78 g in weight), and the content was warmed to 54° C. by passing a warm water through the jacket. Subsequently, a cyclohexane solution containing 1.58 g of n-butyllithium was added thereto to initiate polymerization of styrene.

The solution temperature increased due to the polymerization of styrene, and 5 minutes after the reaction temperature reached to the maximum temperature of 58° C., a cyclohexane solution containing 1008 g of 1,3-butadiene was added thereto and the polymerization was allowed to continue. The butadiene was almost completely polymerized, and 3 minutes after the reaction temperature reached to the maximum temperature of 89° C., tetraethoxysilane as a coupling agent was added thereto so that the mole ratio to the total amount by mole of the n-butyllithium was 0.114 (0.59 g in weight) to allow for a coupling reaction for 20 minutes. The average reaction temperature during the reaction was 83° C. The reaction was deactivated by adding 0.4 g of methanol 20 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 86° C. The hydrogenation ratio of the block copolymer composition obtained was 40.6% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 24.

With regard to the block copolymer composition 24 obtained, the content of the vinyl aromatic monomer unit was 15.8% by mass, the average vinyl bond content in the conjugated diene monomer unit was 32.0% by mass, and the viscosity in a 15% by mass toluene solution was 291.3 mPa·s.

Other physical property values of the block copolymer composition 24 obtained are shown in Table 4.

<Block Copolymer Composition 25>

A 10 L stainless steel autoclave provided with a stirrer and a jacket was washed, dried and purged with nitrogen, and into the autoclave 4793 g of cyclohexane and 192 g of styrene which had been purified in advance were charged, and TMEDA was added thereto so that the mole ratio to the total amount by mole of n-butyllithium was 0.20 (0.61 g in weight), and the content was warmed to 53° C. by passing a warm water through the jacket. Subsequently, a cyclohexane solution containing 1.68 g of n-butyllithium was added thereto to initiate polymerization of styrene.

The solution temperature increased due to the polymerization of styrene, and 5 minutes after the reaction temperature reached to the maximum temperature of 58° C., a cyclohexane solution containing 1008 g of 1,3-butadiene was added thereto and the polymerization was allowed to continue. The butadiene was almost completely polymerized, and 3 minutes after the reaction temperature reached to the maximum temperature of 88° C., tetraethoxysilane as a coupling agent was added thereto so that the mole ratio to the total amount by mole of the n-butyllithium was 0.100 (0.55 g in weight) to allow for a coupling reaction for 40 minutes. The average reaction temperature during the reaction was 71° C. The reaction was deactivated by adding 0.4 g of methanol 40 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 87° C. The hydrogenation ratio of the block copolymer composition obtained was 43.8% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 25.

With regard to the block copolymer composition 25 obtained, the content of the vinyl aromatic monomer unit was 16.2% by mass, the average vinyl bond content in the conjugated diene monomer unit was 23.6% by mass, and the viscosity in a 15% by mass toluene solution was 259.6 mPa·s.

Other physical property values of the block copolymer composition 25 obtained are shown in Table 4.

<Block Copolymer Composition 26>

A 10 L stainless steel autoclave provided with a stirrer and a jacket was washed, dried and purged with nitrogen, and into the autoclave 4807 g of cyclohexane and 204 g of styrene which had been purified in advance were charged, and TMEDA was added thereto so that the mole ratio to the total amount by mole of n-butyllithium was 0.25 (0.75 g in weight), and the content was warmed to 52° C. by passing a warm water through the jacket. Subsequently, a cyclohexane solution containing 1.66 g of n-butyllithium was added thereto to initiate polymerization of styrene.

The solution temperature increased due to the polymerization of styrene, and 5 minutes after the reaction temperature reached to the maximum temperature of 55° C., a cyclohexane solution containing 996 g of 1,3-butadiene was added thereto and the polymerization was allowed to continue. The butadiene was almost completely polymerized, and 3 minutes after the reaction temperature reached to the maximum temperature of 82° C., tetraethoxysilane as a coupling agent was added thereto so that the mole ratio to the total amount by mole of the n-butyllithium was 0.133 (0.72 g in weight) to allow for a coupling reaction for 15 minutes. The average reaction temperature during the reaction was 78° C. The reaction was deactivated by adding 0.5 g of methanol 15 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 86° C. The hydrogenation ratio of the block copolymer composition obtained was 42.2% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 26.

With regard to the block copolymer composition 26 obtained, the content of the vinyl aromatic monomer unit was 16.8% by mass, the average vinyl bond content in the conjugated diene monomer unit was 30.6% by mass, and the viscosity in a 15% by mass toluene solution was 285.3 mPa·s.

Other physical property values of the block copolymer composition 26 obtained are shown in Table 4.

<Block Copolymer Composition 27>

A 10 L stainless steel autoclave provided with a stirrer and a jacket was washed, dried and purged with nitrogen, and into the autoclave 4807 g of cyclohexane and 204 g of styrene which had been purified in advance were charged, and TMEDA was added thereto so that the mole ratio to the total amount by mole of n-butyllithium was 0.26 (0.76 g in weight), and the content was warmed to 53° C. by passing a warm water through the jacket. Subsequently, a cyclohexane solution containing 1.61 g of n-butyllithium was added thereto to initiate polymerization of styrene.

The solution temperature increased due to the polymerization of styrene, and 5 minutes after the reaction temperature reached to the maximum temperature of 56° C., a cyclohexane solution containing 996 g of 1,3-butadiene was added thereto and the polymerization was allowed to continue. The butadiene was almost completely polymerized, and 3 minutes after the reaction temperature reached to the maximum temperature of 83° C., tetraethoxysilane as a coupling agent was added thereto so that the mole ratio to the total amount by mole of the n-butyllithium was 0.250 (1.31 g in weight) to allow for a coupling reaction for 10 minutes. The average reaction temperature during the reaction was 79° C. The reaction was deactivated by adding 0.2 g of methanol 10 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 83° C. The hydrogenation ratio of the block copolymer composition obtained was 41.3% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 27.

With regard to the block copolymer composition 27 obtained, the content of the vinyl aromatic monomer unit was 16.5% by mass, the average vinyl bond content in the conjugated diene monomer unit was 30.2% by mass, and the viscosity in a 15% by mass toluene solution was 539.2 mPa·s.

Other physical property values of the block copolymer composition 27 obtained are shown in Table 4.

<Block Copolymer Composition 28>

A 10 L stainless steel autoclave provided with a stirrer and a jacket was washed, dried and purged with nitrogen, and into the autoclave 4879 g of cyclohexane and 264 g of styrene which had been purified in advance were charged, and TMEDA was added thereto so that the mole ratio to the total amount by mole of n-butyllithium was 0.26 (0.81 g in weight), and the content was warmed to 51° C. by passing a warm water through the jacket. Subsequently, a cyclohexane solution containing 1.72 g of n-butyllithium was added thereto to initiate polymerization of styrene.

The solution temperature increased due to the polymerization of styrene, and 5 minutes after the reaction temperature reached to the maximum temperature of 56° C., a cyclohexane solution containing 936 g of 1,3-butadiene was added thereto and the polymerization was allowed to continue. The butadiene was almost completely polymerized, and 3 minutes after the reaction temperature reached to the maximum temperature of 86° C., tetraethoxysilane as a coupling agent was added thereto so that the mole ratio to the total amount by mole of the n-butyllithium was 0.129 (0.72 g in weight) to allow for a coupling reaction for 30 minutes. The average reaction temperature during the reaction was 76° C. The reaction was deactivated by adding 0.4 g of methanol 30 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 85° C. The hydrogenation ratio of the block copolymer composition obtained was 41.1% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 28.

With regard to the block copolymer composition 28 obtained, the content of the vinyl aromatic monomer unit was 21.5% by mass, the average vinyl bond content in the conjugated diene monomer unit was 32.1% by mass, and the viscosity in a 15% by mass toluene solution was 321.6 mPa·s.

Other physical property values of the block copolymer composition 28 obtained are shown in Table 4.

<Block Copolymer Composition 29>

A 10 L stainless steel autoclave provided with a stirrer and a jacket was washed, dried and purged with nitrogen, and into the autoclave 4936 g of cyclohexane and 312 g of styrene which had been purified in advance were charged, and TMEDA was added thereto so that the mole ratio to the total amount by mole of n-butyllithium was 0.26 (0.81 g in weight), and the content was warmed to 50° C. by passing a warm water through the jacket. Subsequently, a cyclohexane solution containing 1.72 g of n-butyllithium was added thereto to initiate polymerization of styrene.

The solution temperature increased due to the polymerization of styrene, and 5 minutes after the reaction temperature reached to the maximum temperature of 58° C., a cyclohexane solution containing 888 g of 1,3-butadiene was added thereto and the polymerization was allowed to continue. The butadiene was almost completely polymerized, and 3 minutes after the reaction temperature reached to the maximum temperature of 87° C., tetraethoxysilane as a coupling agent was added thereto so that the mole ratio to the total amount by mole of the n-butyllithium was 0.123 (0.69 g in weight) to allow for a coupling reaction for 15 minutes. The average reaction temperature during the reaction was 83° C. The reaction was deactivated by adding 0.4 g of methanol 15 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 85° C. The hydrogenation ratio of the block copolymer composition obtained was 40.5% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 29.

With regard to the block copolymer composition 29 obtained, the content of the vinyl aromatic monomer unit was 26.3% by mass, the average vinyl bond content in the conjugated diene monomer unit was 30.9% by mass, and the viscosity in a 15% by mass toluene solution was 338.0 mPa·s.

Other physical property values of the block copolymer composition 29 obtained are shown in Table 4.

<Block copolymer composition 30>

A 10 L stainless steel autoclave provided with a stirrer and a jacket was washed, dried and purged with nitrogen, and into the autoclave 4793 g of cyclohexane and 192 g of styrene which had been purified in advance were charged, and TMEDA was added thereto so that the mole ratio to the total amount by mole of n-butyllithium was 0.27 (1.00 g in weight), and the content was warmed to 51° C. by passing a warm water through the jacket. Subsequently, a cyclohexane solution containing 2.04 g of n-butyllithium was added thereto to initiate polymerization of styrene.

The solution temperature increased due to the polymerization of styrene, and 5 minutes after the reaction temperature reached to the maximum temperature of 55° C., a cyclohexane solution containing 1008 g of 1,3-butadiene was added thereto and the polymerization was allowed to continue. The butadiene was almost completely polymerized, and 3 minutes after the reaction temperature reached to the maximum temperature of 85° C., 1,3-bis(N,N'-diglycidylaminomethyl)cyclohexane as a coupling agent was added thereto so that the mole ratio to the total amount by mole of the n-butyllithium was 0.108 (1.25 g in weight) to allow for a coupling reaction for 15 minutes. The average reaction temperature during the reaction was 79° C. The reaction was deactivated by adding 0.5 g of methanol 15 minutes after the addition of the coupling agent.

To the block copolymer composition obtained, the hydrogenation catalyst prepared in a manner as described above was further added in an amount of 50 ppm in terms of Ti per 100 parts by mass of the block copolymer, and the resultant was allowed to undergo a hydrogenation reaction at a hydrogen pressure of 0.8 MPa and an average temperature of 86° C. The hydrogenation ratio of the block copolymer composition obtained was 40.9% by mass.

To the block copolymer solution obtained, octadecyl-3-(3,5-di-t-butyl-4-hydroxyphenyl)propionate was added in an amount of 0.3 parts by mass based on 100 parts by mass of the block copolymer, and the solution was thoroughly stirred. The solvent was then removed by heating to obtain a block copolymer composition 30.

With regard to the block copolymer composition 30 obtained, the content of the vinyl aromatic monomer unit was 16.1% by mass, the average vinyl bond content in the conjugated diene monomer unit was 29.5% by mass, and the viscosity in a 15% by mass toluene solution was 187.9 mPa·s.

Other physical property values of the block copolymer composition 30 obtained are shown in Table 4.

Examples 1 to 38, Comparative Examples 1 to 22

A homogeneous hot-melt adhesive composition was obtained by using each of the block copolymer compositions thus obtained in the above in accordance with the above-described method for preparing a adhesive composition. The adhesive composition obtained was evaluated in accordance with the above-described method. Further, a pressure-sensitive adhesive tape was obtained in accordance with the above-described method for preparing a pressure-sensitive adhesive tape. The pressure-sensitive adhesive tape obtained was evaluated in accordance with the above-described method. The evaluation results are shown in Tables 5 to 10.

TABLE 1

| Block copolymer composition | | | 1 | 2 | 3 | 4 |
|---|---|---|---|---|---|---|
| Content of vinyl aromatic monomer unit (% by mass) | | | 36.7 | 37.8 | 38.7 | 38.1 |
| Evaluation γ | Average vinyl bond content in conjugated diene monomer unit (% by mass) | | 10.7 | 10.6 | 10.4 | 10.5 |
| Evaluation δ | Average vinyl bond content in conjugated diene monomer unit (% by mass) | | 10.8 | 10.6 | 10.7 | 10.6 |
| Viscosity in 15% toluene solution (mPa · s) | | | 36.5 | 27.0 | 24.5 | 34.1 |
| Evaluation α | Content of component (b) (% by mass) | | 27.0 | 22.9 | 22.7 | 23.1 |
| | Weight average molecular weight (10000 x) | Component (a) | 5.1 | 5.0 | 4.5 | 5.3 |
| | | Component (b) | 17.7 | 16.8 | 15.0 | 18.6 |
| | | Component (b-1):(b-2):(b-3) | ND:15.2:20.5 | ND:14.8:19.9 | ND:13.8:18.2 | 10.5:16.1:21.7 |
| | Ratio of weight average molecular weight (b-1)/(a):(b-2)/(a):(b-3)/(a) | | ND:2.98:4.02 | ND:2.96:3.98 | ND:3.06:4.04 | 1.98:3.04:4.09 |
| | Ratio of area (b-1)/(b-2)/(b-3) | | 0:0.55:0.45 | 0:0.62:0.38 | 0:0.71:0.29 | 0.11:0.30:0.59 |
| Evaluation β | Content of component (b) (% by mass) | | 27.4 | 23.3 | 23.2 | 23.6 |
| | Weight average molecular weight (10000 x) | Component (a) | 5.3 | 5.1 | 4.6 | 5.5 |
| | | Component (b) | 17.5 | 16.6 | 14.8 | 18.3 |
| | | Component (b-1):(b-2):(b-3) | 10.4:15.3:20.5 | 9.9:14.8:19.8 | ND:13.3:17.6 | 10.7:16.0:21.1 |
| | Ratio of weight average molecular weight (b-1)/(a):(b-2)/(a):(b-3)/(a) | | 1.96:2.89:3.87 | 1.94:2.90:3.88 | ND:2.90:3.83 | 1.94:2.91:3.84 |
| | Ratio of area (b-1):(b-2):(b-3) | | 0.07:0.49:0.44 | 0.06:0.57:0.37 | 0:0.72:0.28 | 0.12:0.29:0.59 |

| Block copolymer composition | | | 5 | 6 | 7 | 8 |
|---|---|---|---|---|---|---|
| Content of vinyl aromatic monomer unit (% by mass) | | | 15.1 | 43.2 | 34.5 | 35.2 |
| Evaluation γ | Average vinyl bond content in conjugated diene monomer unit (% by mass) | | 11.7 | 10.3 | 11.1 | 10.3 |
| Evaluation δ | Average vinyl bond content in conjugated diene monomer unit (% by mass) | | 11.9 | 10.5 | 11.5 | 10.4 |
| Viscosity in 15% toluene solution (mPa · s) | | | 57.3 | 30.5 | 42.1 | 41.3 |
| Evaluation α | Content of component (b) (% by mass) | | 30.2 | 20.0 | 17.8 | 40.2 |
| | Weight average molecular weight (10000 x) | Component (a) | 6.2 | 4.8 | 6.5 | 4.5 |
| | | Component (b) | 20.5 | 17.1 | 20.7 | 14.3 |
| | | Component (b-1):(b-2):(b-3) | ND:18.3:23.9 | ND:15.0:20.1 | ND:19.3:25.5 | ND:13.2:18.2 |
| | Ratio of weight average molecular weight (b-1)/(a):(b-2)/(a):(b-3)/(a) | | ND:2.95:3.86 | ND:3.12:4.19 | ND:2.97:3.92 | ND:2.93:4.04 |
| | Ratio of area (b-1)/(b-2)/(b-3) | | 0:0.65:0.35 | 0:0.61:0.39 | 0:0.81:0.19 | 0:0.78:0.22 |
| Evaluation β | Content of component (b) (% by mass) | | 30.6 | 20.4 | 18.3 | 40.7 |
| | Weight average molecular weight (10000 x) | Component (a) | 6.3 | 4.9 | 6.6 | 4.7 |
| | | Component (b) | 20.4 | 16.9 | 20.5 | 14.2 |
| | | Component (b-1):(b-2):(b-3) | 12.5:18.8:24.3 | ND:14.3:19.1 | ND:18.9:25.1 | 9.3:13.4:17.8 |

TABLE 1-continued

|  |  |  |  |  |
|---|---|---|---|---|
| Ratio of weight average molecular weight (b-1)/(a):(b-2)/(a):(b-3)/(a) | 1.98:2.95:3.86 | ND:2.91:3.89 | ND:2.87:3.80 | 1.98:2.85:3.79 |
| Ratio of area (b-1):(b-2):(b-3) | 0.07:0.58:0.35 | 0:0.62:0.38 | 0:0.80:0.20 | 0.06:0.71:0.23 |

*ND; not detected

TABLE 2

| Block copolymer composition | | | 9 | 10 | 11 | 12 |
|---|---|---|---|---|---|---|
| Content of vinyl aromatic monomer unit (% by mass) | | | 34.6 | 42.8 | 30.5 | 38.3 |
| Evaluation γ | Average vinyl bond content in conjugated diene monomer unit (% by mass) | | 10.9 | 10.2 | 11.3 | 11.2 |
| Evaluation δ | Average vinyl bond content in conjugated diene monomer unit (% by mass) | | 11.1 | 10.4 | 11.6 | 11.3 |
|  | Viscosity in 15% toluene solution (mPa · s) | | 47.0 | 25.6 | 330.0 | 27.0 |
| Evaluation α | Content of component (b) (% by mass) | | 28.6 | 35.7 | 73.4 | 22.7 |
|  | Weight average molecular weight (10000 x) | Component (a) | 6.6 | 5.3 | 10.2 | 5.3 |
|  |  | Component (b) | 13.6 | 11.1 | 19.4 | 19.7 |
|  |  | Component (b-1):(b-2):(b-3) | 13.6:ND:ND | 11.1:ND:ND | 19.4:ND:ND | ND:16.0:20.9 |
|  | Ratio of weight average molecular weight (b-1)/(a):(b-2)/(a):(b-3)/(a) | | 2.06:ND:ND | 2.09:ND:ND | 1.90:ND:ND | ND:3.02:3.94 |
|  | Ratio of area (b-1):(b-2):(b-3) | | 1:0:0 | 1:0:0 | 1:0:0 | 0:0.24:0.76 |
| Evaluation β | Content of component (b) (% by mass) | | 29.1 | 36.1 | 73.7 | 23.2 |
|  | Weight average molecular weight (10000 x) | Component (a) | 6.8 | 5.5 | 10.1 | 5.4 |
|  |  | Component (b) | 13.4 | 10.9 | 19.6 | 19.6 |
|  |  | Component (b-1):(b-2):(b-3) | 13.4:ND:ND | 10.9:ND:ND | 19.6:ND:ND | ND:15.7:20.6 |
|  | Ratio of weight average molecular weight (b-1)/(a):(b-2)/(a):(b-3)/(a) | | 1.97:ND:ND | 1.98:ND:ND | 1.95:ND:ND | ND:2.91:3.82 |
|  | Ratio of area (b-1):(b-2):(b-3) | | 1:0:0 | 1:0:0 | 1:0:0 | 0:0.23:0.77 |

| Block copolymer composition | | | 13 | 14 | 15 |
|---|---|---|---|---|---|
| Content of vinyl aromatic monomer unit (% by mass) | | | 42.2 | 35.9 | 37.3 |
| Evaluation γ | Average vinyl bond content in conjugated diene monomer unit (% by mass) | | 10.4 | 11.0 | 10.5 |
| Evaluation δ | Average vinyl bond content in conjugated diene monomer unit (% by mass) | | 10.4 | 11.2 | 10.7 |
|  | Viscosity in 15% toluene solution (mPa · s) | | 32.0 | 49.2 | 29.6 |
| Evaluation α | Content of component (b) (% by mass) | | 24.0 | 46.1 | 26.3 |
|  | Weight average molecular weight (10000 x) | Component (a) | 5.1 | 5.5 | 5.0 |
|  |  | Component (b) | 20.0 | 14.6 | 16.1 |
|  |  | Component (b-1):(b-2):(b-3) | ND:ND:20.0 | 11.0:15.2:ND | 10.2:14.8:20.7 |
|  | Ratio of weight average molecular weight (b-1)/(a):(b-2)/(a):(b-3)/(a) | | ND:ND:3.92 | 2.00:2.76:ND | 2.04:2.96:4.14 |
|  | Ratio of area (b-1):(b-2):(b-3) | | 0:0:1 | 0.51:0.49:0 | 0.31:0.49:0.20 |
| Evaluation β | Content of component (b) (% by mass) | | 24.4 | 46.6 | 26.7 |
|  | Weight average molecular weight (10000 x) | Component (a) | 5.3 | 5.7 | 5.2 |
|  |  | Component (b) | 20.0 | 14.1 | 15.6 |
|  |  | Component (b-1):(b-2):(b-3) | ND:ND:20.0 | 11.2:16.2:ND | 10.1:15.1:20.3 |
|  | Ratio of weight average molecular weight (b-1)/(a):(b-2)/(a):(b-3)/(a) | | ND:ND:3.78 | 1.97:2.85:ND | 1.94:2.91:3.90 |
|  | Ratio of area (b-1):(b-2):(b-3) | | 0:0:1 | 0.49:0.51:0 | 0.30:0.49:0.21 |

*ND; not detected

TABLE 3

| Block copolymer composition | | 16 | 17 | 18 | 19 |
|---|---|---|---|---|---|
| Content of vinyl aromatic monomer unit (% by mass) | | 14.8 | 38.8 | 43.4 | 37.6 |
| Evaluation γ | Average vinyl bond content in conjugated diene monomer unit (% by mass) | 35.4 | 41.3 | 38.4 | 40.2 |

TABLE 3-continued

| | | | | | |
|---|---|---|---|---|---|
| Evaluation δ | Average vinyl bond content in conjugated diene monomer unit (% by mass) | 35.8 | 41.5 | 38.8 | 40.8 |
| | Hydrogenation ratio in conjugated diene monomer unit (% by mass) | 44.6 | 49.4 | 48.8 | 72.3 |
| | Viscosity in 15% toluene solution (mPa · s) | 62.3 | 27.6 | 24.3 | 61.6 |
| Evaluation α | Content of component (b) (% by mass) | 22.4 | 20.8 | 26.1 | 21.0 |
| | Weight average molecular weight (10000 x) Component (a) | 7.1 | 4.9 | 4.3 | 4.0 |
| | Weight average molecular weight (10000 x) Component (b) | 22.4 | 18.1 | 11.4 | 12.1 |
| | Weight average molecular weight (10000 x) Component (b-1):(b-2):(b-3) | 14.0:21.3:28.5 | 9.8:14.6:20.8 | 8.8:12.5:16.3 | 8.3:12.2:15.9 |
| | Ratio of weight average molecular weight (b-1)/(a):(b-2)/(a):(b-3)/(a) | 1.97:3.00:4.01 | 2.00:2.98:4.24 | 2.05:2.91:3.79 | 2.08:3.05:3.98 |
| | Ratio of area (b-1):(b-2):(b-3) | 0.11:0.62:0.27 | 0.09:0.31:0.60 | 0.14:0.70:0.16 | 0.15:0.73:0.12 |
| Evaluation β | Content of component (b) (% by mass) | 22.7 | 21.2 | 26.4 | 21.5 |
| | Weight average molecular weight (10000 x) Component (a) | 7.3 | 5.0 | 4.3 | 4.2 |
| | Weight average molecular weight (10000 x) Component (b) | 22.3 | 17.8 | 11.4 | 12.0 |
| | Weight average molecular weight (10000 x) Component (b-1):(b-2):(b-3) | 14.2:20.9:28.0 | 9.8:14.2:19.7 | 8.5:12.1:15.9 | 8.3:12.1:16.1 |
| | Ratio of weight average molecular weight (b-1)/(a):(b-2)/(a):(b-3)/(a) | 1.95:2.86:3.83 | 1.96:2.84:3.94 | 1.98:2.82:3.70 | 1.97:2.87:3.84 |
| | Ratio of area (b-1):(b-2):(b-3) | 0.10:0.61:0.29 | 0.08:0.31:0.61 | 0.16:0.71:0.14 | 0.16:0.73:0.11 |

| | Block copolymer composition | 20 | 21 | 22 | 23 |
|---|---|---|---|---|---|
| | Content of vinyl aromatic monomer unit (% by mass) | 30.3 | 35.2 | 35.2 | 36.1 |
| Evaluation γ | Average vinyl bond content in conjugated diene monomer unit (% by mass) | 28.3 | 40.7 | 40.7 | 10.4 |
| Evaluation δ | Average vinyl bond content in conjugated diene monomer unit (% by mass) | 28.2 | 40.9 | 40.9 | 10.5 |
| | Hydrogenation ratio in conjugated diene monomer unit (% by mass) | 36.1 | 0.0 | 50.1 | 0.0 |
| | Viscosity in 15% toluene solution (mPa · s) | 42.7 | 29.6 | 36.1 | 24.7 |
| Evaluation α | Content of component (b) (% by mass) | 24.3 | 28.7 | 28.7 | 24.3 |
| | Weight average molecular weight (10000 x) Component (a) | 5.1 | 5.2 | 5.2 | 5.0 |
| | Weight average molecular weight (10000 x) Component (b) | 20.7 | 11.2 | 11.2 | 15.7 |
| | Weight average molecular weight (10000 x) Component (b-1):(b-2):(b-3) | ND:ND:20.7 | 11.2:ND:ND | 11.2:ND:ND | ND:15.7:ND |
| | Ratio of weight average molecular weight (b-1)/(a):(b-2)/(a):(b-3)/(a) | ND:ND:4.06 | 2.15:ND:ND | 2.15:ND:ND | ND:3.14:ND |
| | Ratio of area (b-1):(b-2):(b-3) | 0:0:1 | 1:0:0 | 1:0:0 | 0:1:0 |
| Evaluation β | Content of component (b) (% by mass) | 24.7 | 29.1 | 29.1 | 24.8 |
| | Weight average molecular weight (10000 x) Component (a) | 5.3 | 5.4 | 5.4 | 5.2 |
| | Weight average molecular weight (10000 x) Component (b) | 20.5 | 10.9 | 10.9 | 15.4 |
| | Weight average molecular weight (10000 x) Component (b-1):(b-2):(b-3) | ND:ND:20.5 | 10.9:ND:ND | 10.9:ND:ND | ND:15.4:ND |
| | Ratio of weight average molecular weight (b-1)/(a):(b-2)/(a):(b-3)/(a) | ND:ND:3.89 | 2.02:ND:ND | 2.02:ND:ND | ND:2.96:ND |
| | Ratio of area (b-1):(b-2):(b-3) | 0:0:1 | 1:0:0 | 1:0:0 | 0:1:0 |

*ND; not detected

TABLE 4

| | Block copolymer composition | 24 | 25 | 26 | 27 |
|---|---|---|---|---|---|
| | Content of vinyl aromatic monomer unit (% by mass) | 15.8 | 16.2 | 16.8 | 16.5 |
| Evaluation γ | Average vinyl bond content in conjugated diene monomer unit (% by mass) | 31.3 | 23.1 | 30.2 | 29.8 |
| Evaluation δ | Average vinyl bond content in conjugated diene monomer unit (% by mass) | 32.0 | 23.6 | 30.6 | 30.2 |
| | Hydrogenation ratio in conjugated diene monomer unit (% by mass) | 40.6 | 43.8 | 42.2 | 41.3 |
| | Viscosity in 15% toluene solution (mPa · s) | 291.3 | 259.6 | 285.3 | 539.2 |
| Evaluation α | Content of component (b) (% by mass) | 40.7 | 31.3 | 41.3 | 71.7 |
| | Weight average molecular weight (10000 x) Component (a) | 10.2 | 9.5 | 9.7 | 10.2 |
| | Weight average molecular weight (10000 x) Component (b) | 31.8 | 32.7 | 28.9 | 29.3 |

TABLE 4-continued

|  |  |  | | | | |
|---|---|---|---|---|---|---|
| | (10000 x) | Component (b-1):(b-2):(b-3) | 20.6:29.6:40.6 | 20.0:27.7:38.6 | 20.2:28.1:38.7 | 20.5:28.9:40.2 |
| | | Ratio of weight average molecular weight (b-1)/(a):(b-2)/(a):(b-3)/(a) | 2.02:2.90:3.98 | 2.1:2.92:4.06 | 2.08:2.90:3.99 | 2.01:2.83:3.94 |
| | | Ratio of area (b-1):(b-2):(b-3) | 0.12:0.66:0.22 | 0.10:0.39:0.51 | 0.10:0.82:0.08 | 0.13:0.82:0.05 |
| Evaluation β | | Content of component (b) (% by mass) | 41.1 | 31.8 | 41.7 | 71.9 |
| | Weight average molecular weight (10000 x) | Component (a) | 10.3 | 9.5 | 9.8 | 10.2 |
| | | Component (b) | 31.7 | 32.4 | 28.9 | 29.0 |
| | | Component (b-1):(b-2):(b-3) | 21.0:30.8:41.1 | 19.5:28.3:38.1 | 20.1:29.3:39.0 | 20.4:29.6:40.1 |
| | | Ratio of weight average molecular weight (b-1)/(a):(b-2)/(a):(b-3)/(a) | 2.04:2.99:3.99 | 2.05:2.98:4.01 | 2.05:2.95:3.98 | 2.00:2.90:3.93 |
| | | Ratio of area (b-1):(b-2):(b-3) | 0.13:0.66:0.21 | 0.11:0.39:0.50 | 0.11:0.82:0.07 | 0.14:0.82:0.04 |

| | | Block copolymer composition | 28 | 29 | 30 |
|---|---|---|---|---|---|
| | | Content of vinyl aromatic monomer unit (% by mass) | 21.5 | 26.3 | 16.1 |
| Evaluation γ | | Average vinyl bond content in conjugated diene monomer unit (% by mass) | 31.8 | 30.7 | 29.5 |
| Evaluation δ | | Average vinyl bond content in conjugated diene monomer unit (% by mass) | 32.1 | 30.9 | 29.5 |
| | | Hydrogenation ratio in conjugated diene monomer unit (% by mass) | 41.1 | 40.5 | 40.9 |
| | | Viscosity in 15% toluene solution (mPa·s) | 321.6 | 338.0 | 187.9 |
| Evaluation α | | Content of component (b) (% by mass) | 42.1 | 40.9 | 38.8 |
| | Weight average molecular weight (10000 x) | Component (a) | 9.3 | 8.9 | 7.1 |
| | | Component (b) | 31.1 | 27.5 | 23.9 |
| | | Component (b-1):(b-2):(b-3) | 18.5:27.3:37.3 | 18.2:26.8:34.9 | 14.3:21.4:27.6 |
| | | Ratio of weight average molecular weight (b-1)/(a):(b-2)/(a):(b-3)/(a) | 1.99:2.94:4.01 | 2.05:3.01:3.92 | 2.02:3.02:3.88 |
| | | Ratio of area (b-1):(b-2):(b-3) | 0.08:0.51:0.41 | 0.13:0.77:0.10 | 0.11:0.31:0.58 |
| Evaluation β | | Content of component (b) (% by mass) | 42.5 | 41.3 | 39.3 |
| | Weight average molecular weight (10000 x) | Component (a) | 9.4 | 9.0 | 7.2 |
| | | Component (b) | 30.9 | 27.2 | 23.8 |
| | | Component (b-1):(b-2):(b-3) | 18.9:27.9:37.1 | 18.3:27.0:35.0 | 14.3:20.9:27.7 |
| | | Ratio of weight average molecular weight (b-1)/(a):(b-2)/(a):(b-3)/(a) | 2.01:2.97:3.95 | 2.03:3.00:3.89 | 1.99:2.90:3.85 |
| | | Ratio of area (b-1):(b-2):(b-3) | 0.08:0.52:0.40 | 0.12:0.78:0.10 | 0.12:0.32:0.56 |

*ND; not detected

TABLE 5

| | | Example | | | | | | | |
|---|---|---|---|---|---|---|---|---|---|
| | | 1 | 2 | 3 | 4 | 5 | 6 | 7 | 8 |
| Block copolymer composition | Component | 1 | 2 | 3 | 4 | 5 | 6 | 7 | 8 |
| | Amount blended (parts by mass) | 100 | 100 | 100 | 100 | 100 | 100 | 100 | 100 |
| Tackifier 1 (parts by mass) | | 300 | 300 | 300 | 300 | 300 | 300 | 300 | 300 |
| Softener 1 (parts by mass) | | 100 | 100 | 100 | 100 | 100 | 100 | 100 | 100 |
| Melting characteristics | | ◎ | ◎ | ◎ | ◎ | ○ | ◎ | ○ | ○ |
| Melt viscosity at 140° C. (mPa·s) | | 1,220 | 1,060 | 1,030 | 1,280 | 1,510 | 1,480 | 1,420 | 1,660 |
| Softening point (° C.) | | 84.7 | 83.7 | 80.0 | 84.5 | 80.1 | 86.2 | 88.1 | 87.5 |
| Coatability | | ○ | ○ | ○ | ○ | ○ | ○ | ○ | ○ |
| Tacking characteristics; adherend PE | Tackiness (loop tack) (N/15 mm) | 22.7 | 12.2 | 11.1 | 14.7 | 17.1 | 15.2 | 13.3 | 11.3 |
| | Tack strength (N/10 mm) | 10.1 | 8.9 | 9.1 | 11.3 | 10.4 | 10.9 | 9.6 | 12.1 |
| | Retention strength at 40° C. (min) | 780 | 289 | 488 | 680 | 378 | 448 | 521 | 615 |
| Retention strength at 40° C./Melt viscosity at 140° C. (—) | | 0.60 | 0.27 | 0.47 | 0.53 | 0.25 | 0.30 | 0.28 | 0.37 |

| | | Example | | Comparative Example | | | | | |
|---|---|---|---|---|---|---|---|---|---|
| | | 9 | 10 | 1 | 2 | 3 | 4 | 5 | 10 |
| Block copolymer composition | Component | 12 | 15 | 9 | 10 | 11 | 13 | 14 | 23 |
| | Amount blended (parts by mass) | 100 | 100 | 100 | 100 | 100 | 100 | 100 | 100 |

TABLE 5-continued

|  |  |  |  |  |  |  |  |  |
|---|---|---|---|---|---|---|---|---|
| Tackifier 1 (parts by mass) | 300 | 300 | 300 | 300 | 300 | 300 | 300 | 300 |
| Softener 1 (parts by mass) | 100 | 100 | 100 | 100 | 100 | 100 | 100 | 100 |
| Melting characteristics | ◎ | ◎ | ○ | ◎ | X | ○ | ○ | ◎ |
| Melt viscosity at 140° C. (mPa·s) | 1,170 | 1,460 | 2,370 | 1,430 | 21,000 | 1,680 | 2,160 | 1,050 |
| Softening point (° C.) | 85.3 | 85.8 | 92 | 87.3 | 105.2 | 96.1 | 86.2 | 78.9 |
| Coatability | ○ | ○ | ○ | ○ | X | ○ | ○ | ○ |
| Tacking characteristics; adherend PE — Tackiness (loop tack) (N/15 mm) | 9 | 7.8 | 10.6 | 16.6 | 6.3 | 6.1 | 10.8 | 12.7 |
| Tack strength (N/10 mm) | 8.2 | 9.3 | 9.3 | 9.7 | 11.3 | 9.2 | 9.8 | 8.6 |
| Retention strength at 40° C. (min) | 249 | 293 | 411 | 262 | 1190 | 117 | 395 | 181 |
| Retention strength at 40° C./Melt viscosity at 140° C. (—) | 0.20 | 0.20 | 0.17 | 0.18 | 0.06 | 0.07 | 0.18 | 0.17 |

TABLE 6

|  |  | Example | | | | Comparative Example | | | |
|---|---|---|---|---|---|---|---|---|---|
|  |  | 11 | 12 | 13 | 14 | 6 | 7 | 8 | 9 |
| Block copolymer composition | Component | 16 | 17 | 18 | 19 | 20 | 21 | 22 | 9 |
|  | Amount blended (parts by mass) | 100 | 100 | 100 | 100 | 100 | 100 | 100 | 100 |
| Tackifier 1 (parts by mass) | | 300 | 300 | 300 | 300 | 300 | 300 | 300 | 300 |
| Softener 1 (parts by mass) | | 100 | 100 | 100 | 100 | 100 | 100 | 100 | 100 |
| Melting characteristics | | ○ | ○ | ○ | ○ | ○ | ◎ | ○ | ○ |
| Melt viscosity at 140° C. (mPa·s) | | 2,310 | 1,800 | 1,980 | 2,480 | 2,440 | 1,530 | 1,960 | 2,370 |
| Softening point (° C.) | | 87.3 | 88.8 | 91.3 | 89.8 | 90.3 | 85.5 | 85.5 | 92 |
| Coatability | | ○ | ○ | ○ | ○ | ○ | ○ | ○ | ○ |
| Tacking characteristics; adherend SUS304 | Tackiness (loop tack) (N/15 mm) | 15.3 | 13.9 | 12.9 | 11.5 | 12.8 | 20.6 | 15.2 | 26.7 |
|  | Tack strength (N/10 mm) | 12.3 | 13.3 | 14.3 | 15.3 | 13.9 | 12.7 | 14.3 | 12 |
|  | Retention strength at 40° C. (min) | 1180 | 1258 | 2210 | 1830 | 980 | 210 | 890 | 264 |
|  | Retention strength at 60° C. (min) | 10.8 | 16.1 | 24.5 | 21.3 | 8.6 | 3.2 | 5.6 | 3.6 |
| Retention strength at 60° C./Melt viscosity at 140° C. (—) | | 0.47 | 0.89 | 1.24 | 0.86 | 0.35 | 0.21 | 0.29 | 0.15 |
| Thermal stability | MFR retention rate (%) | 96.5 | 95.6 | 96.3 | 99.6 | 96.1 | 45.4 | 95.4 | 61.3 |

TABLE 7

|  |  | Example | | | Comparative Example | |
|---|---|---|---|---|---|---|
|  |  | 15 | 16 | 17 | 11 | 12 |
| Block copolymer composition | Component | 1 | 1 | 1 | 11 | 11 |
|  | Amount blended (parts by mass) | 75 | 75 | 75 | 75 | 75 |
|  | Component | 9 | D1161 | Q3433N | 9 | D1161 |
|  | Amount blended (parts by mass) | 25 | 25 | 25 | 25 | 25 |
| Tackifier 1 (parts by mass) | | 300 | 300 | 300 | 300 | 300 |
| Softener 1 (parts by mass) | | 100 | 100 | 100 | 100 | 100 |
| Melting characteristics | | ○ | ○ | ○ | X | X |
| Melt viscosity at 140° C. (mPa·s) | | 1,590 | 1,890 | 1,680 | 16,890 | 17,100 |
| Softening point (° C.) | | 86.1 | 82.3 | 80.9 | 102.3 | 96.4 |
| Coatability | | ○ | ○ | ○ | X | X |
| Tacking characteristics; adherend PE | Tackiness (loop tack) (N/15 mm) | 18.9 | 17.3 | 18.1 | 7.1 | 10.3 |
|  | Tack strength (N/10 mm) | 9.4 | 9.8 | 10.9 | 10.8 | 12.5 |
|  | Retention strength at 40° C. (min) | 663 | 431 | 359 | 878 | 786 |
| Retention strength at 40° C./Melt viscosity at 140° C. (—) | | 0.42 | 0.23 | 0.21 | 0.05 | 0.05 |

D1161: Kraton D1161 (manufactured by Kraton Performance Polymers, Inc.)
Q3433N: Quintac 3433N (manufactured by Zeon Corporation)

TABLE 8

|  |  | Example | | | Comparative Example |
|---|---|---|---|---|---|
|  |  | 18 | 19 | 20 | 13 |
| Block copolymer composition | Component | 17 | 17 | 17 | 10 |
|  | Amount blended (parts by mass) | 75 | 75 | 75 | 75 |
|  | Component | 10 | 1 | D1161 | 11 |
|  | Amount blended (parts by mass) | 25 | 25 | 25 | 25 |
| Tackifier 1 (parts by mass) |  | 300 | 300 | 300 | 300 |
| Softener 1 (parts by mass) |  | 100 | 100 | 100 | 100 |
| Melting characteristics |  | ○ | ○ | ○ | ○ |
| Melt viscosity at 140° C. (mPa·s) |  | 1,760 | 1,690 | 2,230 | 6,580 |
| Softening point (° C.) |  | 88.3 | 85.7 | 84.6 | 93.1 |
| Coatability |  | ○ | ○ | ○ | ○ |
| Tacking characteristics; adherend SUS304 | Tackiness (loop tack) (N/15 mm) | 17.3 | 15.1 | 13.8 | 10.2 |
|  | Tack strength (N/10 mm) | 14.5 | 14.9 | 12.9 | 13.7 |
|  | Retention strength at 40° C. (min) | 896 | 1097 | 685 | 1354 |
|  | Retention strength at 60° C. (min) | 12.9 | 12.5 | 11.3 | 21.3 |
| Retention strength at 60° C./Melt viscosity at 140° C. (—) |  | 0.73 | 0.74 | 0.51 | 0.32 |
| Thermal stability | MFR retention rate (%) | 95.7 | 95.4 | 97.6 | 40.2 |

*D1161: Kraton D1161 (manufactured by Kraton Performance Polymers, Inc.)

TABLE 9

|  |  | Example | | | | | | |
|---|---|---|---|---|---|---|---|---|
|  |  | 21 | 22 | 23 | 24 | 25 | 26 | 27 |
| Block copolymer composition | Component | 24 | 25 | 26 | 28 | 30 | 24 | 24 |
|  | Amount blended (parts by mass) | 100 | 100 | 100 | 100 | 100 | 50 | 50 |
|  | Component | — | — | — | — | — | 9 | D1161 |
|  | Amount blended (parts by mass) | — | — | — | — | — | 50 | 50 |
| Tackifier 2 (parts by mass) |  | 140 | 140 | 140 | 140 | 140 | 140 | 140 |
| Softener 2 (parts by mass) |  | 30 | 30 | 30 | 30 | 30 | 30 | 30 |
| Melting characteristics |  | ○ | ○ | ○ | ○ | ○ | ○ | ○ |
| Melt viscosity at 180° C. (mPa·s) |  | 31,200 | 28,600 | 30,100 | 31,900 | 31,100 | 21,300 | 32,800 |
| Softening point (° C.) |  | 121 | 113 | 117 | 135 | 136 | 112 | 128 |
| Coatability |  | ○ | ○ | ○ | ○ | ○ | ○ | ○ |
| Tacking characteristics; adherend SUS304 | Tackiness (ball tack) (No.) | 14 | 13 | 11 | 9 | 10 | 8 | 11 |
|  | Retention strength at 50° C. (min) | 243 | 178 | 135 | 215 | 321 | 128 | 154 |
| Retention strength at 50° C./Melt viscosity at 180° C. × 100 (—) |  | 0.78 | 0.62 | 0.45 | 0.67 | 1.03 | 0.6 | 0.47 |
| Light resistance | Tack strength change rate (%) | ○ | ○ | ○ | ○ | ○ | ○ | ○ |
|  | Adhesion residue on adherend | ○ | ○ | ○ | ○ | ○ | ○ | ○ |

|  |  | Example | | Comparative Example | | | | |
|---|---|---|---|---|---|---|---|---|
|  |  | 28 | 29 | 14 | 15 | 16 | 17 | 18 |
| Block copolymer composition | Component | 28 | 24 | D1161 | 9 | 20 | 22 | 22 |
|  | Amount blended (parts by mass) | 75 | 50 | 100 | 100 | 100 | 100 | 50 |
|  | Component | H1221 | Q3280 | — | — | — | — | 9 |
|  | Amount blended (parts by mass) | 25 | 50 | — | — | — | — | 50 |
| Tackifier 2 (parts by mass) |  | 140 | 140 | 140 | 140 | 140 | 140 | 140 |
| Softener 2 (parts by mass) |  | 30 | 30 | 30 | 30 | 30 | 30 | 30 |
| Melting characteristics |  | ○ | ○ | ○ | ⊚ | ○ | ○ | ○ |
| Melt viscosity at 180° C. (mPa·s) |  | 30,200 | 31,700 | 34,700 | 10,300 | 13,900 | 12,600 | 11,700 |
| Softening point (° C.) |  | 129 | 131 | 130 | 108 | 134 | 119 | 125 |
| Coatability |  | ○ | ○ | ○ | ⊚ | ○ | ○ | ○ |
| Tacking characteristics; | Tackiness (ball tack) (No.) | 12 | 10 | 8 | 2 or less | 4 | 2 or less | 2 or less |

TABLE 9-continued

| adherend SUS304 | Retention strength at 50° C. (min) | 181 | 144 | 98 | 86 | 198 | 253 | 122 |
|---|---|---|---|---|---|---|---|---|
| | Retention strength at 50° C./Melt viscosity at 180° C. × 100 (—) | 0.6 | 0.45 | 0.28 | 0.83 | 1.42 | 0.2 | 0.1 |
| Light resistance | Tack strength change rate (%) | ○ | ○ | X | X | ○ | ○ | ○ |
| | Adhesion residue on adherend | ○ | ○ | X | X | ○ | ○ | ○ |

D1161: Kraton D1161 (manufactured by Kraton Performance Polymers, Inc.)
H1221: Tuftec H1221 (manufactured by Asahi Kasei Chemicals Corp.)
Q3280: Quintac 3280 (manufactured by Zeon Corporation)

TABLE 10

| | | Example | | | | | | |
|---|---|---|---|---|---|---|---|---|
| | | 30 | 31 | 32 | 33 | 34 | 35 | 36 |
| Block copolymer composition | Component | 25 | 28 | 29 | 30 | 25 | 27 | 28 |
| | Amount blended (parts by mass) | 100 | 100 | 100 | 100 | 50 | 50 | 50 |
| | Component | — | — | — | — | 9 | 10 | D1161 |
| | Amount blended (parts by mass) | — | — | — | — | 50 | 50 | 50 |
| | Tackifier 2 (parts by mass) | 200 | 200 | 200 | 200 | 200 | 140 | 200 |
| | Softener 2 (parts by mass) | 100 | 100 | 100 | 100 | 100 | 30 | 100 |
| | Melting characteristics | ○ | ○ | ○ | ○ | ○ | ○ | ○ |
| | Melt viscosity at 180° C. (mPa·s) | 2,410 | 2,780 | 2,930 | 2,860 | 1,790 | 3,680 | 2,970 |
| | Softening point (° C.) | 84 | 91 | 95 | 98 | 87 | 109 | 86 |
| | Coatability | ○ | ○ | ○ | ○ | ○ | ○ | ○ |
| Tacking characteristics; adherend SUS304 | Tackiness (probe tack) (N/5 mmφ.) | 1.9 | 2.2 | 2.6 | 2.3 | 1.7 | 1.6 | 1.9 |
| | Retention strength at 50° C. (min) | 15 | 19 | 25 | 38 | 18 | 26 | 19 |
| | Retention strength at 50° C./Melt viscosity at 180° C. × 100 (—) | 0.62 | 0.68 | 0.85 | 1.33 | 1 | 0.71 | 0.64 |
| Light resistance | Tack strength change rate (%) | ○ | ○ | ○ | ○ | ○ | ○ | ○ |
| | Adhesion residue on adherend | ○ | ○ | ○ | ○ | ○ | ○ | ○ |

| | | Example | | Comparative Example | | | |
|---|---|---|---|---|---|---|---|
| | | 37 | 38 | 19 | 20 | 21 | 22 |
| Block copolymer composition | Component | 28 | 29 | 3433 | 11 | 23 | 9 |
| | Amount blended (parts by mass) | 50 | 75 | 100 | 100 | 100 | 50 |
| | Component | Q3433N | S2063 | — | — | — | Q3433N |
| | Amount blended (parts by mass) | 50 | 25 | — | — | — | 50 |
| | Tackifier 2 (parts by mass) | 200 | 200 | 200 | 200 | 200 | 200 |
| | Softener 2 (parts by mass) | 100 | 100 | 100 | 100 | 100 | 100 |
| | Melting characteristics | ○ | ○ | ○ | X | ○ | ○ |
| | Melt viscosity at 180° C. (mPa·s) | 2,250 | 2,380 | 1,790 | 2,850 | 790 | 1,320 |
| | Softening point (° C.) | 84 | 92 | 83 | 96 | 87 | 88 |
| | Coatability | ○ | ○ | ○ | X | ○ | ○ |
| Tacking characteristics; adherend SUS304 | Tackiness (probe tack) (N/5 mmφ.) | 2 | 2.1 | 1.7 | 0 | 0 | 0.9 |
| | Retention strength at 50° C. (min) | 14 | 17 | 7 | 11 | 3 | 5 |
| | Retention strength at 50° C./Melt viscosity at 180° C. × 100 (—) | 0.62 | 0.71 | 0.39 | 0.39 | 0.38 | 0.38 |
| Light resistance | Tack strength change rate (%) | ○ | ○ | X | X | X | X |
| | Adhesion residue on adherend | ○ | ○ | X | X | X | X |

D1161: Kraton D1161 (manufactured by Kraton Performance Polymers, Inc.)
Q3433N: Quintac 3433N (manufactured by Zeon Corporation)
S2063: SEPTON 2063 (manufactured by KURARAY CO., LTD.)

It was found that any of the adhesive compositions in Examples 1 to 10 and 15 to 17 had good viscous adhesive characteristics including loop tack (tackiness), tack strength and retention strength at 40° C., and was excellent in performance balance between melt viscosity and retention strength at 40° C. Further, it was found that any of the adhesive compositions in Examples 11 to 14 and 18 to 20 had good retention strength at 60° C. and thermal stability in addition to the above performance, and was excellent in performance balance between melt viscosity and retention strength at 40° C.

It was found that any of the adhesive compositions in Examples 21 to 29 had good viscous adhesive characteristics including ball tack (tackiness) and retention strength at 50° C., and was excellent in performance balance between melt viscosity and retention strength at 50° C., and light resistance.

It was found that any of the adhesive compositions in Examples 30 to 38 had good viscous adhesive characteristics including probe tack (tackiness) and retention strength at 50° C., and was excellent in performance balance between melt viscosity and retention strength at 50° C., and light resistance.

The present application is based on a Japanese patent application (Japanese Patent Application No. 2014-010810) filed in the Japan Patent Office on 23 Jan. 2014, the content of which is incorporated by reference herein.

INDUSTRIAL APPLICABILITY

The adhesive composition according to the present invention can be used for various pressure-sensitive adhesive tapes, pressure-sensitive adhesive sheets, pressure-sensitive adhesive films, pressure-sensitive adhesive labels, pressure-sensitive thin plates, pressure-sensitive sheets, surface-protective sheets, surface-protective films, hygiene products, back adhesives for fixing various lightweight plastic molded articles, back adhesives for fixing a carpet, back adhesives for fixing a tile, adhesives or the like, and in particular has industrial applicability as a viscous adhesive for pressure-sensitive adhesive tapes, pressure-sensitive adhesive sheets, pressure-sensitive adhesive films, pressure-sensitive adhesive labels, surface-protective sheets, surface-protective films and hygiene products.

The invention claimed is:

1. A block copolymer composition comprising:
(i) 50% by mass or more and 90% by mass or less of a component (a) that is a block copolymer comprising a polymer block (A) mainly comprising a vinyl aromatic monomer unit and a polymer block (B) comprising more than 50% by mass of a conjugated diene monomer unit, wherein the block copolymer has a weight average molecular weight of 30,000 or higher and 150,000 or lower,
(ii) a component (b-2) that is a block copolymer comprising a polymer block (A) mainly comprising a vinyl aromatic monomer unit and a polymer block (B) comprising more than 50% by mass of a conjugated diene monomer unit, wherein at a ratio of a weight average molecular weight of the block copolymer to the weight average molecular weight of the component (a) is 2.5 or more and less than 3.4,
(iii) a component (b-3) that is a block copolymer comprising a polymer block (A) mainly comprising a vinyl aromatic monomer unit and a polymer block (B) mainly comprising a conjugated diene monomer unit, wherein a ratio of a weight average molecular weight of the block copolymer to the weight average molecular weight of the component (a) is 3.4 or more and less than 4.5, and
(iv) optionally a component (b-1) that is a block copolymer comprising a polymer block (A) mainly comprising a vinyl aromatic monomer unit and a polymer block (B) mainly comprising a conjugated diene monomer unit, wherein a ratio of a weight average molecular weight of the block copolymer to the weight average molecular weight of the component (a) is 1.5 or more and less than 2.5,
wherein a content of the vinyl aromatic monomer unit in the component (a) and the components (b-1), (b-2) and (b-3) is 12 to 35% by mass based on a total amount of the component (a) and the components (b-1), (b-2) and (b-3),
a hydrogenation ratio in the conjugated diene monomer unit in the component (a) and the components (b-1), (b-2) and (b-3) is 20% by mass or more, and
a content of the components (b-1), (b-2) and (b-3) is 10% by mass or more and 50% by mass or less.

2. The block copolymer composition according to claim 1, having a viscosity in a 15% by mass toluene solution of 10 to 90 mPa·s at 25° C.

3. The block copolymer composition according to claim 1, having a viscosity in a 15% by mass toluene solution of higher than 90 mPa·s and 600 mPa·s or less at 25° C.

4. The block copolymer composition according to claim 1, wherein the component (b) comprises the component (b-1).

5. The block copolymer composition according to claim 4, wherein a ratio of an area for the component (b-1) in a GPC elution curve to a total area for the components (b-1), (b-2) and (b-3) is 0.6 or less.

6. The block copolymer composition according to claim 4, wherein a ratio of an area for the component (b-1) in a GPC elution curve to a total area for the components (b-1), (b-2) and (b-3) is 0.2 or less.

7. The block copolymer composition according to claim 1, wherein
a ratio of an area for the component (b-2) in a GPC elution curve to a total area for the components (b-1), (b-2) and (b-3) is 0.1 to 0.97, and
a ratio of an area for the component (b-3) in a GPC elution curve to a total area for the components (b-1), (b-2) and (b-3) is 0.03 to 0.9.

8. The block copolymer composition according to claim 1, wherein each of the components (b-1), (b-2) and (b-3) independently has a weight average molecular weight of 60,000 or higher and 600,000 or lower.

9. The block copolymer composition according to claim 1, wherein
the component (a) is a block copolymer represented by (A-B) and/or (A-B)X, wherein A denotes a polymer block (A); B denotes a polymer block (B); and X denotes a residue of a coupling agent or a residue of a polymerization initiator, and
the components (b-2) and (b-3) are represented by (A-B)$_3$X and (A-B)$_4$X, respectively, wherein A denotes a polymer block (A); B denotes a polymer block (B); and X denotes a residue of a coupling agent or a residue of a polymerization initiator.

10. The block copolymer composition according to claim 1, wherein
the component (a) is a block copolymer represented by (A-B) and/or (A-B)X, wherein A denotes a polymer block (A); B denotes a polymer block (B); and X denotes a residue of a coupling agent or a residue of a polymerization initiator, the block copolymer composition comprises the component (b-1), and
the components (b-1), (b-2) and (b-3) are represented by (A-B)$_2$X, (A-B)$_3$X and (A-B)$_4$X, respectively, wherein A denotes a polymer block (A); B denotes a polymer block (B); and X denotes a residue of a coupling agent or a residue of a polymerization initiator.

11. The block copolymer composition according to claim 1, wherein
   a content of the component (a) is 10% by mass or more and 75% by mass or less, and
   a content of the components (b-1), (b-2) and (b-3) is 25% by mass or more and 90% by mass or less.

12. The block copolymer composition according to claim 1, wherein
   a content of the component (a) is 70% by mass or more and 90% by mass or less, and
   a content of the components (b-1), (b-2) and (b-3) is 10% by mass or more and 30% by mass or less.

13. The block copolymer composition according to claim 1, wherein
   a content of the component (a) is 50% by mass or more and less than 70%, and
   a content of the components (b-1), (b-2) and (b-3) is more than 30% by mass and 50% by mass or less.

14. The copolymer composition according to claim 1, wherein a hydrogenation ratio in the conjugated diene monomer unit in the component (a) and the components (b-1), (b-2) and (b-3) is from 20% by mass to 70% by mass.

15. The copolymer composition according to claim 1, wherein a hydrogenation ratio in the conjugated diene monomer unit in the component (a) and the components (b-1), (b-2) and (b-3) is more than 70% by mass.

16. An adhesive composition comprising:
   100 parts by mass of the block copolymer composition according to claim 1;
   50 to 400 parts by mass of a tackifier; and
   10 to 200 parts by mass of a softener.

17. An adhesive composition comprising:
   (a) 100 parts by mass of the block copolymer composition comprising:
      (i) 10% by mass or more and 90% by mass or less of a component (a) that is a block copolymer comprising a polymer block (A) mainly comprising a vinyl aromatic monomer unit and a polymer block (B) comprising more than 50% by mass of a conjugated diene monomer unit, wherein the block copolymer has a weight average molecular weight of 30,000 or higher and 150,000 or lower,
      (ii) a component (b-2) that is a block copolymer comprising a polymer block (A) mainly comprising a vinyl aromatic monomer unit and a polymer block (B) comprising more than 50% by mass of a conjugated diene monomer unit, wherein a ratio of a weight average molecular weight of the block copolymer to the weight average molecular weight of the component (a) is 2.5 or more and less than 3.4,
      (iii) a component (b-3) that is a block copolymer comprising a polymer block (A) mainly comprising a vinyl aromatic monomer unit and a polymer block (B) mainly comprising a conjugated diene monomer unit, wherein a ratio of a weight average molecular weight of the block copolymer to the weight average molecular weight of the component (a) is 3.4 or more and less than 4.5, and
      (iv) optionally a component (b-1) that is a block copolymer comprising a polymer block (A) mainly comprising a vinyl aromatic monomer unit and a polymer block (B) mainly comprising a conjugated diene monomer unit, wherein a ratio of a weight average molecular weight of the block copolymer to the weight average molecular weight of the component (a) is 1.5 or more and less than 2.5,
   wherein a content of the vinyl aromatic monomer unit in the component (a) and the components (b-1), (b-2) and (b-3) is 12 to 35% by mass based on a total amount of the component (a) and the components (b-1), (b-2) and (b-3), and
   a hydrogenation ratio in the conjugated diene monomer unit in the component (a) and the components (b-1), (b-2) and (b-3) is 20% by mass or more;
   (b) 50 to 400 parts by mass of a tackifier; and
   (c) 10 to 200 parts by mass of a softener.

* * * * *